United States Patent
Lu

(10) Patent No.: US 12,478,777 B2
(45) Date of Patent: Nov. 25, 2025

(54) NON-INVASIVE SPINAL CORD STIMULATION FOR NERVE ROOT PALSY, CAUDA EQUINA SYNDROME, AND RESTORATION OF UPPER EXTREMITY FUNCTION

(71) Applicant: The Regents of the University of California, Oakland, CA (US)

(72) Inventor: Daniel C. Lu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 188 days.

(21) Appl. No.: 17/270,402

(22) PCT Filed: Aug. 22, 2019

(86) PCT No.: PCT/US2019/047777
§ 371 (c)(1),
(2) Date: Feb. 22, 2021

(87) PCT Pub. No.: WO2020/041633
PCT Pub. Date: Feb. 27, 2020

(65) Prior Publication Data
US 2021/0187278 A1 Jun. 24, 2021

Related U.S. Application Data

(60) Provisional application No. 62/772,022, filed on Nov. 27, 2018, provisional application No. 62/722,095, filed on Aug. 23, 2018.

(51) Int. Cl.
*A61N 1/04* (2006.01)
*A61N 1/05* (2006.01)
(Continued)

(52) U.S. Cl.
CPC ......... *A61N 1/0456* (2013.01); *A61N 1/0551* (2013.01); *A61N 1/06* (2013.01);
(Continued)

(58) Field of Classification Search
None
See application file for complete search history.

(56) References Cited

U.S. PATENT DOCUMENTS 2,868,343 A  1/1959  Sproul, V
3,543,761 A  12/1970  Bradley
(Continued)

FOREIGN PATENT DOCUMENTS

AU  2012204526 A1  7/2013
CA     2649663 A1  11/2007
(Continued)

OTHER PUBLICATIONS

National Health Service, Lumbar Decompression Surgery: When it's used, Apr. 28, 2022, NHS, https://www.nhs.uk/conditions/lumbar-decompression-surgery/why-its-done/#:~:text=Cauda%20equina%20syndrome%20is%20a,is%20severe%20or%20getting%20worse (Year: 2022).*
(Continued)

*Primary Examiner* — Michael W Kahelin
(74) *Attorney, Agent, or Firm* — Quarles & Brady LLP

(57) ABSTRACT

In various embodiments, methods are provided to improve motor function, and/or to improve motor control, and/or to improve sensory function, and/or to reduce pain in subjects with nerve root palsies (e.g., radiculopathies including, but not limited to cauda equina syndrome). In certain embodiments, methods are provided for the magnetic stimulation of the spinal cord or regions thereof to improve motor function
(Continued)

of upper and/or lower extremities in subjects with impaired extremity motor function due to spinal cord or brain injury or pathology.

35 Claims, 19 Drawing Sheets

(51) Int. Cl.
| | |
|---|---|
| *A61N 1/06* | (2006.01) |
| *A61N 1/36* | (2006.01) |
| *A61N 2/00* | (2006.01) |
| *A61N 2/02* | (2006.01) |

(52) U.S. Cl.
CPC ..... *A61N 1/36017* (2013.01); *A61N 1/36034* (2017.08); *A61N 1/36062* (2017.08); *A61N 1/36067* (2013.01); *A61N 1/36071* (2013.01); *A61N 1/36192* (2013.01); *A61N 1/36196* (2013.01); *A61N 2/006* (2013.01); *A61N 2/02* (2013.01)

(56) References Cited

U.S. PATENT DOCUMENTS

| | | |
|---|---|---|
| 3,650,277 A | 3/1972 | Sjostrand et al. |
| 3,662,758 A | 5/1972 | Glover |
| 3,724,467 A | 4/1973 | Avery et al. |
| 4,044,774 A | 8/1977 | Corbin et al. |
| 4,102,344 A | 7/1978 | Conway et al. |
| 4,141,365 A | 2/1979 | Fischell et al. |
| 4,285,347 A | 8/1981 | Hess |
| 4,340,063 A | 7/1982 | Maurer |
| 4,379,462 A | 4/1983 | Borkan et al. |
| 4,398,537 A | 8/1983 | Holmbo |
| 4,414,986 A | 11/1983 | Dickhudt et al. |
| 4,538,624 A | 9/1985 | Tarjan |
| 4,549,556 A | 10/1985 | Tajan et al. |
| 4,559,948 A | 12/1985 | Liss et al. |
| 4,569,352 A | 2/1986 | Petrofsky et al. |
| 4,573,481 A | 3/1986 | Bullara et al. |
| 4,724,842 A | 2/1988 | Charters |
| 4,800,898 A | 1/1989 | Hess et al. |
| 4,934,368 A | 6/1990 | Lynch |
| 4,969,452 A | 11/1990 | Petrofsky et al. |
| 5,002,053 A | 3/1991 | Garcia-Rill et al. |
| 5,031,618 A | 7/1991 | Mullett |
| 5,066,272 A | 11/1991 | Eaton et al. |
| 5,081,989 A | 1/1992 | Graupe et al. |
| 5,121,754 A | 6/1992 | Mullett |
| 5,344,439 A | 9/1994 | Otten |
| 5,354,320 A | 10/1994 | Schaldach et al. |
| 5,366,813 A | 11/1994 | Berlin |
| 5,374,285 A | 12/1994 | Vaiani et al. |
| 5,417,719 A | 5/1995 | Hull et al. |
| 5,476,441 A | 12/1995 | Durfee et al. |
| 5,562,718 A | 10/1996 | Palermo |
| 5,643,330 A | 7/1997 | Holsheimer et al. |
| 5,733,322 A | 3/1998 | Starkebaum |
| 5,983,141 A | 11/1999 | Sluijter et al. |
| 6,058,331 A | 5/2000 | King |
| 6,066,163 A | 5/2000 | John |
| 6,104,957 A | 8/2000 | Alo et al. |
| 6,122,548 A | 9/2000 | Starkebaum et al. |
| 6,308,103 B1 | 10/2001 | Gielen |
| 6,319,241 B1 | 11/2001 | King et al. |
| 6,463,327 B1 | 10/2002 | Lurie et al. |
| 6,470,213 B1 | 10/2002 | Alley |
| 6,500,110 B1 | 12/2002 | Davey et al. |
| 6,503,231 B1 | 1/2003 | Prausnitz et al. |
| 6,505,074 B2 | 1/2003 | Boveja et al. |
| 6,516,227 B1 * | 2/2003 | Meadows ......... A61N 1/37247 607/46 |
| 6,551,849 B1 | 4/2003 | Kenney |
| 6,587,724 B2 | 7/2003 | Mann |
| 6,662,053 B2 | 12/2003 | Borkan |
| 6,666,831 B1 | 12/2003 | Edgerton et al. |
| 6,685,729 B2 | 2/2004 | Gonzalez |
| 6,748,276 B1 | 6/2004 | Daignault, Jr. et al. |
| 6,819,956 B2 | 11/2004 | DiLorenzo |
| 6,839,594 B2 | 1/2005 | Cohen et al. |
| 6,862,479 B1 | 3/2005 | Whitehurst et al. |
| 6,871,099 B1 | 3/2005 | Whitehurst et al. |
| 6,878,112 B2 | 4/2005 | Linberg et al. |
| 6,892,098 B2 | 5/2005 | Ayal et al. |
| 6,895,280 B2 | 5/2005 | Meadows et al. |
| 6,895,283 B2 | 5/2005 | Erickson et al. |
| 6,937,891 B2 | 8/2005 | Leinders et al. |
| 6,950,706 B2 | 9/2005 | Rodriguez et al. |
| 6,975,907 B2 | 12/2005 | Zanakis et al. |
| 6,988,006 B2 | 1/2006 | King et al. |
| 6,999,820 B2 | 2/2006 | Jordan |
| 7,020,521 B1 | 3/2006 | Brewer et al. |
| 7,024,247 B2 | 4/2006 | Gliner et al. |
| 7,035,690 B2 | 4/2006 | Goetz |
| 7,047,084 B2 | 5/2006 | Erickson et al. |
| 7,065,408 B2 | 6/2006 | Herman et al. |
| 7,096,070 B1 | 8/2006 | Jenkins et al. |
| 7,110,820 B2 | 9/2006 | Tcheng et al. |
| 7,127,287 B2 | 10/2006 | Duncan et al. |
| 7,127,296 B2 | 10/2006 | Bradley |
| 7,127,297 B2 | 10/2006 | Law et al. |
| 7,149,773 B2 | 12/2006 | Haller et al. |
| 7,153,242 B2 | 12/2006 | Goffer |
| 7,184,837 B2 | 2/2007 | Goetz |
| 7,200,443 B2 | 4/2007 | Faul |
| 7,209,787 B2 | 4/2007 | DiLorenzo |
| 7,228,179 B2 | 6/2007 | Campen et al. |
| 7,239,920 B1 | 7/2007 | Thacker et al. |
| 7,251,529 B2 | 7/2007 | Greenwood-Van Meerveld |
| 7,252,090 B2 | 8/2007 | Goetz |
| 7,313,440 B2 | 12/2007 | Miesel et al. |
| 7,324,853 B2 | 1/2008 | Ayal et al. |
| 7,330,760 B2 | 2/2008 | Heruth et al. |
| 7,337,005 B2 | 2/2008 | Kim et al. |
| 7,337,006 B2 | 2/2008 | Kim et al. |
| 7,340,298 B1 | 3/2008 | Barbut |
| 7,381,192 B2 | 6/2008 | Brodard et al. |
| 7,415,309 B2 | 8/2008 | Mcintyre |
| 7,463,927 B1 | 12/2008 | Chaouat |
| 7,463,928 B2 | 12/2008 | Lee et al. |
| 7,467,016 B2 | 12/2008 | Colborn |
| 7,493,170 B1 | 2/2009 | Segel et al. |
| 7,496,404 B2 | 2/2009 | Meadows et al. |
| 7,502,652 B2 | 3/2009 | Gaunt et al. |
| 7,536,226 B2 | 5/2009 | Williams et al. |
| 7,544,185 B2 | 6/2009 | Bengtsson |
| 7,584,000 B2 | 9/2009 | Erickson |
| 7,590,454 B2 | 9/2009 | Garabedian et al. |
| 7,603,178 B2 | 10/2009 | North et al. |
| 7,620,502 B2 | 11/2009 | Selifonov et al. |
| 7,628,750 B2 | 12/2009 | Cohen et al. |
| 7,647,115 B2 | 1/2010 | Levin et al. |
| 7,660,636 B2 | 2/2010 | Castel et al. |
| 7,697,995 B2 | 4/2010 | Cross et al. |
| 7,725,193 B1 | 5/2010 | Chu |
| 7,729,781 B2 | 6/2010 | Swoyer et al. |
| 7,734,340 B2 | 6/2010 | De Ridder |
| 7,734,351 B2 | 6/2010 | Testerman et al. |
| 7,742,037 B2 | 6/2010 | Sako et al. |
| 7,769,463 B2 | 8/2010 | Katsnelson |
| 7,797,057 B2 | 9/2010 | Harris |
| 7,801,601 B2 | 9/2010 | Maschino et al. |
| 7,813,803 B2 | 10/2010 | Heruth et al. |
| 7,813,809 B2 | 10/2010 | Strother et al. |
| 7,840,270 B2 | 11/2010 | Ignagni et al. |
| 7,856,264 B2 | 12/2010 | Firlik et al. |
| 7,877,146 B2 | 1/2011 | Rezai et al. |
| 7,890,182 B2 | 2/2011 | Parramon et al. |
| 7,949,395 B2 | 5/2011 | Kuzma |
| 7,949,403 B2 | 5/2011 | Palermo et al. |
| 7,987,000 B2 | 7/2011 | Moffitt et al. |
| 7,991,465 B2 | 8/2011 | Bartic et al. |

(56) References Cited

U.S. PATENT DOCUMENTS

| | | |
|---|---|---|
| 8,019,427 B2 | 9/2011 | Moffitt |
| 8,050,773 B2 | 11/2011 | Zhu |
| 8,108,051 B2 | 1/2012 | Cross, Jr. et al. |
| 8,108,052 B2 | 1/2012 | Boling |
| 8,131,358 B2 | 3/2012 | Moffitt et al. |
| 8,135,473 B2 | 3/2012 | Miesel et al. |
| 8,155,750 B2 | 4/2012 | Jaax et al. |
| 8,168,481 B2 | 5/2012 | Hanaoka et al. |
| 8,170,660 B2 | 5/2012 | Dacey, Jr. et al. |
| 8,190,262 B2 | 5/2012 | Gerber et al. |
| 8,195,304 B2 | 6/2012 | Strother et al. |
| 8,214,048 B1 | 7/2012 | Whitehurst et al. |
| 8,229,565 B2 | 7/2012 | Kim et al. |
| 8,239,038 B2 | 8/2012 | Wolf, II |
| 8,260,436 B2 | 9/2012 | Gerber et al. |
| 8,271,099 B1 | 9/2012 | Swanson |
| 8,295,936 B2 | 10/2012 | Wahlstrand et al. |
| 8,311,644 B2 | 11/2012 | Moffitt et al. |
| 8,326,569 B2 | 12/2012 | Lee et al. |
| 8,332,029 B2 | 12/2012 | Glukhovsky et al. |
| 8,332,047 B2 | 12/2012 | Libbus et al. |
| 8,346,366 B2 | 1/2013 | Arle et al. |
| 8,352,036 B2 | 1/2013 | DiMarco et al. |
| 8,355,791 B2 | 1/2013 | Moffitt |
| 8,355,797 B2 | 1/2013 | Caparso et al. |
| 8,364,273 B2 | 1/2013 | De Ridder |
| 8,369,961 B2 | 2/2013 | Christman et al. |
| 8,374,696 B2 | 2/2013 | Sanchez et al. |
| 8,412,345 B2 | 4/2013 | Moffitt |
| 8,428,728 B2 | 4/2013 | Sachs |
| 8,442,655 B2 | 5/2013 | Moffitt et al. |
| 8,452,406 B2 | 5/2013 | Arcot-Krishmamurthy et al. |
| 8,543,200 B2 | 9/2013 | Lane et al. |
| 8,588,884 B2 | 11/2013 | Hegde et al. |
| 8,700,145 B2 | 4/2014 | Kilgard et al. |
| 8,712,546 B2 | 4/2014 | Kim et al. |
| 8,740,825 B2 | 6/2014 | Ehrenreich et al. |
| 8,750,957 B2 | 6/2014 | Tang et al. |
| 8,768,481 B2 | 7/2014 | Lane |
| 8,805,542 B2 | 8/2014 | Tai et al. |
| 9,072,891 B1 | 7/2015 | Rao |
| 9,079,039 B2 | 7/2015 | Carlson et al. |
| 9,101,769 B2 | 8/2015 | Edgerton et al. |
| 9,205,259 B2 | 12/2015 | Kim et al. |
| 9,205,260 B2 | 12/2015 | Kim et al. |
| 9,205,261 B2 | 12/2015 | Kim et al. |
| 9,248,291 B2 | 2/2016 | Mashiach |
| 9,272,139 B2 | 3/2016 | Hamilton et al. |
| 9,272,143 B2 | 3/2016 | Libbus et al. |
| 9,283,391 B2 | 3/2016 | Ahmed |
| 9,314,630 B2 | 4/2016 | Levin et al. |
| 9,393,409 B2 | 7/2016 | Edgerton et al. |
| 9,409,023 B2 | 8/2016 | Burdick et al. |
| 9,415,218 B2 | 8/2016 | Edgerton et al. |
| 9,421,365 B2 | 8/2016 | Sumners et al. |
| 9,597,517 B2 | 3/2017 | Moffitt |
| 9,610,442 B2 | 4/2017 | Yoo et al. |
| 9,802,052 B2 | 10/2017 | Marnfeldt |
| 9,895,545 B2 | 2/2018 | Rao et al. |
| 9,993,642 B2 | 6/2018 | Gerasimenko et al. |
| 10,092,750 B2 | 10/2018 | Edgerton et al. |
| 10,124,166 B2 | 11/2018 | Edgerton et al. |
| 10,137,299 B2 | 11/2018 | Lu et al. |
| 10,449,371 B2 | 10/2019 | Serrano Carmona |
| 10,751,533 B2 | 8/2020 | Edgerton et al. |
| 10,773,074 B2 | 9/2020 | Liu et al. |
| 10,806,927 B2 | 10/2020 | Edgerton et al. |
| 10,806,935 B2 | 10/2020 | Rao et al. |
| 11,097,122 B2 | 8/2021 | Lu |
| 11,123,312 B2 | 9/2021 | Lu et al. |
| 11,266,850 B2 | 3/2022 | Prouza et al. |
| 11,400,284 B2 | 8/2022 | Gerasimenko et al. |
| 2001/0016266 A1 | 8/2001 | Okazaki et al. |
| 2001/0032992 A1 | 10/2001 | Wendt |
| 2002/0042814 A1 | 4/2002 | Fukasawa et al. |
| 2002/0052539 A1 | 5/2002 | Haller et al. |
| 2002/0055779 A1 | 5/2002 | Andrews |
| 2002/0083240 A1 | 6/2002 | Hoese et al. |
| 2002/0111661 A1 | 8/2002 | Cross et al. |
| 2002/0115945 A1 | 8/2002 | Herman et al. |
| 2002/0188332 A1 | 12/2002 | Lurie et al. |
| 2002/0193843 A1 | 12/2002 | Hill et al. |
| 2003/0032992 A1 | 2/2003 | Thacker et al. |
| 2003/0078633 A1 | 4/2003 | Firlik et al. |
| 2003/0093021 A1 | 5/2003 | Goffer |
| 2003/0093131 A1 | 5/2003 | Loeb et al. |
| 2003/0100933 A1 | 5/2003 | Ayal et al. |
| 2003/0114894 A1 | 6/2003 | Dar et al. |
| 2003/0158583 A1 | 8/2003 | Burnett et al. |
| 2003/0220679 A1 | 11/2003 | Han |
| 2003/0233137 A1 | 12/2003 | Paul, Jr. |
| 2004/0039425 A1 | 2/2004 | Greenwood-Van Meerveld |
| 2004/0044380 A1 | 3/2004 | Bruninga et al. |
| 2004/0111118 A1 | 6/2004 | Hill et al. |
| 2004/0111126 A1 | 6/2004 | Tanagho et al. |
| 2004/0122483 A1 | 6/2004 | Nathan et al. |
| 2004/0127954 A1 | 7/2004 | McDonald, III |
| 2004/0133248 A1 | 7/2004 | Frei et al. |
| 2004/0138518 A1 | 7/2004 | Rise et al. |
| 2004/0172027 A1 | 9/2004 | Speitling et al. |
| 2004/0172097 A1 | 9/2004 | Brodard et al. |
| 2004/0181263 A1 | 9/2004 | Balzer et al. |
| 2004/0267320 A1 | 12/2004 | Taylor et al. |
| 2005/0004622 A1 | 1/2005 | Cullen et al. |
| 2005/0061315 A1 | 3/2005 | Lee et al. |
| 2005/0070982 A1 | 3/2005 | Heruth et al. |
| 2005/0075669 A1 | 4/2005 | King |
| 2005/0075678 A1 | 4/2005 | Faul |
| 2005/0090756 A1 | 4/2005 | Wolf et al. |
| 2005/0101827 A1 | 5/2005 | Delisle |
| 2005/0102007 A1 | 5/2005 | Ayal et al. |
| 2005/0113882 A1 | 5/2005 | Cameron et al. |
| 2005/0119713 A1 | 6/2005 | Whitehurst et al. |
| 2005/0125045 A1 | 6/2005 | Brighton et al. |
| 2005/0209655 A1 | 9/2005 | Bradley et al. |
| 2005/0231186 A1 | 10/2005 | Saavedra Barrera et al. |
| 2005/0246004 A1 | 11/2005 | Cameron et al. |
| 2005/0277999 A1 | 12/2005 | Strother et al. |
| 2005/0278000 A1 | 12/2005 | Strother et al. |
| 2006/0003090 A1 | 1/2006 | Rodger et al. |
| 2006/0015153 A1 | 1/2006 | Gliner et al. |
| 2006/0018360 A1 | 1/2006 | Tai et al. |
| 2006/0041225 A1 | 2/2006 | Wallace et al. |
| 2006/0041295 A1 | 2/2006 | Osypka |
| 2006/0089696 A1 | 4/2006 | Olsen et al. |
| 2006/0100671 A1 | 5/2006 | Ridder |
| 2006/0111754 A1 | 5/2006 | Rezai et al. |
| 2006/0122678 A1 | 6/2006 | Olsen et al. |
| 2006/0142337 A1 | 6/2006 | Ikeura et al. |
| 2006/0142816 A1 | 6/2006 | Fruitman et al. |
| 2006/0142822 A1 | 6/2006 | Tulgar |
| 2006/0149333 A1 | 7/2006 | Tanagho et al. |
| 2006/0149337 A1 | 7/2006 | John |
| 2006/0195153 A1 | 8/2006 | DiUbaldi et al. |
| 2006/0239482 A1 | 10/2006 | Hatoum |
| 2006/0241356 A1 | 10/2006 | Flaherty |
| 2006/0282127 A1 | 12/2006 | Zealear |
| 2007/0004567 A1 | 1/2007 | Shetty et al. |
| 2007/0016097 A1 | 1/2007 | Farquhar et al. |
| 2007/0016266 A1 | 1/2007 | Paul, Jr. |
| 2007/0016329 A1 | 1/2007 | Herr et al. |
| 2007/0021513 A1 | 1/2007 | Agee et al. |
| 2007/0027495 A1 | 2/2007 | Gerber |
| 2007/0047852 A1 | 3/2007 | Sharp et al. |
| 2007/0049814 A1 | 3/2007 | Muccio |
| 2007/0055337 A1 | 3/2007 | Tanrisever |
| 2007/0060954 A1 | 3/2007 | Cameron et al. |
| 2007/0060980 A1 | 3/2007 | Strother et al. |
| 2007/0067003 A1 | 3/2007 | Sanchez et al. |
| 2007/0073357 A1 | 3/2007 | Rooney et al. |
| 2007/0083240 A1 | 4/2007 | Peterson et al. |
| 2007/0100389 A1 | 5/2007 | Jaax et al. |
| 2007/0121702 A1 | 5/2007 | LaGuardia et al. |
| 2007/0121709 A1 | 5/2007 | Ittogi |

(56) References Cited

U.S. PATENT DOCUMENTS

| | | |
|---|---|---|
| 2007/0142874 A1 | 6/2007 | John |
| 2007/0150023 A1 | 6/2007 | Ignagni et al. |
| 2007/0150034 A1* | 6/2007 | Rooney .............. A61N 1/36071 607/115 |
| 2007/0156172 A1 | 7/2007 | Alvarado |
| 2007/0156179 A1 | 7/2007 | Karashurov |
| 2007/0156200 A1 | 7/2007 | Kornet et al. |
| 2007/0168008 A1 | 7/2007 | Olsen |
| 2007/0179534 A1 | 8/2007 | Firlik et al. |
| 2007/0179579 A1 | 8/2007 | Feler et al. |
| 2007/0191709 A1 | 8/2007 | Swanson |
| 2007/0208381 A1 | 9/2007 | Hill et al. |
| 2007/0233204 A1 | 10/2007 | Lima et al. |
| 2007/0255372 A1 | 11/2007 | Metzler et al. |
| 2007/0265621 A1 | 11/2007 | Matthis et al. |
| 2007/0265679 A1 | 11/2007 | Bradley et al. |
| 2007/0265691 A1 | 11/2007 | Swanson |
| 2007/0276449 A1 | 11/2007 | Gunter et al. |
| 2007/0276450 A1 | 11/2007 | Meadows et al. |
| 2007/0293910 A1 | 12/2007 | Strother et al. |
| 2008/0002227 A1 | 1/2008 | Tsujimoto |
| 2008/0004674 A1 | 1/2008 | King et al. |
| 2008/0009927 A1 | 1/2008 | Vilims |
| 2008/0021513 A1 | 1/2008 | Thacker et al. |
| 2008/0027346 A1 | 1/2008 | Litt et al. |
| 2008/0027507 A1* | 1/2008 | Bijelic ................. A61N 1/0476 607/48 |
| 2008/0046049 A1 | 2/2008 | Skubitz et al. |
| 2008/0051851 A1 | 2/2008 | Lin |
| 2008/0071325 A1 | 3/2008 | Bradley |
| 2008/0077192 A1 | 3/2008 | Harry et al. |
| 2008/0103579 A1 | 5/2008 | Gerber |
| 2008/0105185 A1 | 5/2008 | Kuhlman |
| 2008/0140152 A1 | 6/2008 | Imran et al. |
| 2008/0140162 A1 | 6/2008 | Goetz et al. |
| 2008/0140169 A1 | 6/2008 | Imran |
| 2008/0147143 A1 | 6/2008 | Popovic et al. |
| 2008/0154329 A1 | 6/2008 | Pyles et al. |
| 2008/0183224 A1 | 7/2008 | Barolat |
| 2008/0200749 A1 | 8/2008 | Zheng et al. |
| 2008/0202940 A1 | 8/2008 | Jiang et al. |
| 2008/0207985 A1 | 8/2008 | Farone |
| 2008/0208287 A1 | 8/2008 | Palermo et al. |
| 2008/0215113 A1 | 9/2008 | Pawlowicz |
| 2008/0221653 A1 | 9/2008 | Agrawal et al. |
| 2008/0224226 A1 | 9/2008 | Suzuki et al. |
| 2008/0228241 A1 | 9/2008 | Sachs |
| 2008/0228250 A1 | 9/2008 | Mironer |
| 2008/0234121 A1 | 9/2008 | Kim et al. |
| 2008/0234791 A1 | 9/2008 | Arle et al. |
| 2008/0279896 A1 | 11/2008 | Heinen et al. |
| 2008/0294211 A1 | 11/2008 | Moffitt |
| 2009/0012436 A1 | 1/2009 | Lanfermann et al. |
| 2009/0024997 A1 | 1/2009 | Kobayashi |
| 2009/0093854 A1 | 4/2009 | Leung et al. |
| 2009/0112281 A1 | 4/2009 | Miyazawa et al. |
| 2009/0118365 A1 | 5/2009 | Benson, III et al. |
| 2009/0131995 A1 | 5/2009 | Sloan et al. |
| 2009/0157141 A1 | 6/2009 | Chiao et al. |
| 2009/0198305 A1 | 8/2009 | Naroditsky et al. |
| 2009/0204173 A1 | 8/2009 | Fang et al. |
| 2009/0229166 A1 | 9/2009 | Sawrie |
| 2009/0270960 A1 | 10/2009 | Zhao et al. |
| 2009/0281529 A1 | 11/2009 | Carriazo |
| 2009/0281599 A1 | 11/2009 | Thacker et al. |
| 2009/0293270 A1 | 12/2009 | Brindley et al. |
| 2009/0299166 A1 | 12/2009 | Nishida et al. |
| 2009/0299167 A1 | 12/2009 | Seymour |
| 2009/0306491 A1 | 12/2009 | Haggers |
| 2010/0004715 A1 | 1/2010 | Fahey |
| 2010/0010646 A1 | 1/2010 | Drew et al. |
| 2010/0023103 A1 | 1/2010 | Elborno |
| 2010/0029040 A1 | 2/2010 | Nomoto |
| 2010/0042193 A1 | 2/2010 | Slavin |
| 2010/0070007 A1 | 3/2010 | Parker et al. |
| 2010/0114205 A1 | 5/2010 | Donofrio et al. |
| 2010/0114239 A1 | 5/2010 | McDonald et al. |
| 2010/0125313 A1 | 5/2010 | Lee et al. |
| 2010/0137938 A1 | 6/2010 | Kishawi et al. |
| 2010/0145428 A1 | 6/2010 | Cameron et al. |
| 2010/0152811 A1 | 6/2010 | Flaherty |
| 2010/0166546 A1 | 7/2010 | Mahan et al. |
| 2010/0168820 A1 | 7/2010 | Maniak et al. |
| 2010/0185253 A1 | 7/2010 | Dimarco et al. |
| 2010/0198298 A1 | 8/2010 | Glukhovsky et al. |
| 2010/0217355 A1 | 8/2010 | Tass et al. |
| 2010/0228310 A1 | 9/2010 | Shuros et al. |
| 2010/0241191 A1 | 9/2010 | Testerman et al. |
| 2010/0268299 A1 | 10/2010 | Farone |
| 2010/0274312 A1 | 10/2010 | Alataris et al. |
| 2010/0280570 A1 | 11/2010 | Sturm et al. |
| 2010/0305660 A1 | 12/2010 | Hegi et al. |
| 2010/0312304 A1 | 12/2010 | York et al. |
| 2010/0318168 A1 | 12/2010 | Bighetti |
| 2010/0331925 A1 | 12/2010 | Peterson |
| 2011/0006793 A1 | 1/2011 | Peschke et al. |
| 2011/0009919 A1 | 1/2011 | Carbunaru et al. |
| 2011/0016081 A1 | 1/2011 | Basak et al. |
| 2011/0029040 A1 | 2/2011 | Walker et al. |
| 2011/0029044 A1 | 2/2011 | Hyde et al. |
| 2011/0034277 A1 | 2/2011 | Brandes |
| 2011/0034977 A1 | 2/2011 | Janik et al. |
| 2011/0040349 A1 | 2/2011 | Graupe |
| 2011/0054567 A1 | 3/2011 | Lane et al. |
| 2011/0054568 A1 | 3/2011 | Lane et al. |
| 2011/0054570 A1 | 3/2011 | Lane |
| 2011/0054579 A1 | 3/2011 | Kumar et al. |
| 2011/0077660 A1 | 3/2011 | Janik et al. |
| 2011/0082515 A1 | 4/2011 | Libbus et al. |
| 2011/0084489 A1 | 4/2011 | Kaplan |
| 2011/0093043 A1 | 4/2011 | Torgerson et al. |
| 2011/0112601 A1 | 5/2011 | Meadows et al. |
| 2011/0125203 A1 | 5/2011 | Simon et al. |
| 2011/0130804 A1 | 6/2011 | Lin et al. |
| 2011/0152967 A1 | 6/2011 | Simon et al. |
| 2011/0160810 A1 | 6/2011 | Griffith |
| 2011/0166546 A1 | 7/2011 | Jaax et al. |
| 2011/0184482 A1 | 7/2011 | Eberman et al. |
| 2011/0184488 A1 | 7/2011 | De Ridder |
| 2011/0184489 A1 | 7/2011 | Nicolelis et al. |
| 2011/0202107 A1 | 8/2011 | Sunagawa et al. |
| 2011/0208265 A1 | 8/2011 | Erickson et al. |
| 2011/0213266 A1 | 9/2011 | Williams et al. |
| 2011/0218590 A1 | 9/2011 | DeGiorgio et al. |
| 2011/0218594 A1 | 9/2011 | Doran et al. |
| 2011/0224153 A1 | 9/2011 | Levitt et al. |
| 2011/0224665 A1 | 9/2011 | Crosby et al. |
| 2011/0224752 A1 | 9/2011 | Rolston et al. |
| 2011/0224753 A1 | 9/2011 | Palermo et al. |
| 2011/0224757 A1 | 9/2011 | Zdeblick et al. |
| 2011/0230101 A1 | 9/2011 | Tang et al. |
| 2011/0230701 A1 | 9/2011 | Simon et al. |
| 2011/0230702 A1 | 9/2011 | Honour |
| 2011/0231326 A1 | 9/2011 | Marino |
| 2011/0237221 A1 | 9/2011 | Prakash et al. |
| 2011/0237921 A1 | 9/2011 | Askin, III et al. |
| 2011/0245734 A1 | 10/2011 | Wagner et al. |
| 2011/0276107 A1 | 11/2011 | Simon et al. |
| 2011/0288609 A1 | 11/2011 | Tehrani et al. |
| 2011/0295100 A1 | 12/2011 | Rolston et al. |
| 2012/0006793 A1 | 1/2012 | Swanson |
| 2012/0011222 A1 | 1/2012 | Yasukawa et al. |
| 2012/0011950 A1 | 1/2012 | Kracke |
| 2012/0013041 A1 | 1/2012 | Cao et al. |
| 2012/0013126 A1 | 1/2012 | Molloy |
| 2012/0016448 A1 | 1/2012 | Lee |
| 2012/0029528 A1 | 2/2012 | Macdonald et al. |
| 2012/0035684 A1 | 2/2012 | Thompson et al. |
| 2012/0041518 A1 | 2/2012 | Kim et al. |
| 2012/0052432 A1 | 3/2012 | Matsuura |
| 2012/0053645 A1 | 3/2012 | Ayanoor-Vitikkate et al. |
| 2012/0071250 A1 | 3/2012 | O'Neil et al. |
| 2012/0071950 A1 | 3/2012 | Archer |
| 2012/0083709 A1 | 4/2012 | Parker et al. |

(56) References Cited

U.S. PATENT DOCUMENTS

| | | |
|---|---|---|
| 2012/0101326 A1 | 4/2012 | Simon et al. |
| 2012/0109251 A1 | 5/2012 | Lebedev et al. |
| 2012/0109295 A1 | 5/2012 | Fan |
| 2012/0116476 A1 | 5/2012 | Kothandaraman |
| 2012/0123223 A1 | 5/2012 | Freeman et al. |
| 2012/0123293 A1 | 5/2012 | Shah et al. |
| 2012/0126392 A1 | 5/2012 | Kalvesten et al. |
| 2012/0136408 A1 | 5/2012 | Grill et al. |
| 2012/0165899 A1 | 6/2012 | Gliner |
| 2012/0172222 A1 | 7/2012 | Artigas Puerto |
| 2012/0172246 A1 | 7/2012 | Nguyen et al. |
| 2012/0172946 A1 | 7/2012 | Altaris et al. |
| 2012/0179222 A1 | 7/2012 | Jaax et al. |
| 2012/0185020 A1 | 7/2012 | Simon et al. |
| 2012/0197338 A1 | 8/2012 | Su et al. |
| 2012/0203055 A1 | 8/2012 | Pletnev |
| 2012/0203131 A1 | 8/2012 | DiLorenzo |
| 2012/0221073 A1 | 8/2012 | Southwell et al. |
| 2012/0232615 A1 | 9/2012 | Barolat et al. |
| 2012/0252874 A1 | 10/2012 | Feinstein et al. |
| 2012/0259380 A1 | 10/2012 | Pyles |
| 2012/0271372 A1 | 10/2012 | Osorio |
| 2012/0277824 A1 | 11/2012 | Li |
| 2012/0277834 A1 | 11/2012 | Mercanzini et al. |
| 2012/0283697 A1 | 11/2012 | Kim et al. |
| 2012/0283797 A1 | 11/2012 | De Ridder |
| 2012/0302821 A1 | 11/2012 | Burnett |
| 2012/0310305 A1 | 12/2012 | Kaula et al. |
| 2012/0310315 A1 | 12/2012 | Savage et al. |
| 2012/0330321 A1 | 12/2012 | Johnson et al. |
| 2012/0330391 A1 | 12/2012 | Bradley et al. |
| 2013/0012853 A1 | 1/2013 | Brown |
| 2013/0013041 A1 | 1/2013 | Glukhovsky et al. |
| 2013/0026640 A1 | 1/2013 | Ito et al. |
| 2013/0030312 A1 | 1/2013 | Keel et al. |
| 2013/0030319 A1 | 1/2013 | Hettrick et al. |
| 2013/0030501 A1 | 1/2013 | Feler et al. |
| 2013/0035745 A1 | 2/2013 | Ahmed et al. |
| 2013/0053734 A1 | 2/2013 | Barriskill et al. |
| 2013/0053922 A1 | 2/2013 | Ahmed et al. |
| 2013/0066392 A1 | 3/2013 | Simon et al. |
| 2013/0066411 A1 | 3/2013 | Thacker et al. |
| 2013/0085317 A1 | 4/2013 | Feinstein |
| 2013/0085361 A1 | 4/2013 | Mercanzini et al. |
| 2013/0096640 A1 | 4/2013 | Possover |
| 2013/0096661 A1 | 4/2013 | Greenberg et al. |
| 2013/0096662 A1 | 4/2013 | Swanson |
| 2013/0110196 A1 | 5/2013 | Alataris et al. |
| 2013/0116751 A1 | 5/2013 | Moffitt et al. |
| 2013/0123568 A1 | 5/2013 | Hamilton et al. |
| 2013/0123659 A1 | 5/2013 | Bartol et al. |
| 2013/0138167 A1 | 5/2013 | Bradley et al. |
| 2013/0165991 A1 | 6/2013 | Kim et al. |
| 2013/0197408 A1 | 8/2013 | Goldfarb et al. |
| 2013/0204324 A1 | 8/2013 | Thacker et al. |
| 2013/0211477 A1 | 8/2013 | Cullen et al. |
| 2013/0237948 A1 | 9/2013 | Donders et al. |
| 2013/0253222 A1 | 9/2013 | Nakao |
| 2013/0253229 A1 | 9/2013 | Sawant et al. |
| 2013/0253299 A1 | 9/2013 | Weber et al. |
| 2013/0253611 A1 | 9/2013 | Lee et al. |
| 2013/0268016 A1 | 10/2013 | Xi et al. |
| 2013/0268021 A1 | 10/2013 | Moffitt |
| 2013/0281890 A1 | 10/2013 | Mishelevich |
| 2013/0289446 A1 | 10/2013 | Stone et al. |
| 2013/0289664 A1 | 10/2013 | Johanek |
| 2013/0289667 A1 | 10/2013 | Wacnik et al. |
| 2013/0296965 A1 | 11/2013 | Mokelke et al. |
| 2013/0303873 A1 | 11/2013 | Voros et al. |
| 2013/0304159 A1 | 11/2013 | Simon et al. |
| 2013/0310211 A1 | 11/2013 | Wilton et al. |
| 2013/0310911 A1 | 11/2013 | Tai et al. |
| 2014/0005753 A1 | 1/2014 | Carbunaru |
| 2014/0031893 A1 | 1/2014 | Walker et al. |
| 2014/0046407 A1 | 2/2014 | Ben-Ezra et al. |
| 2014/0058292 A1 | 2/2014 | Alford et al. |
| 2014/0058490 A1 | 2/2014 | DiMarco |
| 2014/0066950 A1 | 3/2014 | Macdonald et al. |
| 2014/0067007 A1 | 3/2014 | Drees et al. |
| 2014/0067354 A1 | 3/2014 | Kaula et al. |
| 2014/0074190 A1 | 3/2014 | Griffith |
| 2014/0081011 A1 | 3/2014 | Vaught et al. |
| 2014/0081071 A1 | 3/2014 | Simon et al. |
| 2014/0088674 A1 | 3/2014 | Bradley |
| 2014/0100633 A1 | 4/2014 | Mann et al. |
| 2014/0107397 A1 | 4/2014 | Simon et al. |
| 2014/0107398 A1 | 4/2014 | Simon et al. |
| 2014/0114374 A1 | 4/2014 | Rooney et al. |
| 2014/0142652 A1 | 5/2014 | Francois et al. |
| 2014/0163640 A1 | 6/2014 | Edgerton et al. |
| 2014/0172045 A1 | 6/2014 | Yip et al. |
| 2014/0180361 A1 | 6/2014 | Burdick et al. |
| 2014/0213842 A1 | 7/2014 | Simon et al. |
| 2014/0228905 A1 | 8/2014 | Bolea |
| 2014/0236257 A1 | 8/2014 | Parker et al. |
| 2014/0243923 A1 | 8/2014 | Doan et al. |
| 2014/0277271 A1 | 9/2014 | Chan et al. |
| 2014/0296752 A1 | 10/2014 | Edgerton et al. |
| 2014/0303901 A1 | 10/2014 | Sadeh |
| 2014/0316484 A1 | 10/2014 | Edgerton et al. |
| 2014/0316503 A1 | 10/2014 | Tai et al. |
| 2014/0324118 A1 | 10/2014 | Simon et al. |
| 2014/0330067 A1 | 11/2014 | Jordan |
| 2014/0330335 A1 | 11/2014 | Errico et al. |
| 2014/0336722 A1 | 11/2014 | Rocon De Lima et al. |
| 2014/0357936 A1 | 12/2014 | Simon et al. |
| 2015/0005840 A1 | 1/2015 | Pal et al. |
| 2015/0065559 A1 | 3/2015 | Feinstein et al. |
| 2015/0066111 A1 | 3/2015 | Blum et al. |
| 2015/0165226 A1 | 6/2015 | Simon et al. |
| 2015/0182784 A1 | 7/2015 | Barriskill et al. |
| 2015/0190634 A1 | 7/2015 | Rezai et al. |
| 2015/0196231 A1 | 7/2015 | Ziaie et al. |
| 2015/0217120 A1 | 8/2015 | Nandra et al. |
| 2015/0231396 A1 | 8/2015 | Burdick et al. |
| 2015/0265830 A1 | 9/2015 | Simon et al. |
| 2015/0328462 A1 | 11/2015 | Griffith |
| 2016/0001096 A1 | 1/2016 | Mishelevich |
| 2016/0030737 A1 | 2/2016 | Gerasimenko et al. |
| 2016/0030748 A1 | 2/2016 | Edgerton et al. |
| 2016/0030750 A1 | 2/2016 | Bokil et al. |
| 2016/0045727 A1 | 2/2016 | Rezai et al. |
| 2016/0045731 A1 | 2/2016 | Simon et al. |
| 2016/0074663 A1 | 3/2016 | De Ridder |
| 2016/0082253 A1* | 3/2016 | Moffitt .............. A61N 1/36185 607/46 |
| 2016/0121109 A1* | 5/2016 | Edgerton ........... A61N 1/36003 607/45 |
| 2016/0121114 A1 | 5/2016 | Simon et al. |
| 2016/0121116 A1 | 5/2016 | Simon et al. |
| 2016/0121121 A1 | 5/2016 | Mashiach |
| 2016/0143588 A1 | 5/2016 | Hoitink et al. |
| 2016/0157389 A1 | 6/2016 | Hwang |
| 2016/0175586 A1 | 6/2016 | Edgerton et al. |
| 2016/0220813 A1 | 8/2016 | Edgerton et al. |
| 2016/0235977 A1 | 8/2016 | Lu et al. |
| 2016/0271413 A1 | 9/2016 | Vallejo et al. |
| 2016/0279418 A1 | 9/2016 | Courtine et al. |
| 2016/0279429 A1 | 9/2016 | Hershey et al. |
| 2016/0310739 A1 | 10/2016 | Burdick et al. |
| 2016/0339239 A1 | 11/2016 | Yoo et al. |
| 2017/0007831 A1 | 1/2017 | Edgerton et al. |
| 2017/0128729 A1 | 5/2017 | Netoff et al. |
| 2017/0157389 A1 | 6/2017 | Tai et al. |
| 2017/0157396 A1 | 6/2017 | Dixon et al. |
| 2017/0161454 A1 | 6/2017 | Grill et al. |
| 2017/0165497 A1* | 6/2017 | Lu ................. A61N 1/36017 |
| 2017/0173326 A1 | 6/2017 | Bloch et al. |
| 2017/0246450 A1 | 8/2017 | Liu et al. |
| 2017/0246452 A1 | 8/2017 | Liu et al. |
| 2017/0266455 A1 | 9/2017 | Steinke |
| 2017/0274209 A1 | 9/2017 | Edgerton et al. |
| 2017/0296837 A1 | 10/2017 | Jin |
| 2017/0354819 A1 | 12/2017 | Bloch et al. |

(56) References Cited

U.S. PATENT DOCUMENTS

| | | |
|---|---|---|
| 2017/0361093 A1 | 12/2017 | Yoo et al. |
| 2018/0008826 A1 | 1/2018 | Dimarco |
| 2018/0056078 A1 | 3/2018 | Kashyap et al. |
| 2018/0085583 A1 | 3/2018 | Zhang et al. |
| 2018/0104479 A1 | 4/2018 | Grill et al. |
| 2018/0110992 A1 | 4/2018 | Parramon et al. |
| 2018/0117334 A1 | 5/2018 | Jung |
| 2018/0125416 A1 | 5/2018 | Schwarz et al. |
| 2018/0178008 A1 | 6/2018 | Bouton et al. |
| 2018/0185642 A1 | 7/2018 | Lu |
| 2018/0185648 A1 | 7/2018 | Nandra et al. |
| 2018/0193655 A1 | 7/2018 | Zhang et al. |
| 2018/0229037 A1 | 8/2018 | Edgerton et al. |
| 2018/0229038 A1 | 8/2018 | Burdick et al. |
| 2018/0236240 A1 | 8/2018 | Harkema et al. |
| 2018/0256906 A1 | 9/2018 | Pivonka et al. |
| 2018/0280693 A1 | 10/2018 | Edgerton et al. |
| 2018/0353755 A1 | 12/2018 | Edgerton et al. |
| 2018/0361146 A1 | 12/2018 | Gerasimenko et al. |
| 2019/0022371 A1 | 1/2019 | Chang et al. |
| 2019/0033622 A1 | 1/2019 | Olgun et al. |
| 2019/0160294 A1 | 5/2019 | Peterson et al. |
| 2019/0167987 A1 | 6/2019 | Lu et al. |
| 2019/0192852 A1 | 6/2019 | De Ridder |
| 2019/0192864 A1 | 6/2019 | Koop et al. |
| 2019/0247650 A1 | 8/2019 | Tran |
| 2019/0269917 A1 | 9/2019 | Courtine et al. |
| 2019/0381313 A1 | 12/2019 | Lu |
| 2019/0381328 A1 | 12/2019 | Wechter et al. |
| 2020/0155865 A1 | 5/2020 | Lu |
| 2020/0228901 A1 | 7/2020 | Baek |
| 2021/0069052 A1 | 3/2021 | Burke |
| 2021/0236837 A1 | 8/2021 | Lu |
| 2021/0378991 A1 | 12/2021 | Lu et al. |
| 2022/0161042 A1 | 5/2022 | Lu |
| 2022/0233848 A1 | 7/2022 | Gad et al. |
| 2022/0313993 A1 | 10/2022 | Gerasimenko et al. |

FOREIGN PATENT DOCUMENTS

| | | |
|---|---|---|
| CA | 2 823 592 A1 | 7/2012 |
| CA | 2 856 202 A1 | 5/2013 |
| CA | 2 864 473 A1 | 5/2013 |
| CN | 101227940 A | 7/2008 |
| CN | 103263727 A | 8/2013 |
| CN | 104307098 A | 1/2015 |
| EP | 0630987 A1 | 12/1994 |
| EP | 2130326 A1 | 12/2009 |
| EP | 2141851 A2 | 1/2010 |
| EP | 2160127 A1 | 3/2010 |
| EP | 2178319 A1 | 4/2010 |
| EP | 2192897 A1 | 6/2010 |
| EP | 2226114 A1 | 9/2010 |
| EP | 2258496 A1 | 12/2010 |
| EP | 2361631 A1 | 8/2011 |
| EP | 2368401 A1 | 9/2011 |
| EP | 2387467 A1 | 11/2011 |
| EP | 2396995 A1 | 12/2011 |
| EP | 2397788 A1 | 12/2011 |
| EP | 2445990 A2 | 5/2012 |
| EP | 2471518 A2 | 7/2012 |
| EP | 2475283 A1 | 7/2012 |
| EP | 2486897 A2 | 8/2012 |
| EP | 2626051 A1 | 8/2013 |
| EP | 2628502 A1 | 8/2013 |
| EP | 2661307 A2 | 11/2013 |
| EP | 2688642 A2 | 1/2014 |
| EP | 2810689 A1 | 12/2014 |
| EP | 2810690 A1 | 12/2014 |
| EP | 2868343 A1 | 5/2015 |
| EP | 2966422 A1 | 1/2016 |
| EP | 2968940 A1 | 1/2016 |
| EP | 3184145 A1 | 6/2017 |
| EP | 3323468 A1 | 5/2018 |
| EP | 3328481 A1 | 6/2018 |
| EP | 3527258 A1 | 8/2019 |
| JP | H03-26620 A | 2/1991 |
| JP | 3184145 B2 | 7/2001 |
| JP | 2002517283 A | 6/2002 |
| JP | 2002200178 A | 7/2002 |
| JP | 2004065529 A | 3/2004 |
| JP | 2007-526798 A | 9/2007 |
| JP | 2008067917 A | 3/2008 |
| JP | 2008-543429 A | 12/2008 |
| JP | 2011502586 A | 1/2011 |
| JP | 2012515060 A | 7/2012 |
| JP | 2013508119 A | 3/2013 |
| JP | 2014514043 A | 6/2014 |
| JP | 2016506255 A | 3/2016 |
| JP | 6132856 B2 | 5/2017 |
| JP | 2017104685 A | 6/2017 |
| JP | 2017525509 A | 9/2017 |
| JP | 2018524113 A | 8/2018 |
| RU | 2130326 C1 | 5/1999 |
| RU | 2141851 C1 | 11/1999 |
| RU | 2160127 C1 | 12/2000 |
| RU | 2178319 C2 | 1/2002 |
| RU | 2192897 C2 | 11/2002 |
| RU | 2001102533 | 11/2002 |
| RU | 2226114 C1 | 3/2004 |
| RU | 2258496 C2 | 8/2005 |
| RU | 2361631 C2 | 7/2009 |
| RU | 2368401 C1 | 9/2009 |
| RU | 2387467 C1 | 4/2010 |
| RU | 2396995 C2 | 8/2010 |
| RU | 2397788 C2 | 8/2010 |
| RU | 2445990 C1 | 3/2012 |
| RU | 2471518 C2 | 1/2013 |
| RU | 2475283 C2 | 2/2013 |
| RU | 2661307 C1 | 7/2018 |
| WO | WO 97/047357 A1 | 12/1997 |
| WO | WO-0234331 A2 | 5/2002 |
| WO | WO-02092165 A1 | 11/2002 |
| WO | WO-03005887 A2 | 1/2003 |
| WO | WO 03/026735 A2 | 4/2003 |
| WO | WO 03/092795 A1 | 11/2003 |
| WO | WO 2004/087116 A2 | 10/2004 |
| WO | WO-2005002663 A2 | 1/2005 |
| WO | WO 2005/051306 A2 | 6/2005 |
| WO | WO 2005/065768 A1 | 7/2005 |
| WO | WO 2005/087307 A2 | 9/2005 |
| WO | WO 2006/138069 A1 | 12/2006 |
| WO | WO-2006135751 A2 | 12/2006 |
| WO | WO 2007/007058 A1 | 1/2007 |
| WO | WO 2007/012114 A1 | 2/2007 |
| WO | WO-2007047852 A2 | 4/2007 |
| WO | WO-2007081764 A2 | 7/2007 |
| WO | WO 2007/107831 A2 | 9/2007 |
| WO | WO-2008075294 A1 | 6/2008 |
| WO | WO 2008/109862 A1 | 9/2008 |
| WO | WO-2008070807 A3 | 9/2008 |
| WO | WO 2008/121891 A1 | 10/2008 |
| WO | WO 2009/042217 A1 | 4/2009 |
| WO | WO 2009/111142 A2 | 9/2009 |
| WO | WO-2010021977 A1 | 2/2010 |
| WO | WO 2010/055421 A1 | 5/2010 |
| WO | WO-2010083308 A1 | 7/2010 |
| WO | WO 2010/114998 A1 | 10/2010 |
| WO | WO 2010/124128 A1 | 10/2010 |
| WO | WO-2011005607 A1 | 1/2011 |
| WO | WO-2011136875 A1 | 11/2011 |
| WO | WO-2012050200 A1 | 4/2012 |
| WO | WO-2012075195 A1 | 6/2012 |
| WO | WO-2012080964 A1 | 6/2012 |
| WO | WO 2012/094346 A2 | 7/2012 |
| WO | WO 2012/100260 A2 | 7/2012 |
| WO | WO 2012/129574 A2 | 9/2012 |
| WO | WO 2013/071307 A1 | 5/2013 |
| WO | WO 2013/071309 A1 | 5/2013 |
| WO | WO-2013152124 A1 | 10/2013 |
| WO | WO 2013/188965 A1 | 12/2013 |
| WO | WO-2014005075 A1 | 1/2014 |
| WO | WO-2014031142 A1 | 2/2014 |
| WO | WO-2014089299 A2 | 6/2014 |

(56) References Cited

FOREIGN PATENT DOCUMENTS

| | | | |
|---|---|---|---|
| WO | WO 2014/144785 A1 | 9/2014 | |
| WO | WO-2014149895 A1 | 9/2014 | |
| WO | WO-2014205356 A2 | 12/2014 | |
| WO | WO-2014209877 A1 | 12/2014 | |
| WO | WO-2015000800 A1 | 1/2015 | |
| WO | WO 2015/048563 A2 | 4/2015 | |
| WO | WO-2015063127 A1 | 5/2015 | |
| WO | WO-2015106286 A1 | 7/2015 | |
| WO | WO 2016/029159 A2 | 2/2016 | |
| WO | WO 2016/033369 A1 | 3/2016 | |
| WO | WO 2016/033372 A1 | 3/2016 | |
| WO | WO-2016064761 A1 | 4/2016 | |
| WO | WO-2016110804 A1 | 7/2016 | |
| WO | WO-2016112398 A1 | 7/2016 | |
| WO | WO-2016172239 A1 | 10/2016 | |
| WO | WO 2017/011410 A1 | 1/2017 | |
| WO | WO 2017/024276 * | 2/2017 | ............... A61N 1/05 |
| WO | WO 2017/024276 A1 | 2/2017 | |
| WO | WO 2017/035512 A1 | 3/2017 | |
| WO | WO 2017/044904 A1 | 3/2017 | |
| WO | WO-2017058913 A1 | 4/2017 | |
| WO | WO-2017062508 A1 | 4/2017 | |
| WO | WO-2017117450 A1 | 7/2017 | |
| WO | WO-2017146659 A1 | 8/2017 | |
| WO | WO-2018039296 A2 | 3/2018 | |
| WO | WO 2018/106843 A1 | 6/2018 | |
| WO | WO 2018/140531 A1 | 8/2018 | |
| WO | WO 2018/217791 A1 | 11/2018 | |
| WO | WO-2019211314 A1 | 11/2019 | |
| WO | WO 2020/041502 A1 | 2/2020 | |
| WO | WO 2020/041633 A1 | 2/2020 | |
| WO | WO 2020/236946 A1 | 11/2020 | |

OTHER PUBLICATIONS

US Office Action dated Apr. 8, 2015 issued in U.S. Appl. No. 14/355,812.
US Final Office Action dated Sep. 21, 2015 issued in U.S. Appl. No. 14/355,812.
US Notice of Allowance dated Apr. 13, 2016 issued in U.S. Appl. No. 14/355,812.
US Office Action dated Oct. 18, 2016 issued in U.S. Appl. No. 15/208,529.
US Final Office Action dated Jul. 13, 2017 issued in U.S. Appl. No. 15/208,529.
US Office Action dated Jul. 27, 2018 issued in U.S. Appl. No. 15/208,529.
US Final Office Action dated Apr. 19, 2019 issued in U.S. Appl. No. 15/208,529.
US Office Action dated Oct. 28, 2019 issued in U.S. Appl. No. 15/208,529.
US Notice of Allowance dated Jun. 17, 2020 issued in U.S. Appl. No. 15/208,529.
US Office Action dated Oct. 3, 2017 issued in U.S. Appl. No. 15/025,201.
US Notice of Allowance dated Aug. 1, 2018 issued in U.S. Appl. No. 15/025,201.
US Office Action dated Apr. 10, 2020 issued in U.S. Appl. No. 16/200,467.
US Office Action dated Nov. 24, 2020 issued in U.S. Appl. No. 16/200,467.
US Office Action dated Jul. 13, 2016 issued in U.S. Appl. No. 14/775,618.
US Final Office Action dated Apr. 25, 2017 issued in U.S. Appl. No. 14/775,618.
US Notice of Allowance dated Jan. 18, 2018 issued in U.S. Appl. No. 14/775,618.
US Office Action dated Jan. 8, 2020 issued in U.S. Appl. No. 15/975,678.
US Final Office Action dated Jul. 29, 2020 issued in U.S. Appl. No. 15/975,678.
US Office Action dated Feb. 10, 2021 issued in U.S. Appl. No. 15/975,678.
US Office Action dated Oct. 31, 2019 issued in U.S. Appl. No. 15/750,499.
US Final Office Action dated Aug. 6, 2020 issued in U.S. Appl. No. 15/750,499.
US Office Action dated Jul. 22, 2019 issued in U.S. Appl. No. 15/506,696.
US Notice of Allowance dated May 4, 2020 issued in U.S. Appl. No. 15/506,696.
US Office Action dated Jun. 4, 2019 issued in U.S. Appl. No. 15/505,053.
US Notice of Allowance dated Feb. 13, 2020 issued in U.S. Appl. No. 15/505,053.
US 2nd Notice of Allowance dated Jun. 4, 2020 issued in U.S. Appl. No. 15/505,053.
US Office Action dated Apr. 7, 2020 issued in U.S. Appl. No. 15/740,323.
US Final Office Action dated Nov. 20, 2020 issued in U.S. Appl. No. 15/740,323.
US Office Action dated Mar. 29, 2021 issued in U.S. Appl. No. 15/740,323.
US Office Action dated Apr. 17, 2019 issued in U.S. Appl. No. 15/344,381.
US Final Office Action dated Dec. 30, 2019 issued in U.S. Appl. No. 15/344,381.
US Office Action dated Aug. 4, 2020 issued in U.S. Appl. No. 15/344,381.
US Notice of Allowance dated Apr. 27, 2021 issued in U.S. Appl. No. 15/344,381.
US Office Action dated Nov. 13, 2020 issued in U.S. Appl. No. 15/753,963.
PCT International Search Report dated Jul. 30, 2012 issued in PCT/US2012/020112.
PCT International Preliminary Report on Patentability and Written Opinion dated Jul. 10, 2013 issued in PCT/US2012/020112.
PCT International Search Report and Written Opinion dated Mar. 19, 2013 issued in PCT/US2012/064878.
PCT International Preliminary Report on Patentability dated May 22, 2014 issued in PCT/US2012/064878.
Australian Patent Examination Report No. 1 dated Jul. 11, 2016 issued in AU 2012334926.
Canadian Office Action dated Aug. 31, 2018 issued in CA 2,864,473.
Canadian Office Action dated Jul. 30, 2019 issued in CA 2,864,473.
Canadian Office Action dated Aug. 14, 2020 issued in CA 2,864,473.
European Communication pursuant to Rule 114(2) EPC regarding observations by a third party dated Mar. 27, 2015 issued in EP 12 847 885.6.
European Extended Search Report dated May 6, 2015 issued in EP 12 847 885.6.
European Office Action dated Apr. 15, 2016 issued in EP 12 847 885.6.
European Reply to Communication of Apr. 15, 2016 dated Oct. 24, 2016 in EP 12 847 885.6.
European Second Office Action dated Feb. 16, 2017 issued in EP 12 847 885.6.
PCT Declaration of Non-Establishment of International Search Report and Written Opinion dated Dec. 24, 2014 issued in PCT/US2014/057886.
PCT International Preliminary Report on Patentability and Written Opinion dated Apr. 7, 2016 issued in PCT/US2014/057886.
Australian Examination report No. 1 dated Jan. 11, 2019 issued in AU 2014324660.
Australian Examination report No. 2 dated Nov. 7, 2019 issued in AU 2014324660.
Australian Examination report No. 3 dated Jan. 6, 2020 issued in AU 2014324660.
Australian Examination report No. 1 dated Dec. 21, 2020 issued in AU 2020200152.
Canadian Office Action dated Nov. 27, 2020 issued in CA 2,925,754.
European Extended Search Report dated May 10, 2017 issued in EP 14849355.4.

(56) References Cited

OTHER PUBLICATIONS

European Office Action dated Jul. 20, 2018 issued in EP 14849355.4.
European Extended Search Report dated Jan. 22, 2021 issued in EP 20175385.2.
PCT International Search Report and Written Opinion dated Aug. 6, 2014 issued in PCT/US2014/029340.
PCT International Preliminary Report on Patentability dated Sep. 24, 2015 issued in PCT/US2014/029340.
Australian Patent Examination Report No. 1 dated May 11, 2018 issued in AU 2014228794.
Australian Patent Examination Report No. 1 dated Jan. 6, 2020 issued in AU 2019206059.
Canadian Office Action dated May 7, 2020 issued in CA 2,906,779.
Canadian 2nd Office Action dated Apr. 9, 2021 issued in CA 2,906,779.
European Extended Search Report dated Nov. 8, 2016 issued in EP 14765477.6.
European Office Action dated Nov. 14, 2018 issued in EP 14765477.6.
European Office Action dated Sep. 27, 2019 issued in EP 14765477.6.
PCT International Search Report and Written Opinion dated Dec. 5, 2016 issued in PCT/US2016/045898.
PCT International Preliminary Report on Patentability and Written Opinion dated Feb. 15, 2018 issued in PCT/US2016/045898.
Chinese First Office Action dated Jan. 6, 2021 issued in CN 201680058067.8.
European Extended Search Report dated Dec. 13, 2018 issued in EP 16833973.7.
PCT International Search Report and Written Opinion dated Dec. 8, 2015 issued in PCT/US2015/047268.
PCT International Preliminary Report on Patentability and Written Opinion dated Feb. 28, 2017 issued in PCT/US2015/047268.
Australian Patent Examination Report No. 1 dated Jul. 18, 2019 issued in AU 2015308779.
Australian Patent Examination Report No. 2 dated May 20, 2020 issued in AU 2015308779.
European Extended Search Report dated Mar. 1, 2018 issued in EP 15836927.2.
European Extended Search Report dated Apr. 21, 2020 issued in EP 19201998.2.
PCT International Search Report and Written Opinion dated Dec. 3, 2015 issued in PCT/US2015/047272.
PCT International Preliminary Report on Patentability and Written Opinion dated Feb. 28, 2017 issued in PCT/US2015/047272.
PCT Declaration of Non-Establishment of International Search Report and Written Opinion dated Dec. 1, 2015 issued in PCT/US2015/046378.
PCT International Preliminary Report on Patentability and Written Opinion dated Feb. 21, 2017 issued in PCT/US2015/046378.
Australian Patent Examination Report No. 1 dated Jun. 14, 2019 issued in AU 2015305237.
Australian Patent Examination Report No. 2 dated Apr. 17, 2020 issued in AU 2015305237.
European Extended Search Report dated Apr. 4, 2018 issued in EP 15834593.4.
European Office Action dated Jul. 17, 2019 issued in EP 15834593.4.
European Office Action dated Jul. 30, 2020 issued in EP 15834593.4.
PCT International Search Report and Written Opinion dated Sep. 12, 2016 issued in PCT/US2016/041802.
PCT International Preliminary Report on Patentability and Written Opinion dated Jan. 25, 2018 issued in PCT/US2016/041802.
European Extended Search Report dated Feb. 19, 2019 issued in EP 16825005.8.
Japanese Office Action dated Jul. 13, 2020 issued in JP 2018-501208.
Japanese 2nd Office Action dated Mar. 22, 2021 issued in JP 2018-501208.
PCT International Search Report and Written Opinion dated Dec. 5, 2016 issued in PCT/US2016/049129.
PCT International Preliminary Report on Patentability and Written Opinion dated Mar. 8, 2018 issued in PCT/US2016/049129.
PCT International Search Report and Written Opinion dated Mar. 12, 2018 issued in PCT/US2018/015098.
PCT International Preliminary Report on Patentability and Written Opinion dated Jul. 30, 2019 issued in PCT/US2018/015098.
European Extended Search Report dated Sep. 7, 2020 issued in EP 18744685.1.
PCT International Search Report and Written Opinion dated Aug. 31, 2018 issued in PCT/US2018/033942.
PCT International Preliminary Report on Patentability and Written Opinion dated Nov. 26, 2019 issued in PCT/US2018/033942.
PCT International Search Report and Written Opinion dated Nov. 14, 2019 issued in PCT/US2019/047777.
PCT International Preliminary Report on Patentability and Written Opinion dated Feb. 23, 2021 issued in PCT/US2019/047777.
PCT International Search Report and Written Opinion dated Nov. 21, 2019 issued in PCT/US2019/047551.
PCT International Preliminary Report on Patentability and Written Opinion dated Feb. 23, 2021 issued in PCT/US2019/047551.
PCT International Search Report and Written Opinion dated Oct. 14, 2020 issued in PCT/US2020/033830.
PCT International Search Report dated Mar. 19, 2013 issued in PCT/US2012/064874.
PCT International Search Report dated Sep. 3, 2012 issued in PCT/US2012/022257.
PCT International Search Report dated Oct. 31, 2012 issued in PCT/US2012/030624.
Andersson, et al., (2003) "CNS Involvement in Overactive Bladder." *Drugs*, 63(23): 2595-2611.
Angeli et al. (2014) "Altering spinal cord excitability enables voluntary movements after chronic complete paralysis in humans" *Brain* 137: 1394-1409.
Courtine, Grégoire et al. (2007) "Modulation of multisegmental monosynaptic responses in a variety of leg muscles during walking and running in humans," *J Physiol.* 582.3:1125-1139.
Danner S.M., Hofstoetter U.S., Ladenbauer J., Rattay F., and Minassian K. (Mar. 2011) "Can the human lumbar posterior columns be stimulated by transcutaneous spinal cord stimulation? A modeling study" *Europe PMC Funders Author Manuscripts, Artif Organs* 35(3):257-262, 12 pp.
DeSantana et al. (Dec. 2008) "Effectiveness of Transcutaneous Electrical Nerve Stimulation for Treatment of Hyperalgesia and Pain," *Curr Rheumatol Rep.* 10(6):492-499, 12 pp.
Drummond, et al. (1996) "Thoracic impedance used for measuring chest wall movement in postoperative patients," *British Journal of Anaesthesia*, 77: 327-332.
Dubinsky, Richard M. and Miyasaki, Janis, "Assessment: Efficacy of transcutaneous electric nerve stimulation in the treatment of pain in neurologic disorders (an evidence-based review)," Report of the Therapeutics and Technology Assessment Subcommittee of the American Academy of Neurology, (2010) *Neurology*, 74:173-176.
Edgerton and Harkema (2011) "Epidural stimulation of the spinal cord in spinal cord injury: current status and future challenges" *Expert Rev Neurother.* 11(10): 1351-1353. doi: 10.1586/ern.11.129 [NIH Public Access—Author Manuscript—5 pages].
Fong et al. (2009) "Recovery of control of posture and locomotion after a spinal cord injury: solutions staring US in the face," *Progress in Brain Research*, Elsevier Amsterdam, NL, 175:393-418.
Ganley et al., (2005) "Epidural Spinal Cord Stimulation Improves Locomoter Performance in Low ASIA C, Wheelchair-Dependent, Spinal Cord-Injured Individuals: Insights from Metabolic Response," *Top. Spinal Cord Inj. Rehabil*;11(2):50-63.
Gerasimenko Y., Gorodnichev R., Machueva E., Pivovarova E., Semyenov D., Savochin A., Roy R.R., and Edgerton V.R., (Mar. 10, 2010) "Novel and Direct Access to the Human Locomotor Spinal Circuitry," *J Neurosci.* 30(10):3700-3708, PMC2847395.
Gerasimenko Y.P., Ichiyama R.M., Lavrov I.A., Courtine G., Cai L., Zhong H., Roy R.R., and Edgerton V.R. (2007) "Epidural Spinal

(56) References Cited

OTHER PUBLICATIONS

Cord Stimulation Plus Quipazine Administration Enable Stepping in Complete Spinal Adult Rats," *J Neurophysiol.* 98:2525-2536.
Harkema et al. (2011) "Effect of Epidural stimulation of the lumbosacral spinal cord on voluntary movement, standing, and assisted stepping after motor complete paraplegia: a case study" *Lancet* 377(9781): 1938-1947; NIH Public Access Author Manuscript 17 pages [doi:10.1016/S0140-6736(11)60547-3].
Herman R., He J., D'Luzansky S., Willis W., Dilli S., (2002) "Spinal cord stimulation facilitates functional walking in a chronic, incomplete spinal cord injured," *Spinal Cord.* 40:65-68.
Hofstoetter, U.S et al. (Aug. 2008) "Modification of Reflex Responses to Lumbar Posterior Root Stimulation by Motor Tasks in Healthy Subjects," *Artif Organs*, 32(8):644-648.
Hovey, et al. (2006) "The Guide to Magnetic Stimulation," *The Magstim Company Ltd*, 45 pages.
Ichiyama et al. (2005) "Hindlimb stepping movements in complete spinal rats induced by epidural spinal cord stimulation" *Neuroscience Letters*, 383:339-344.
Kapetanakis, et al. (2017) "Cauda Equina Syndrome Due to Lumbar Disc Herniation: a Review of Literature," *Folia Medica*, 59(4): 377-86.
Kitano K., Koceja D.M. (2009) "Spinal reflex in human lower leg muscles evoked by transcutaneous spinal cord stimulation," *J Neurosci Methods.* 180:111-115.
Kondo, et al. (1997) "Laser monitoring of chest wall displacement," *Eur Respir J.,* 10: 1865-1869.
Minasian et al. (2010) "Transcutaneous stimulation of the human lumbar spinal cord: Facilitating locomotor output in spinal cord injury," *Conf. Proceedings Soc. for Neurosci.,* Abstract No. 286.19, 1 page.
Minassian et al. (Aug. 2011) "Transcutaneous spinal cord stimulation," *International Society for Restorative Neurology*, http://restorativeneurology.org/resource-center/assessments/transcutaneous-lumbar-spinal-cord-stimulation/; http://restorativeneurology.org/wp-content/uploads/2011/08/Transcutaneous-spinal-cord-stimulation_long.pdf, 6 pp.
Minassian et al. (Mar. 2007) "Posterior root-muscle reflexes elicited by transcutaneous stimulation of the human lumbosacral cord," *Muscle & Nerve* 35:327-336.
Nandra et al., (2014) "Microelectrode Implants for Spinal Cord Stimulation in Rats," *Thesis, California Institute of Technology*, Pasadena, California, Defended on Sep. 24, 2014, 104 pages.
Nandra et al., (Jan. 23, 2011) "A Parylene-Based Microelectrode Arrary Implant for Spinal Cord Stimulation in Rats," *Conf. Proc. IEEE Eng. Med. Biol. Soc.,* pp. 1007-1010.
Niu et al., (2018) "A Proof-of-Concept Study of Transcutaneous Magnetic Spinal Cord Stimulation for Neurogenic Bladder," *Scientific Reports*, 8: 12549 (12 pages).
Rodger et al., (2007) "High Density Flexible Parylene-Based Multielectrode Arrays for Retinal and Spinal Cord Stimulation," Transducers & Eurosensors, Proc. Of the 14th International Conference on Solid-State Sensors, Actuators and Microsystems, Lyon, France, Jun. 10-14, 2007, *IEEE*, pp. 1385-1388.
Szava et al., (Jan. 2011) "Transcutaneous electrical spinal cord stimulation: Biophysics of a new rehabilitation method after spinal cord injury", ISBN: 978-3-639-34154-6 [95 pages].
Seifert et al. (Nov. 1, 2002) "Restoration of Movement Using Functional Electrical Stimulation and Bayes' Theorem," *The Journal of Neuroscience*, 22(1):9465-9474.
Tanabe et al. (2008) "Effects of transcutaneous electrical stimulation combined with locomotion-like movement in the treatment of post-stroke gait disorder: a single-case study," 30(5):411-416 abstract, 1 page.
Wang, et al. (2017) "Incidence of C5 nerve root palsy after cervical surgery," *Medicine*, 96(45), 14 pages.
Ward, Alex R. (Feb. 2009) "Electrical Stimulation Using Kilohertz-Frequency Alternating Current," (2009) *Phys Ther.*89(2):181-190 [published online Dec. 18, 2008].

Augustine GJ, Purves D, Fitzpatrick D, eds., "Autonomic Regulation of the Bladder." Neuroscience, 2nd edition, Sunderland (MA): Sinauer Associates; 2001, Available from: https://www.ncbi.nlm.nih.gov/books/NBK10886/ ; downloaded Dec. 4, 2022, 2 pp.
CA Office Action dated Jul. 14, 2022 in Application No. CA2958924.
CA Office Action dated Oct. 21, 2021 in CA Application No. CA2958924.
CA Office Action dated Sep. 6, 2022, in Application No. CA3030615.
CA Office Action dated Sep. 28, 2021, in application No. CA2925754.
Dimitrijevic et al. (1998) "Evidence for a spinal central pattern generator in humans." Ann N Y Acad Sci. 860:360-76.
European Office Action [Decision to Refuse] dated Oct. 28, 2021 issued in EP 15834593.4.
European Search Report dated Apr. 19, 2022, in Application No. EP 19851613.0.
European Search Report dated Apr. 19, 2022, in Application No. EP 19852797.0.
Gerasimenko et al. (2015) "Initiation and modulation of locomotor circuitry output with multisite transcutaneous electrical stimulation of the spinal cord in noninjured humans." J Neurophysiol. 113:834-42.
Gerasimenko et al. (2015) "Transcutaneous electrical spinal-cord stimulation in humans." Ann Phys Rehabil Med. 58(4):225-231. doi:10.1016/j.rehab.2015.05.003.
Giuliano, F. et al., "Neural control of erection", Physiology & Behavior, vol. 83, No. 2, Nov. 15, 2004, pp. 189-201.
JP Office Action dated Nov. 21, 2022, in Application No. 2021-188658 with English translation.
JP Office Action dated Nov. 29, 2021, in Application No. JP2019-539960 with English translation.
JP Office Action dated Sep. 26, 2022, in Application No. JP2019-539960 with English translation.
Krenn et al. (2013) "Selectivity of transcutaneous stimulation of lumbar posterior roots at different spinal levels in humans." Biomed Tech (Berl) 58 (Suppl. 1) DOI 10.1515/bmt-2013-4010, 2 pages.
Ladenbauer et al. (2010) "Stimulation of the human lumbar spinal cord with implanted and surface electrodes: a computer simulation study." IEEE Trans Neural Syst Rehabil Eng. 18:637-45.
PCT International Preliminary Report on Patentability and Written Opinion dated Dec. 2, 2021 issued in PCT/US2020/033830.
Roy et al. (2012) "Effect of percutaneous stimulation at different spinal levels on the activation of sensory and motor roots." Exp Brain Res. 223:281-9.
Sayenko et al. (2014) "Neuromodulation of evoked muscle potentials induced by epidural spinal-cord stimulation in paralyzed individuals." J Neurophysiol. 111:1088-99.
Sayenko et al. (2015) "Spinal segment-specific transcutaneous stimulation differentially shapes activation pattern among motor pools in humans." J Appl Physiol. 118:1364-74.
Shafik, A (1996) "Extrapelvic cavernous nerve stimulation in erectile dysfunction. Human study" Andrologia 28(3):151-6. doi: 10.1111/j.1439-0272.1996.tb02774.x [Abstract—2 pages].
Shafik, et al. (2000) "Magnetic stimulation of the cavernous nerve for the treatment of erectile dysfunction in humans" International Journal of Impotence Research 12: 137-141.
Temel, et al. (2004) "Deep brain stimulation of the thalamus can influence penile erection" International Journal of Impotence Research 16: 91-94.
Troni et al. (2011) "A methodological reappraisal of non invasive high voltage electrical stimulation of lumbosacral nerve roots." Clin Neurophysiol. 122:2071-80.
US Final Office Action dated Dec. 6, 2021 issued in U.S. Appl. No. 16/615,765.
US Final Office Action dated Jul. 16, 2021 issued in U.S. Appl. No. 15/753,963.
US Final Office Action dated Jul. 20, 2021 issued in U.S. Appl. No. 15/975,678.
US Final Office Action dated Nov. 26, 2021 issued in U.S. Appl. No. 15/740,323.
U.S. Final Office Action dated Oct. 13, 2022, in U.S. Appl. No. 17/269,970.
U.S. Non Final Office Action dated Aug. 25, 2022 in U.S. Appl. No. 16/479,201.

(56) References Cited

OTHER PUBLICATIONS

U.S. Non-Final Office Action dated Feb. 15, 2023 in U.S. Appl. No. 15/740,323.
U.S. Non-Final office Action dated Jun. 20, 2022 in U.S. Appl. No. 16/615,765.
U.S. Non-Final office Action dated May 11, 2022, in U.S. Appl. No. 15/740,323.
US Notice of Allowance dated Dec. 13, 2021 issued in U.S. Appl. No. 15/753,963.
US Notice of Allowance dated Mar. 4, 2022 issued in U.S. Appl. No. 15/975,678.
US Notice of Allowance dated May 19, 2021 issued in U.S. Appl. No. 16/200,467.
US Office Action dated Aug. 6, 2021 issued in U.S. Appl. No. 15/750,499.
US Office Action dated Jan. 5, 2022 issued in U.S. Appl. No. 17/269,970.
US Office Action dated May 12, 2021 issued in U.S. Appl. No. 16/615,765.
U.S. Restriction Requirement dated Apr. 19, 2022 in U.S. Appl. No. 16/479,201.
Vital Signs—Cleveland Clinic [retrieved on Nov. 22, 2021] Retrieved from the Internet: URL: https://my.clevelandclinic.org/health/articles/10881-vital-signs [7 pages].
Abernethy, J. et al., "Competing in the Dark: An Efficient Algorithm for Bandit Linear Optimization", Conference on Learning Theory, (2008), 13 pages.
Ada, L. et al., "Mechanically assisted walking with body weight support results in more independent walking than assisted overground walking in non-ambulatory patients early after stroke: a systematic review," Journal of Physiotherapy, vol. 56, No. 3, (Sep. 2010), 9 pages.
Alto, L. et al., "Chemotropic Guidance Facilitates Axonal Regeneration and Synapse Formation after Spinal Cord Injury," Nature Neuroscience, vol. 12, No. 9, Published Online Aug. 2, 2009, (Sep. 2009), 21 pages.
Anderson, K., "Targeting Recovery: Priorities of the Spinal Cord-Injured Population," Journal of Neurotrauma, vol. 11, No. 10, Oct. 2004, 13 pages.
Auer, P. et al., "Finite-time Analysis of the Multiarmed Bandit Problem", Machine Learning, vol. 47, No. 2, (2002), pp. 235-256.
Auer, P. "Using Confidence Bounds for Exploitation-Exploration Trade-offs", Journal of Machine Learning Research, vol. 3, (2002), pp. 397-422.
Azimi, J. et al., "Batch Active Learning via Coordinated Matching", In Proceedings of the 29th International Conference on Machine Learning, (2012), 8 pages.
Azimi, J. et al., "Batch Bayesian Optimization via Simulation Matching", In Advances in Neural Information Processing Systems (NIPS), (2010), 9 pages.
Azimi, J. et al., "Hybrid Batch Bayesian Optimization", In Proceedings of the 29th International Conference on Machine Learning, (2012), 12 pages.
Barbeau, H. et al., "Recovery of locomotion after chronic spinalization in the adult cat", Brain Research, vol. 412, No. 1, (May 26, 1987), 12 pages.
Bareyre, F. et al., "The injured spinal cord spontaneously forms a new intraspinal circuit in adult rats," Nature Neuroscience, vol. 7, No. 3, Published Online Feb. 15, 2004, (Mar. 2004), 9 pages.
Basso, D. et al., "MASCIS Evaluation of Open Field Locomotor Scores: Effects of Experience and Teamwork on Reliability," Journal of Neurotrauma, vol. 13, No. 7, (Jul. 1996), 17 pages.
Brochu, et al., "A Tutorial on Bayesian Optimization of Expensive Cost Functions, with Application to Active User Modeling and Hierarchical Reinforcement Learning", In TR-2009-23, UBC, (2009), 49 pages.
Brosamle, C. et al., "Cells of Origin, Course, and Termination Patterns of the Ventral, Uncrossed Component of the Mature Rat Corticospinal Tract," The Journal of Comparative Neurology, vol. 386, No. 2, (Sep. 22, 1997), 11 pages.

Bubeck, S. et al., "Online Optimization in X-Armed Bandits", Advances in Neural Information Processing Systems (NIPS), (2008), 8 pages.
Bubeck, S. et al., "Pure Exploration in Finitely-Armed and Continuous-Armed Bandits problems" In ALT, (2009), 35 pages.
Burke, R., "Group la Synaptic Input to Fast and Slow Twitch Motor Units of Cat Triceps Surae", The Journal of Physiology, vol. 196, vol. 3, (Jun. 1, 1968), 26 pages.
CA Office Action dated Jun. 19, 2023, in Application No. CA3030615.
Cai, L. et al., "Implications of Assist-As-Needed Robotic Step Training after a Complete Spinal Cord Injury on Intrinsic Strategies of Motor Learning", The Journal of Neuroscience, vol. 26, No. 41, (Oct. 11, 2006), 5 pages.
Capogrosso, M., et al., "A Computational Model for Epidural Electrical Stimulation of Spinal Sensorimotor Circuits", Journal of Neuroscience, Dec. 4, 2013, vol. 33, No. 49, pp. 19326-19340.
Carhart, M. et al., "Epidural Spinal-Cord Stimulation Facilitates Recovery of Functional Walking Following Incomplete Spinal-Cord Injury," IEEE Transactions on Neural Systems and Rehabilitation Engineering, vol. 12, No. 1, (Mar. 15, 2004), 11 pages.
Colgate, E. et al., "An Analysis of Contact Instability in Terms of Passive Physical Equivalents," Proceedings of the 1989 IEEE International Conference on Robotics and Automation, Scottsdale, Arizona, (May 14, 1989), 6 pages.
Courtine, G. et al., "Can experiments in nonhuman primates expedite the translation of treatments for spinal cord injury in humans?", Nature Medicine, vol. 13, No. 5, (May 2007), 13 pages.
Courtine, G. et al., "Recovery of supraspinal control of stepping via indirect propriospinal relay connections after spinal cord injury," Nature Medicine, vol. 14, No. 1, (Jan. 6, 2008), 6 pages.
Cowley, K. et al., "Propriospinal neurons are sufficient for bulbospinal transmission of the locomotor command signal in the neonatal rat spinal cord," The Journal of Physiology, vol. 586, No. 6, Published Online Jan. 31, 2008, (Mar. 15, 2008), 13 pages.
Danner, S. et al., "Human spinal locomotor control is based on flexibly organized burst generators," Brain, vol. 138, No. 3, Available Online Jan. 12, 2015, Mar. 2015, 12 pages.
Danner, S. M. et al., "Body Position Influences Which neural structures are recruited by lumbar transcutaneous spinal cord stimulation", PLoS ONE, vol. 11, No. 1, (2016), 13 pages.
Dimitrijevic, M. M. et al., "Clinical Elements for the Neuromuscular Stimulation and Functional Electrical Stimulation protocols in the Practice of Neurorehabilitation", Artificial Organs, vol. 26, No. 3, (2002), pp. 256-259.
Dimitrijevic, M. R. et al., "Electrophysiological characteristics of H-reflexes elicited by percutaneous stimulation of the cauda equina", Abstract No. 4927, 34th Annual Meeting of the Society for Neuroscience, San Diego, CA (2004), 1 Page.
Drew, T. et al., "Cortical mechanisms involved in visuomotor coordination during precision walking," Brain Research Reviews, vol. 57, No. 1, Published Online Aug. 22, 2007, (Jan. 2007), 13 pages.
Duschau-Wicke, A. et al., "Patient-cooperative control increases active participation of individuals with SCI during robot-aided gait training," Journal of NeuroEngineering and Rehabilitation, vol. 7, No. 43, (Sep. 10, 2010), 13 pages.
Edgerton, V. et al., "Robotic Training and Spinal Cord Plasticity," Brain Research Bulletin, vol. 78, No. 1, Published Online Nov. 14, 2008, (Jan. 15, 2009), 19 pages.
Edgerton, V. et al., "Training Locomotor Networks," Brain Research Reviews, vol. 57, Published Online Sep. 16, 2007, (Jan. 2008), 25 pages.
European Office Action dated Jun. 9, 2022 in Application No. EP16825005.8.
Fleshman, J. et al., "Electronic Architecture of Type-Identified a-Motoneurons in the Cat Spinal Cord," Journal of Neurophysiology, vol. 60, No. 1, (Jul. 1, 1988), 26 pages.
Frey, M. et al., "A Novel Mechatronic Body Weight Support System," IEEE Transactions on Neural Systems and Rehabilitation Engineering, vol. 14, No. 3, (Sep. 18, 2006), 11 pages.
Fuentes, R. et al., "Spinal Cord Stimulation Restores Locomotion in Animal Models of Parkinson's Disease," Science, vol. 323, No. 5921, (Mar. 20, 2009), 14 pages.

(56) References Cited

OTHER PUBLICATIONS

Gerasimenko, Yu. P. et al., "Control of Locomotor Activity in Humans and Animals in the Absence of Supraspinal Influences", Neuroscience and Behavioral Physiology, vol. 32, No. 4, (2002), pp. 417-423.
Gerasimenko, Yu. P. et al., "Noninvasive Reactivation of Motor Descending Control after Paralysis", Journal of Neurotrauma, vol. 32, (2015), 13 pages.
Gilja, V. et al., "A high-performance neural prosthesis enabled by control algorithm design," Nature Neuroscience, vol. 15, No. 12, Published Online Nov. 18, 2012, (Dec. 2012), 56 pages.
Gittins, J. C., "Bandit Processes and Dynamic Allocation Indices", Journal of the Royal Statistical Society B, vol. 41, No. 2, (1979), pp. 148-164.
Guyatt, G. H. et al., "The 6-minute walk: a new measure of exercise capacity in patients with chronic heart failure," Canadian Medical Association Journal, vol. 132, No. 8, (Apr. 15, 1985), 5 pages.
Hagglund, M. et al., "Activation of groups of excitatory neurons in the mammalian spinal cord or hindbrain evokes locomotion," Nature Neuroscience, vol. 13, No. 2, Published Online Jan. 17, 2010, (Feb. 2010), 8 pages.
Harkema, S. et al., "Human Lumbosacral Spinal Cord Interprets Loading During Stepping," Journal of Neurophysiology, vol. 77, No. 2, (Feb. 1, 1997), 15 pages.
Harrison, P. et al., "Individual Excitatory Post-Synaptic Potentials Due to Muscle Spindle la Afferents in Cat Triceps Surae Motoneurones," The Journal of Physiology, vol. 312, No. 1, (Mar. 1981), pp. 455-470.
Hashtrudi-Zaad, K. et al., "On the Use of Local Force Feedback for Transparent Teleoperation," Proceedings of the 1999 IEEE International Conference on Robotics and Automation, (May 10, 1999), 7 pages.
Hennig, P. et al., "Entropy search for information-efficient global optimization" Journal of Machine Learning Research (JMLR), vol. 13, (Jun. 2012), pp. 1809-1837.
Hidler, J. et al., "ZeroG: Overground gait and balance training system," Journal of Rehabilitation Research & Development, vol. 48, No. 4, Available as Early as Jan. 1, 2011, (2011), 12 pages.
Hines, M. L. et al., "The NEURON Simulation Environment," Neural Computation, vol. 9, No. 6, (Aug. 15, 1997), 26 pages.
Hofstoetter, U. S. et al., "Effects of transcutaneous spinal cord stimulation on voluntary locomotor activity in an incomplete spinal cord injured individual", Biomed Tech, vol. 58 (Suppl. 1), (2013), 3 pages.
Hofstoetter, U. S. et al., "Model of spinal cord reflex circuits in humans: Stimulation frequency-dependence of segmental activities and their interactions", Second Congress International Society of Intraoperative Neurophysiology (ISIN), Dubrovnik, Croatia, (2009), 149 pages.
Hofstoetter, U. S. et al., "Modification of spasticity by transcutaneous spinal cord stimulation in individuals with incomplete spinal cord injury", The Journal of Spinal Cord Medicine, vol. 37, No. 2, (2014), pp. 202-211.
International Search Report and Written Opinion dated Jun. 28, 2022, in PCT Application No. PCT/US2022/024673.
Ivanenko, Y. P. et al., "Temporal Components of the Motor Patterns Expressed by the Human Spinal Cord Reflect Foot Kinematics," Journal of Neurophysiology, vol. 90, No. 5, Nov. 2003, Published Online Jul. 9, 2003, (2003), 11 pages.
Jarosiewicz, B. et al., "Supplementary Materials for Virtual typing by people with tetraplegia using a self-calibrating intracortical brain-computer interface," Science Translational Medicine, vol. 7, No. 313, (Nov. 11, 2015), 26 pages.
Jarosiewicz, B. et al., "Virtual typing by people with tetraplegia using a self-calibrating intracortical brain-computer interface," Science Translational Medicine, vol. 7, No. 313, (Nov. 11, 2015), 11 pages.
Jilge, B. et al., "Initiating extension of the lower limbs in subjects with complete spinal cord injury by epidural lumbar cord stimulation", Exp Brain Res., vol. 154, (2004), pp. 308-326.
Johnson, W. L. et al., "Application of a Rat Hindlimb Model: A Prediction of Force Spaces Reachable Through Stimulation of Nerve Fascicles," IEEE Transactions on Bio-Medical Engineering, vol. 58, No. 12, Available Online Jan. 17, 2011, (Dec. 2011), 11 pages.
Jones, D. R. et al., "Efficient Global Optimization of Expensive Black-Box Functions", Journal of Global Optimization, vol. 13, (1998), pp. 455-492.
Jones, K. E. et al., "Computer Simulation of the Responses of Human Motoneurons to Composite 1A EPSPS: Effects of Background Firing Rate," The Journal of Physiology, vol. 77, No. 1, (1997), 16 pages.
JP Office Action dated Aug. 21, 2023 in Application No. JP2021-510130 with English Translation.
JP Office Action dated Feb. 17, 2023 in Application No. JP2019-539960 with English translation.
JP Office Action dated Jul. 18, 2023 in Application No. JP2021-509772 with English translation.
JP Office Action dated Sep. 4, 2023, in Application No. JP2021-188658 with English translation.
Kakulas, B., "A Review of the Neuropathology of Human Spinal Cord Injury with Emphasis on Special Features," Proceedings of the Donald Munro Memorial Lecture at the American Paraplegia Society 44th Annual Conference, Las Vegas, Nevada, (Sep. 9, 1998), 6 pages.
Kirkwood, P., "Neuronal Control of Locomotion: From Mollusc to Man—G.N. Orlovsky, T.G. Deliagina and S. Grillner. Oxford University Press, Oxford, 1999. ISBN 0198524056 (Hbk), 322 pp.," Clinical Neurophysiology, vol. 111, No. 8, Published Online Jul. 17, 2000, (Aug. 1, 2000), 2 pages.
Kleinberg, R. et al., "Multi-armed bandits in metric spaces", In STOC, Computer and Automation Research Institute of the Hungarian Academy of Sciences, Budapest, Hungary, (2008), pp. 681-690.
Kocsis, L. et al. "Bandit Based Monte-Carlo Planning", European Conference on Machine Learning, Springer, Berlin, Heidelberg, (Sep. 2006), pp. 282-293.
Krassioukov, A. et al., "A Systematic Review of the Management of Autonomic Dysreflexia Following Spinal Cord Injury," Archives of Physical Medicine and Rehabilitation, vol. 90, No. 4, Apr. 2009, 27 pages.
Krassioukov, A. et al., "A Systematic Review of the Management of Orthostatic Hypotension Following Spinal Cord Injury," Archives of Physical Medicine and Rehabilitation, vol. 90, No. 5, May 2009, 22 pages.
Krause, A. et al. "Contextual Gaussian Process Bandit Optimization", In Advances in Neural Information Processing Systems (NIPS), (2011), 9 pages.
Krause, A. et al., "Near-optimal Nonmyopic Value of Information in Graphical Models", In UAI, (2005), 8 pages.
Krause, A. et al. "Near-Optimal Sensor Placements in Gaussian Processes: Theory, Efficient Algorithms and Empirical Studies", Journal of Machine Learning Research (JMLR), vol. 9, (Feb. 2008), pp. 235-284.
Kwakkel, G. et al., "Effects of Robot-assisted therapy on upper limb recovery after stroke: A Systematic Review," Neurorehabilitation and Neural Repair, vol. 22, No. 2, Published Online Sep. 17, 2007, (Mar. 2008), 11 pages.
Lavrov, I. et al., "Epidural Stimulation Induced Modulation of Spinal Locomotor Networks in Adult Spinal Rats," Journal of Neuroscience, vol. 28, No. 23, (Jun. 4, 2008), 8 pages.
Liu, J. et al., "Stimulation of the Parapyramidal Region of the Neonatal Rat Brain Stem Produces Locomotor-Like Activity Involving Spinal 5-HT7 and 5-HT2A Receptors", Journal of Neurophysiology, vol. 94, No. 2, Published Online May 4, 2005, (Aug. 1, 2005), 13 pages.
Lizotte, D. et al., "Automatic gait optimization with Gaussian process regression", In IJCAI, (2007), pp. 944-949.
Lovely, R. et al., "Effects of Training on the Recovery of Full-Weight-Bearing Stepping in the Adult Spinal Cat," Experimental Neurology, vol. 92, No. 2, (May 1986), 15 pages.

(56) References Cited

OTHER PUBLICATIONS

Lozano, A. et al., "Probing and Regulating Dysfunctional Circuits Using Deep Brain Stimulation," Neuron, vol. 77, No. 3, (Feb. 6, 2013), 19 pages.
Mcintyre, C. C. et al., "Modeling the Excitability of Mammalian Nerve Fibers: Influence of Afterpotentials on the Recovery Cycle," Journal of Neurophysiology, vol. 87, No. 2, (Feb. 2002), 12 pages.
Minassian et al., "Mechanisms of rhythm generation of the human lumbar spinal cord in repose to tonic stimulation without and with step-related sensory feedback", Biomed Tech, vol. 58, (Suppl. 1), (2013), 3 pages.
Minassian, K. et al., "Human lumbar cord circuitries can be activated by extrinsic tonic input to generate locomotor-like activity", Human Movement Science, vol. 26, No. 2, (2007), pp. 275-295.
Minassian, K. et al., "Neuromodulation of lower limb motor control in restorative neurology", Clinical Neurology and Neurosurgery, vol. 114, (2012), pp. 489-497.
Minassian, K. et al., "Peripheral and Central Afferent Input to the Lumbar Cord", Biocybernetics and Biomedical Engineering, vol. 25, No. 3, (2005), pp. 11-29.
Minassian, K. et al., "Stepping-like movements in humans with complete spinal cord injury induced by epidural stimulation of the lumbar cord: electromyographic study of compound muscle action potentials", Spinal Cord, vol. 42, (2004), pp. 401-416.
Minev, I. R. et al., "Electronic dura mater for long-term multimodal neural interfaces," Science Magazine, vol. 347, No. 6218, (Jan. 9, 2015), 64 pages.
Minoux, M., Accelerated greedy algorithms for maximizing submodular set functions. Optimization Techniques, LNCS, (1978), pp. 234-243.
Moraud, E. et al., "Mechanisms Underlying the Neuromodulation of Spinal Circuits for Correcting Gait and Balance Deficits after Spinal Cord Injury," Neuron, vol. 89, No. 4, Feb. 17, 2016, Published Online Feb. 4, 2016, 15 pages.
Murg, M et al., "Epidural electric stimulation of posterior structures of the human lumbar spinal cord: 1. Muscle twitches—a functional method to define the site of stimulation", Spinal Cord, vol. 38, (2000), pp. 394-402.
Musienko, P. et al., "Combinatory Electrical and Pharmacological Neuroprosthetic Interfaces to Regain Motor Function After Spinal Cord Injury," IEEE Transactions on Biomedical Engineering, vol. 56, No. 11, Published Online Jul. 24, 2009, (Nov. 2009), 5 pages.
Musienko, P. et al., "Controlling specific locomotor behaviors through multidimensional monoaminergic modulation of spinal circuitries," The Journal of Neuroscience, vol. 31, No. 25, (Jun. 22, 2011), 15 pages.
Musienko, P. et al. "Multi-system neurorehabilitative strategies to restore motor functions following severe spinal cord injury," Experimental Neurology, vol. 235, No. 1, Published Online Sep. 7, 2011, (May 2012), 10 pages.
Musselman, K. et al., "Spinal Cord Injury Functional Ambulation Profile: A New Measure of Walking Ability," Neurorehabilitation and Neural Repair, vol. 25, No. 3, Published Online Feb. 25, 2011, (Mar. 2011), 9 pages.
Nandra, M. S. et al., "A wireless microelectrode implant for spinal cord stimulation and recording in rats", Presentation Abstract, 2013, 104 Pages.
Nessler, J. et al., "A Robotic Device for Studying Rodent Locomotion After Spinal Cord Injury," IEEE Transactions on Neural Systems and Rehabilitation Engineering, vol. 13, No. 4, (Dec. 12, 2005), 10 pages.
Pearson, K. G., "Generating the walking gait: role of sensory feedback," Progress in Brain Research, vol. 143, Chapter 12, Published Online Nov. 28, 2003, (2004), 7 pages.
Phillips, A. et al., "Contemporary Cardiovascular Concerns after Spinal Cord Injury: Mechanisms, Maladaptations, and Management," Journal of Neurotrama, vol. 32, No. 24, Dec. 15, 2015, 17 pages.
Phillips, A. et al., "Perturbed and spontaneous regional cerebral blood flow responses to changes in blood pressure after high-level spinal cord injury: the effect of midodrine," Journal of Applied Physiology, vol. 116, No. 6, Mar. 15, 2014, Available Online Jan. 16, 2014, 9 pages.
Phillips, A. et al., "Regional neurovascular coupling and cognitive performance in those with low blood pressure secondary to high-level spinal cord injury: improved by alpha-1 agonist midodrine hydrochloride," Journal of Cerebral Blood Flow & Metabolism, vol. 34, No. 5, May 2014, 8 pages.
Pratt, G. et al., "Stiffness Isn't Everything," Proceedings of the Fourth International Symposium on Experimental Robotics, (Jun. 30, 1995), 6 pages.
Pratt, J. et al., "Series elastic actuators for high fidelity force control," Industrial Robot: An International Journal, vol. 29, No. 3, Available as Early as Jan. 1, 2002, 13 pages.
Prochazka, A. et al., "Ensemble firing of muscle afferents recorded during normal locomotion in cats," The Journal of Physiology, vol. 507, No. 1, (Feb. 15, 1998), 12 pages.
Prochazka, A. et al., "Models of ensemble filing of muscle spindle afferents recorded during normal locomotion in cats," The Journal of Physiology, vol. 507, No. 1, (Feb. 15, 1998), 15 pages.
Pudo, D. et al., "Estimating Intensity Fluctuations in High Repetition Rate Pulse Trains Generated Using the Temporal Talbot Effect", IEEE Photonics Technology Letters, vol. 18, No. 5, (Mar. 1, 2006), 3 pages.
Rasmussen, C. E. et al., "Gaussian Processes for Machine Learning (GPML) Toolbox", The Journal of Machine Learning Research, vol. 11, (2010), pp. 3011-3015.
Rasmussen, C. E. et al., "Gaussian Processes for Machine Learning", The MIT Press, Cambridge, Massachusetts, (2006), 266 pages.
Rasmussen, C. E. "Gaussian Processes in Machine Learning", L.N.A.I., vol. 3176, (2003) pp. 63-71.
Rattay, F. et al., "Epidural electrical stimulation of posterior structures of the human lumbosacral cord: 2. Quantitative analysis by computer modeling", Spinal Cord, vol. 38, (2000), pp. 473-489.
Reinkensmeyer, D. et al., "Tools for understanding and optimizing robotic gait training," Journal of Rehabilitation Research & Development, vol. 43, No. 5, (Aug. 2006), 14 pages.
Rejc, E. et al., "Effects of Lumbosacral Spinal Cord Epidural Stimulation for Standing after Chronic Complete Paralysis in Humans," PLoS One, vol. 10, No. 7, (Jul. 24, 2015), 20 pages.
Robbins, H., "Some Aspects of the Sequential Design of Experiments", Bull. Amer. Math. Soc., vol. 58, (1952), pp. 527-535.
Rosenzweig, E. et al., "Extensive Spontaneous Plasticity of Corticospinal Projections After Primate Spinal Cord Injury", Nature Neuroscience, vol. 13, No. 12, Published Online Nov. 14, 2010, (Dec. 2010), 19 pages.
Ryzhov, I. O. et al., "The knowledge gradient algorithm for a general class of online learning problems", Operations Research, vol. 60, No. 1, (2012), pp. 180-195.
Sayenko, D. et al., "Neuromodulation of evoked muscle potentials induced by epidural spinal-cord stimulation in paralyzed individuals," Journal of Neurophysiology, vol. 111, No. 5, Published Online Dec. 11, 2013, (2014), 12 pages.
Shamir, R. R. et al., "Machine Learning Approach to Optimizing Combined Stimulation and Medication Therapies for Parkinson's Disease," Brain Stimulation, vol. 8, No. 6, Published Online Jun. 15, 2015, (Nov. 2015), 22 pages.
Srinivas, N. et al., "Gaussian process optimization in the bandit setting: No regret and experimental design", In Proceedings of the 27th International Conference on Machine Learning, (2010), 17 pages.
Steward, O. et al., "False Resurrections: Distinguishing Regenerated from Spared Axons in the Injured Central Nervous System", The Journal of Comparative Neurology, vol. 459, No. 1, (Apr. 21, 2003), 8 pages.
Stienen, A. H. A. et al., "Analysis of reflex modulation with a biologically realistic neural network," Journal of Computer Neuroscience, vol. 23, No. 3, Available Online May 15, 2007, (Dec. 2007), 16 pages.
Sun, F. et al., "Sustained axon regeneration induced by co-deletion of PTEN and SOCS3", Nature, vol. 480, No. 7377, Published Online Nov. 6, 2011, (Dec. 15, 2011), 12 pages.

(56) References Cited

OTHER PUBLICATIONS

Takeoka, A. et al., "Muscle Spindle Feedback Directs Locomotor Recovery and Circuit Reorganization after Spinal Cord Injury", Cell, vol. 159, No. 7, (Dec. 18, 2014), 27 pages.
Tenne, Y. et al., "Computational Intelligence in Expensive Optimization Problems", vol. 2 of Adaptation, Learning, and Optimization, Springer, Berlin Heidelberg, (2010), pp. 131-162.
Timozyk, W. et al., "Hindlimb loading determines stepping quantity and quality following spinal cord transection," Brain Research, vol. 1050, No. 1-2, Published Online Jun. 24, 2005, (Jul. 19, 2005), 10 pages.
U.S. Final Office Action dated Apr. 6, 2023 in U.S. Appl. No. 16/615,765.
U.S. Final Office Action dated Jun. 1, 2023 in U.S. Appl. No. 16/479,201.
U.S. Non-Final Office Action dated Aug. 16, 2023, in U.S. Appl. No. 17/269,970.
U.S. Non-Final Office Action dated Sep. 13, 2023, in U.S. Appl. No. 17/407,043.
Vallery, H. et al., "Compliant Actuation of Rehabilitation Robots," IEEE Robotics & Automation Magazine, vol. 15, No. 3, (Sep. 12, 2008), 10 pages.
Van Den Brand, R. et al., "Restoring Voluntary Control of Locomotion after Paralyzing Spinal Cord Injury," Science Magazine, vol. 336, No. 6085, (Jun. 1, 2012), 5 pages.
Wan, D. et al., "Life-threatening outcomes associated with autonomic dysreflexia: A clinical review," Journal of Spinal Cord Medicine, vol. 37, No. 1, (Jan. 2014), 9 pages.
Wenger, N. et al. "Closed-loop neuromodulation of spinal sensorimotor circuits controls refined locomotion after complete spinal cord injury" Sci Transl Med. Sep. 24, 2014, vol. 6, Issue 255, (10 pages).
Wenger, N. et al., "Spatiotemporal neuromodulation therapies engaging muscle synergies improve motor control after spinal cord injury," Natural Medicine, vol. 22, No. 2, Available Online Jan. 18, 2016, (Feb. 2016), 33 pages.
Wenger, N. et al., "Supplementary Materials for Closed-loop neuromodulation of spinal sensorimotor circuits controls refined locomotion after complete spinal cord injury," Science Translational Medicine, vol. 6, No. 255, Sep. 24, 2014, 14 pages.
Wernig, A. et al., "Laufband locomotion with body weight support improved walking in persons with severe spinal cord injuries", Paraplegia, vol. 30, No. 4, (Apr. 1992), 10 pages.
Wernig, A., "Ineffectiveness of Automated Locomotor Training," Archives of Physical Medicine and Rehabilitation, vol. 86, No. 12, (Dec. 2005), 2 pages.
Wessels, M. et al., "Body Weight-Supported Gait Training for Restoration of Walking in People With an Incomplete Spinal Cord Injury: A Systematic Review," Journal of Rehabilitation Medicine, vol. 42, No. 6, (Jun. 2010), 7 pages.
Widmer, C. et al., Inferring latent task structure for multitask learning by multiple kernel learning, BMC Bioinformatics, vol. 11, (Suppl 8:S5), (2010), 8 pages.
Winter, D. A. et al., "An integrated EMG/biomechanical model of upper body balance and posture during human gait," Progress in Brain Research, vol. 97, Ch. 32, Available as Early as Jan. 1, 1993, (1993), 9 pages.
Wirz, M. et al., "Effectiveness of automated locomotor training in patients with acute incomplete spinal cord injury: A randomized controlled multicenter trial," BMC Neurology, vol. 11, No. 60, (May 27, 2011), 9 pages.
Yakovenko, S. et al., "Spatiotemporal Activation of Lumbosacral Motoneurons in the Locomotor Step Cycle," Journal of Neurophysiology, vol. 87, No. 3, (Mar. 2002), 12 pages.
Zhang, T. C. et al., "Mechanisms and models of spinal cord stimulation for the treatment of neuropathic pain," Brain Research, vol. 1569, Published Online May 4, 2014, (Jun. 20, 2014), 13 pages.
Zorner, B. et al., "Profiling locomotor recovery: comprehensive quantification of impairments after CNS damage in rodents," Nature Methods, vol. 7, No. 9, Published Online Aug. 15, 2010, (Sep. 2010), 11 pages.

* cited by examiner

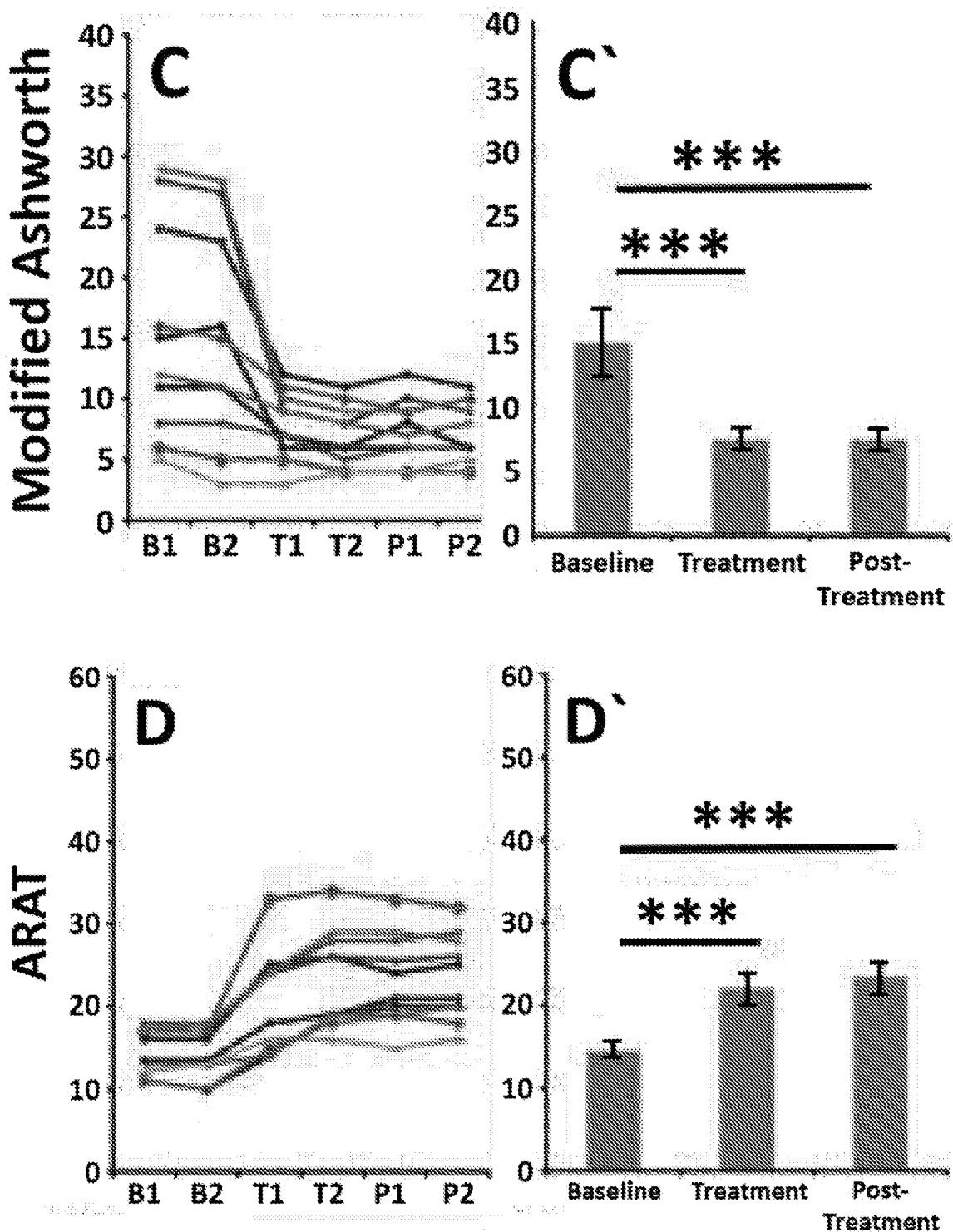
Fig. 5, cont'd.

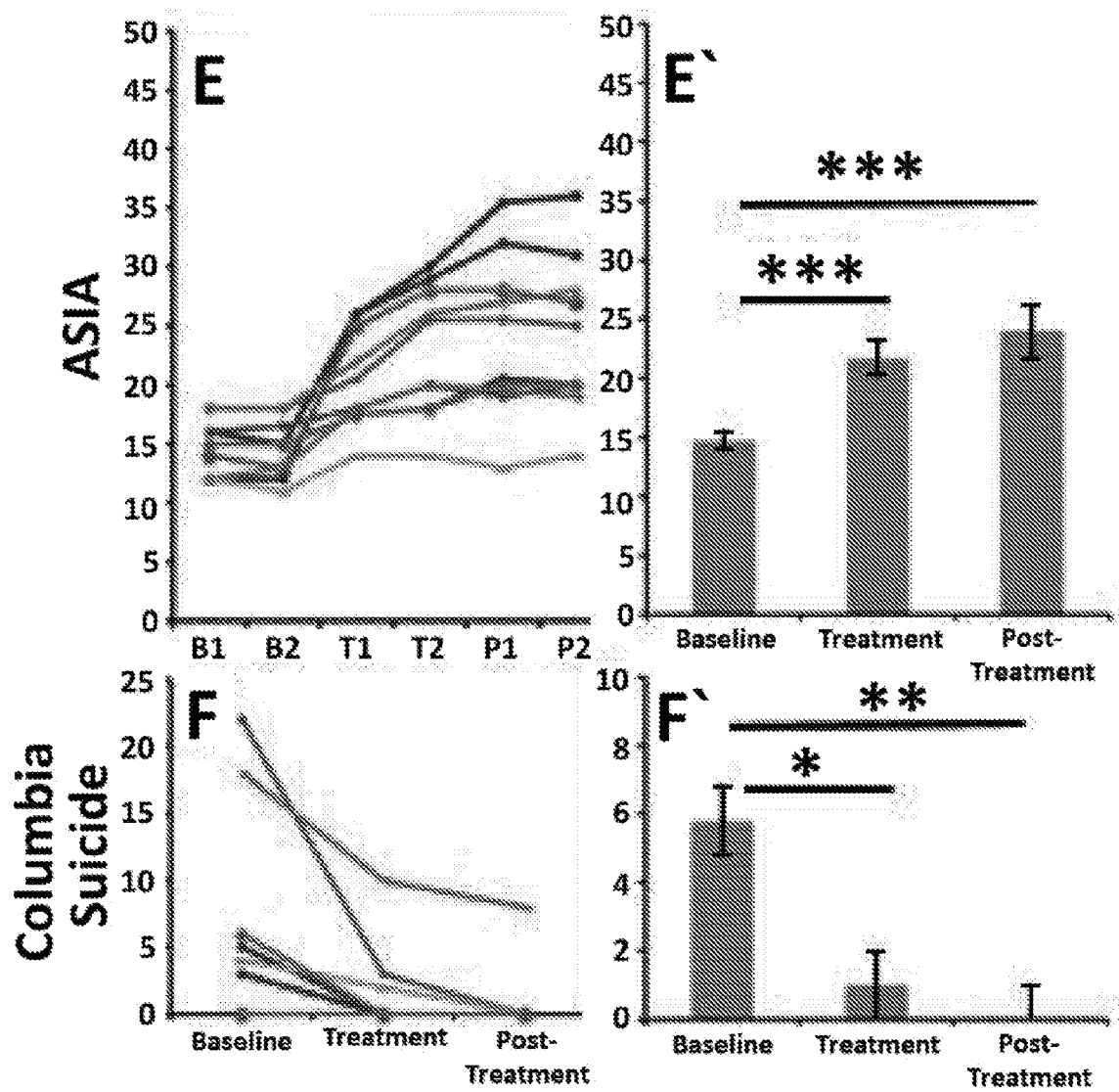
Fig. 5, cont'd.

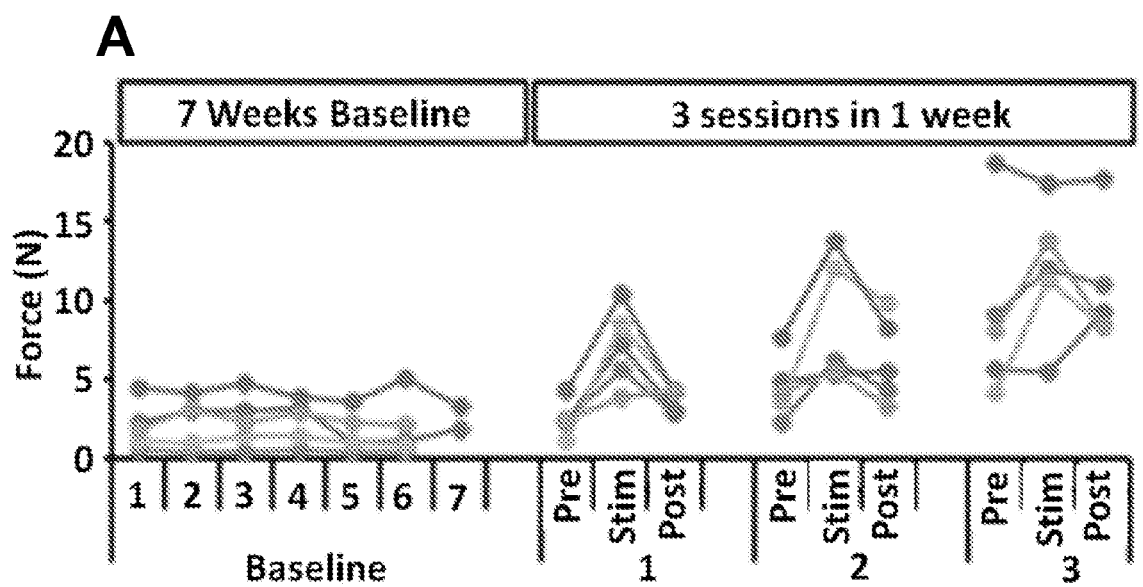
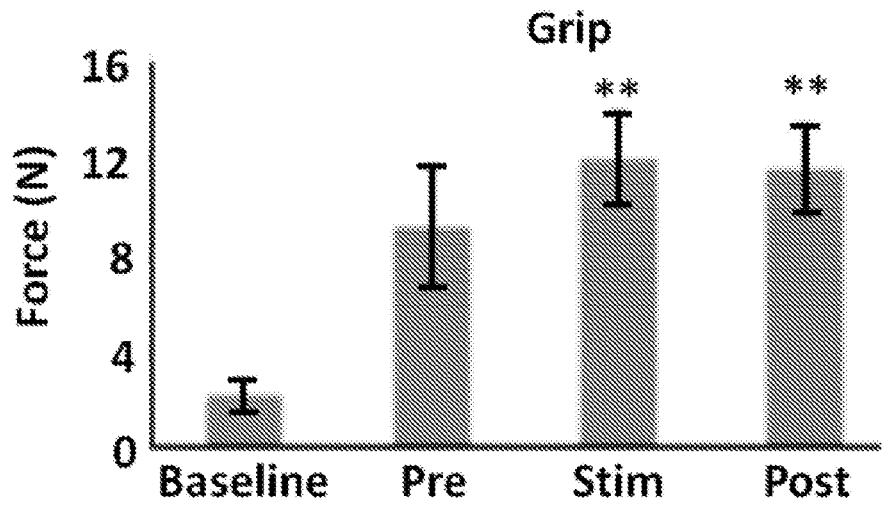
*Fig. 6*

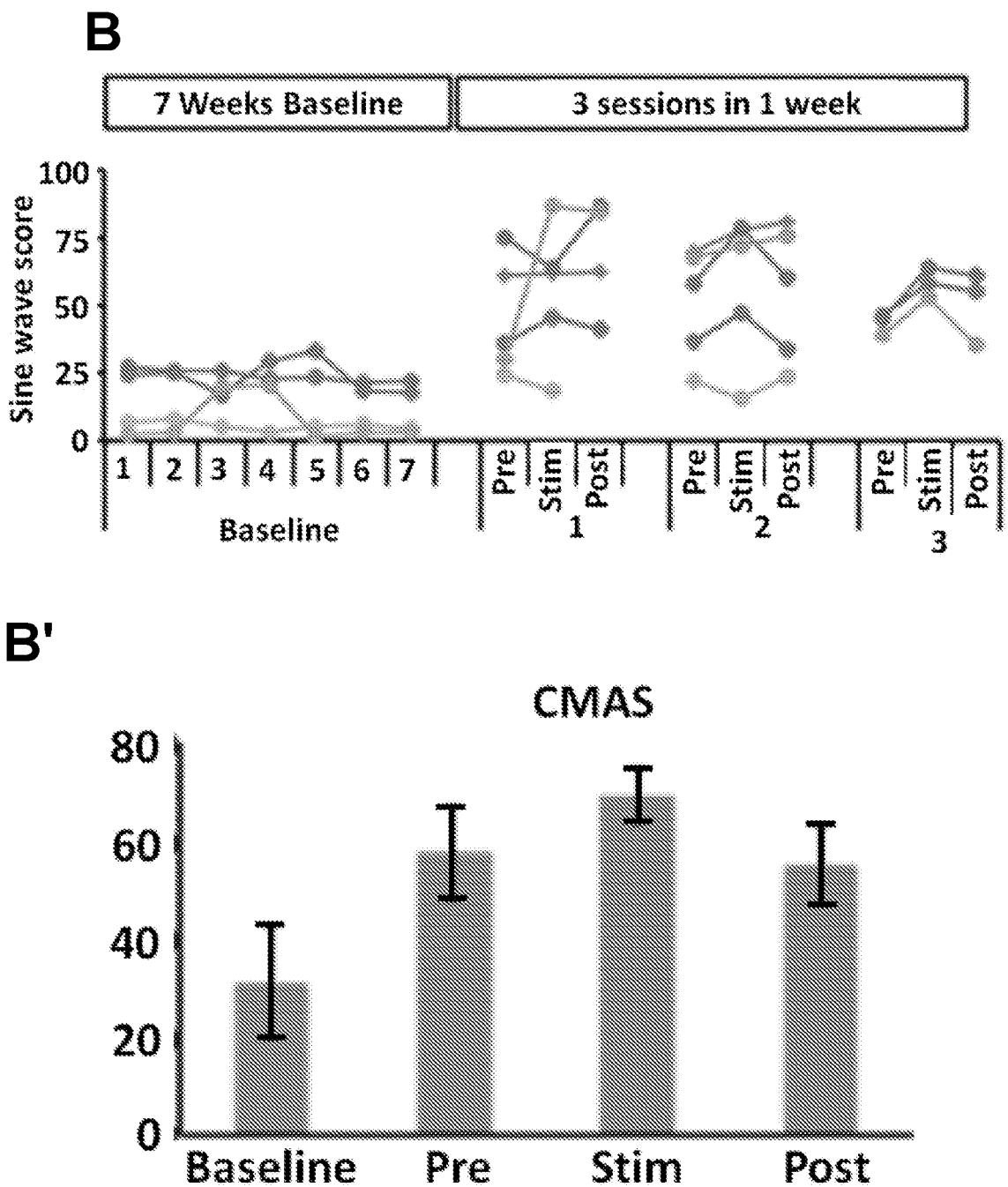
Fig. 6, cont'd.

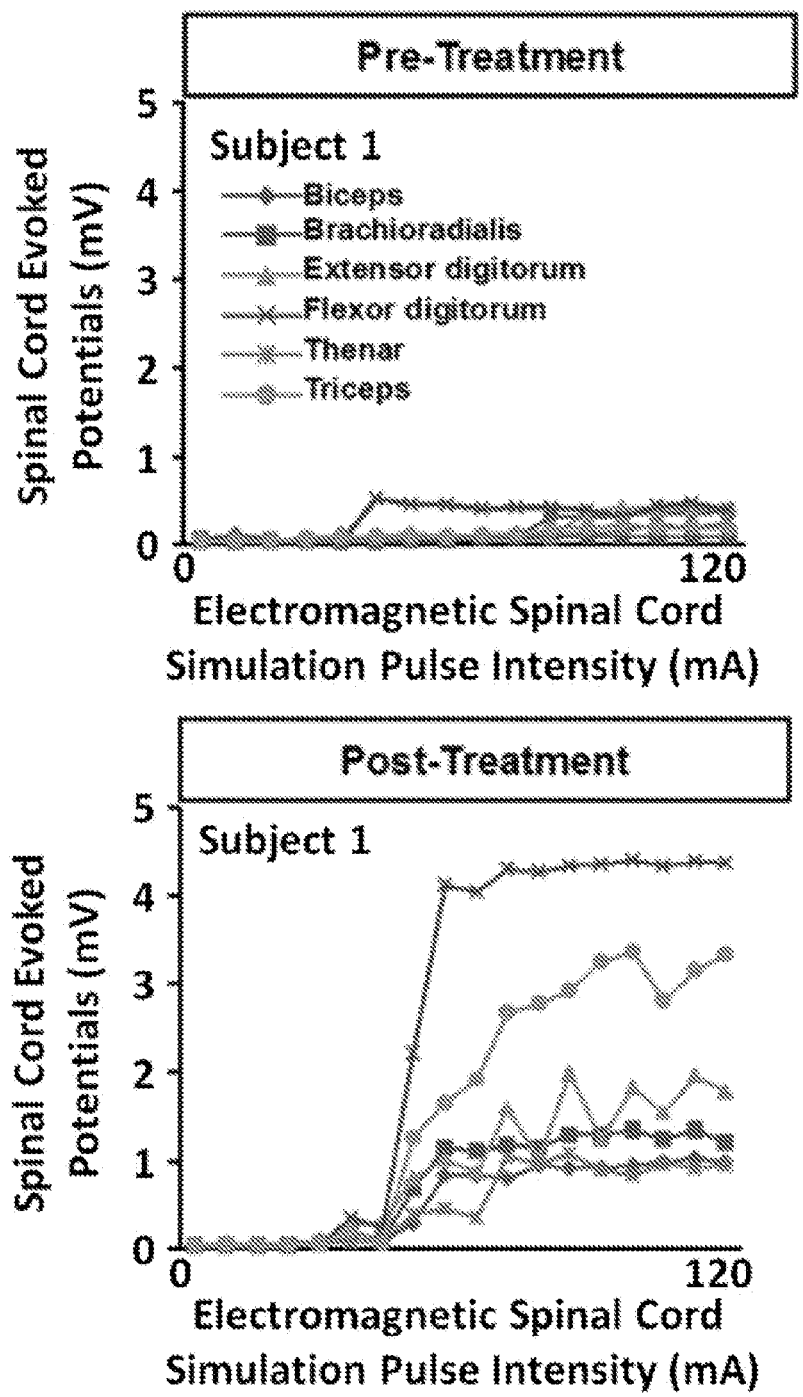
Fig. 7,

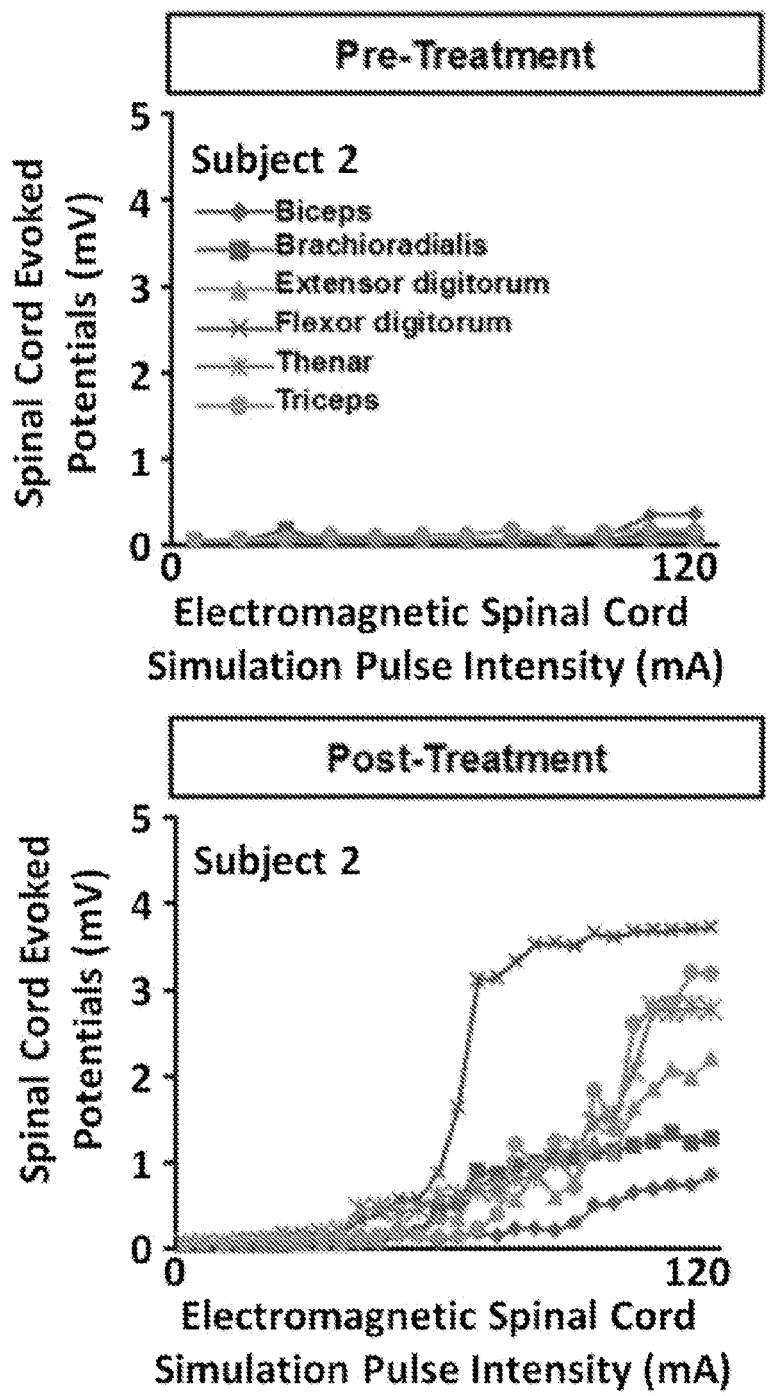
Fig. 7, cont'd.

NON-INVASIVE SPINAL CORD STIMULATION FOR NERVE ROOT PALSY, CAUDA EQUINA SYNDROME, AND RESTORATION OF UPPER EXTREMITY FUNCTION

CROSS-REFERENCE TO RELATED APPLICATIONS

This application is a U.S. 371 of PCT/US2019/047777, filed on Aug. 22, 2019, which claims priority to and benefit of U.S. Ser. No. 62/772,022, filed on Nov. 27, 2018, and of U.S. Ser. No. 62/722,095, filed on Aug. 23, 2018, all of which are incorporated herein by reference in their entirety for all purposes.

STATEMENT OF GOVERNMENTAL SUPPORT

[Not Applicable]

BACKGROUND

Spinal diseases are among the most frequent causes of discomfort and disability in patients in the United States and elsewhere around the world, frequently requiring surgical intervention for relief. Back and/or leg pain resulting from spinal disease is frequently the result of spinal stenoses that result from narrowing of one or more nerve passages in the spine, most often in the upper (cervical) spine or the lower (lumbar) spine. Such narrowing can apply pressure to the spinal nerves which can cause a variety of symptoms, including pain, cramping, numbness in the legs, back, neck, shoulders, or arms. In some cases, there will be a loss of sensation and/or motor function in the arms or legs and in other cases, bladder or bowel function can be adversely impacted.

Pain in the lower back and legs often arises from spinal stenosis in the lumbar spine when the spinal canal or foramen (the area where nerve roots exit the spinal canal) is stenosed applying pressure to a spinal nerve, such as a transversing nerve, an exiting nerve, or nerves of the cauda equina.

The risk of C5 palsies occurring following anterior, posterior, or circumferential spine surgery varies from 0% to 30% (see, e.g., Currier (2012) *Spine: E*328-334). Although there are multiple theories as to the etiology of these injuries, cord migration with resultant traction injury to the C5 nerve roots, particularly following surgery at the C4-C5 level, predominates. Despite the increased availability of multiple treatment strategies, if postoperative magnetic resonance (MIR) studies show no new focal lesion (e.g. hematomas/other), most would recommend nonoperative management as the majority of deficits spontaneously resolve over 3-24 postoperative months.

While mild symptoms of spinal stenosis in the lumbar region and elsewhere can frequently be treated with pain relievers, physical therapy, braces, or other non-surgical approaches, more severe cases frequently require surgical intervention. Conventional surgical interventions include laminotomy and medial facetectomy, where small portions of the lamina and superior articular process are removed to relieve pressure on the traversing nerve roots. Foraminotomy is an alternative procedure which removes a small portion of the superior articular process and lamina to enlarge the space surrounding the exiting nerve roots.

While often effective, each of these treatment protocols generally requires surgical access to the spine which in turn requires cutting and displacing major muscles and ligaments surrounding the spine. Such procedures are necessarily performed under a general anesthesia and may require hospital stays. Recovery times vary from weeks to months and extensive rehabilitation is usually necessary.

There are no known commercially available products that attempts to access the nerve root or spinal cord non-invasively to treat injury related to nerve roots (nerve root palsy or cauda equine syndrome). There are devices such as FES units that attempts to access the local site or muscles to treat weakness. However the spinal cord or nerve roots are not accessed and generally results are not effective and disappointing.

Similarly, little progress has been made in developing any intervention that will meaningfully enhance upper limb function after a spinal cord injury (SCI). The current state of upper limb management for SCI patients is not ideal. There is complex neurophysiology related to the control of the upper limb orchestrated at the cervical spinal cord level. Yet the present-day solution is to address the symptoms of SCI at the muscles of the upper limb or bypass them. This will not likely yield meaningful recovery of arm and hand function after SCI because the muscles do not possess the complex sensorimotor processing ability necessary to perform coordinated volitional movements.

Many spinal cord injuries involve the cervical spine, yet they are often incomplete and the local spinal cord circuitry for arm and hand control may be spared. Importantly, there is no current treatment that can restore hand strength, and even incremental improvements in hand function can have a substantial impact in the lives of those with tetraplegia.

Definitions

As used herein "electrical stimulation" or "stimulation" means application of an electrical signal that may be either excitatory or inhibitory to a muscle or neuron and/or to groups of neurons and/or interneurons. It will be understood that an electrical signal may be applied to one or more electrodes with one or more return electrodes.

As used herein "magnetic stimulation", "electromagnetic spinal cord stimulation" or "EMSS" refers to the use of a varying magnetic field to induce an electrical signal, e.g., in a neuron, that may be either excitatory or inhibitory to a muscle or neuron and/or to groups of neurons and/or interneurons.

The term "transcutaneous stimulation" or "transcutaneous electrical stimulation" or "cutaneous electrical stimulation" refers to electrical stimulation applied to the skin, and, as typically used herein refers to electrical stimulation applied to the skin in order to effect stimulation of the spinal cord or a region thereof. The term "transcutaneous electrical spinal cord stimulation" may also be referred to as "tSCS". The term "pcEmc" refers to painless cutaneous electrical stimulation.

The term "motor complete" when used with respect to a spinal cord injury indicates that there is no motor function below the lesion, (e.g., no movement can be voluntarily induced in muscles innervated by spinal segments below the spinal lesion.

The term "monopolar stimulation" refers to stimulation between a local electrode and a common distant return electrode.

The term "co-administering", "concurrent administration", "administering in conjunction with" or "administering in combination" when used, for example with respect to transcutaneous electrical stimulation, epidural electrical stimulation, and pharmaceutical administration, refers to administration of the transcutaneous electrical stimulation and/or epidural electrical stimulation and/or pharmaceutical such that various modalities can simultaneously achieve a physiological effect on the subject. The administered modalities need not be administered together, either temporally or at the same site. In some embodiments, the various "treatment" modalities are administered at different times. In some embodiments, administration of one can precede administration of the other (e.g., drug before electrical and/or magnetic stimulation or vice versa). Simultaneous physiological effect need not necessarily require presence of drug and the electrical and/or magnetic stimulation at the same time or the presence of both stimulation modalities at the same time. In some embodiments, all the modalities are administered essentially simultaneously.

The phrase "spinal cord stimulation" as used herein includes stimulation of any spinal nervous tissue, including spinal neurons, accessory neuronal cells, nerves, nerve roots, nerve fibers, or tissues, that are associated with the spinal cord. It is contemplated that spinal cord stimulation may comprise stimulation of one or more areas associated with a cervical vertebral segment.

As used herein, "spinal nervous tissue" refers to nerves, neurons, neuroglial cells, glial cells, neuronal accessory cells, nerve roots, nerve fibers, nerve rootlets, parts of nerves, nerve bundles, mixed nerves, sensory fibers, motor fibers, dorsal root, ventral root, dorsal root ganglion, spinal ganglion, ventral motor root, general somatic afferent fibers, general visceral afferent fibers, general somatic efferent fibers, general visceral efferent fibers, grey matter, white matter, the dorsal column, the lateral column, and/or the ventral column associated with the spinal cord. Spinal nervous tissue includes "spinal nerve roots," that comprise any one or more of the 31 pairs of nerves that emerge from the spinal cord. Spinal nerve roots may be cervical nerve roots, thoracic nerve roots, and lumbar nerve roots.

SUMMARY

In various embodiments, methods are provided for applying spinal cord stimulation with and without selective pharmaceuticals to improve motor function, and/or to improve motor control, and/or to improve sensory function, and/or to reduce pain in subjects with nerve root palsies (e.g., radiculopathies including, but not limited to cauda equina syndrome) and/or to improve motor function of upper and/or lower extremities in subjects with impaired extremity motor function due to spinal cord or brain injury or pathology.

Various embodiments contemplated herein may include, but need not be limited to, one or more of the following:

Embodiment 1: A method of treating a nerve root disorder (radiculopathy) in a subject, said method comprising:
neuromodulating the brain stem and/or suboccipital spinal cord, and/or the cervical spinal cord or a region thereof, and/or the thoracic spinal cord or a region thereof, and/or the lumbar spinal cord or a region thereof, of said subject with a magnetic stimulator at a frequency and intensity sufficient to regulate and/or to restore function lost by said nerve root disorder; and/or
neuromodulating the brain stem and/or suboccipital spinal cord, and/or the cervical spinal cord, and/or the thoracic spinal cord, and/or the lumbar spinal cord, of said subject by administering transcutaneous electrical stimulation to the brain stem and/or suboccipital spinal cord, and/or the cervical spinal cord or a region thereof, and/or the thoracic spinal cord or a region thereof, and/or the lumbar spinal cord or a region thereof at a frequency and intensity sufficient to restore function lost by said nerve root disorder; and/or
neuromodulating the brain stem and/or suboccipital spinal cord, and/or the cervical spinal cord, and/or the thoracic spinal cord, and/or the lumbar spinal cord, of said subject by administering epidural electrical stimulation to the brain stem and/or suboccipital spinal cord, and/or cervical spinal cord or a region thereof, and/or thoracic spinal cord or a region thereof, and/or the lumbar spinal cord or a region thereof at a frequency and intensity sufficient to restore function lost by said nerve root disorder.

Embodiment 2: The method of embodiment 1, wherein said nerve root disorder results from a spinal stenosis.

Embodiment 3: The method of embodiment 2, wherein said nerve root disorder results from a spinal stenosis that applies pressure to a transversing spinal nerve, an exiting spinal nerve, or a nerve of the cauda equine.

Embodiment 4: The method of embodiment 2, wherein said nerve root disorder results from a stenosis in the lumbar spine.

Embodiment 5: The method of embodiment 1, wherein said radiculopathy comprises an upper limb radiculopathy.

Embodiment 6: The method of embodiment 4, wherein said upper limb radiculopathy comprises a C7 radiculopathy.

Embodiment 7: The method of embodiment 4, wherein said upper limb radiculopathy comprises a C6 radiculopathy.

Embodiment 8: The method of embodiment 4, wherein said nerve root disorder comprises a C5 palsy.

Embodiment 9: The method of embodiment 8, wherein said nerve root palsy comprises a palsy following anterior cervical discectomy and fusion (ACDF).

Embodiment 10: The method of embodiment 1, wherein said radiculopathy comprises a lower limb radiculopathy.

Embodiment 11: The method of embodiment 10, wherein said radiculopathy comprises an L4 radiculopathy.

Embodiment 12: The method of embodiment 10, wherein said radiculopathy comprises an L5 radiculopathy.

Embodiment 13: The method of embodiment 10, wherein said radiculopathy comprises an S1 radiculopathy.

Embodiment 14: The method of embodiment 1, wherein said nerve root palsy comprises cauda equina syndrome.

Embodiment 15: The method of embodiment 14, wherein said nerve root palsy comprises cauda equine syndrome due to herniation of lumbar intervertebral discs.

Embodiment 16: The method of embodiment 14, wherein said nerve root palsy comprises cauda equine syndrome due to abnormal growths (tumor or cancer) adjacent to the lower spinal cord.

Embodiment 17: The method of embodiment 14, wherein said nerve root palsy comprises cauda equine syndrome due to localized infection near the spinal cord.

Embodiment 18: The method of embodiment 14, wherein said nerve root palsy comprises cauda equine syndrome due to epidural abscess, and/or localized bleeding (epidural hematoma) causing pressure on the spinal cord in the low back.

Embodiment 19: The method according to any one of embodiments 1-18, wherein said method restores strength.

Embodiment 20: The method according to any one of embodiments 1-19, wherein said method restores motor function.

Embodiment 21: The method according to any one of embodiments 1-20, wherein said method restores locomotion.

Embodiment 22: The method according to any one of embodiments 1-21, wherein said method restores continence.

Embodiment 23: The method according to any one of embodiments 1-22, wherein said method restores sexual function.

Embodiment 24: The method according to any one of embodiments 1-23, wherein said method reduces or eliminates pain associated with said nerve root disorder.

Embodiment 25: The method according to any one of embodiments 1-18, wherein said neuromodulating comprises neuromodulating a dorsal surface of the brainstem or spinal cord.

Embodiment 26: The method according to any one of embodiments 1-18, wherein said neuromodulating comprises neuromodulating a ventral surface of the brainstem or spinal cord.

Embodiment 27: The method according to any one of embodiments 1-26, wherein said method comprises administering transcutaneous stimulation to the suboccipital and/or brain stem or a region thereof, to the cervical spinal cord or a region thereof, and/or the thoracic spinal cord or a region thereof, and/or the lumbar spinal cord or a region thereof.

Embodiment 28: The method of embodiment 27, wherein said method comprises administering transcutaneous stimulation to the spinal cord in the suboccipital or brain stem or a region thereof.

Embodiment 29: The method according to any one of embodiments 27-28, wherein said method comprises administering transcutaneous stimulation to the cervical spinal cord or a region thereof.

Embodiment 30: The method of embodiment 29, wherein said transcutaneous electrical stimulation is applied over one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

Embodiment 31: The method of embodiment 30, wherein said transcutaneous electrical stimulation is applied over a cervical region comprising or consisting of a region comprising motor neurons the functions of which are deficient.

Embodiment 32: The method of embodiment 30, wherein said transcutaneous electrical stimulation is applied over a region comprising or consisting of C4-C5 or a region therein.

Embodiment 33: The method of embodiment 32, wherein said transcutaneous electrical stimulation is applied at C5.

Embodiment 34: The method according to any one of embodiments 27-33, wherein said method comprises administering transcutaneous stimulation to the thoracic spinal cord or a region thereof.

Embodiment 35: The method of embodiment 34, wherein said transcutaneous electrical stimulation is applied over one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

Embodiment 36: The method of embodiment 35, wherein said transcutaneous electrical stimulation is applied over a thoracic region comprising or consisting of a region comprising motor neurons the functions of which are deficient.

Embodiment 37: The according to any one of embodiments 27-36, wherein said method comprises administering transcutaneous stimulation to the lumbar and/or sacral spinal cord or a region thereof.

Embodiment 38: The method of embodiment 37, wherein said transcutaneous electrical stimulation is applied over one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 39: The method of embodiment 37, wherein said transcutaneous electrical stimulation is applied over a lumbar and/or sacral region comprising or consisting of a region comprising motor neurons that the functions of which are deficient.

Embodiment 40: The method of embodiment 35, wherein said transcutaneous electrical stimulation is applied over one the coccyx.

Embodiment 41: The according to any one of embodiments 27-40, wherein said transcutaneous stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz, or at least about 1 kHz, or at least about 1.5 kHz, or at least about 2 kHz, or at least about 2.5 kHz, or at least about 5 kHz, or at least about 10 kHz.

Embodiment 42: The according to any one of embodiments 27-40, wherein said transcutaneous stimulation is at a frequency of about 30 Hz.

Embodiment 43: The method according to any one of embodiments 27-42, wherein said transcutaneous stimulation is at an intensity ranging from about 5 mA or about 10 mA up to about 500 mA, or from about 5 mA or about 10 mA up to about 400 mA, or from about 5 mA or about 10 mA up to about 300 mA, or from about 5 mA or about 10 mA up to about 200 mA, or from about 5 mA or about 10 mA to up about 150 mA, or from about 5 mA or about 10 mA up to about 50 mA, or from about 5 mA or about 10 mA up to about 100 mA, or from about 5 mA or about 10 mA up to about 80 mA, or from about 5 mA or about 10 mA up to about 60 mA, or from about 5 mA or about 10 mA up to about 50 mA.

Embodiment 44: The method according to any one of embodiments 27-43, wherein said transcutaneous stimulation comprises administering pulses having a width that ranges from about 1 msec, or from about 5 msec, or from about 10 msec, or from about 20 msec up to about 1,000 msec, or up to about 700 msec, or up to about 500 msec, or up to about 450 msec, or up to about 400 msec, or up to about 350 msec, or up to about 300 msec, or up to about 250 msec, or up to about 200 msec, or up to about 150 msec, or up to about 100 msec.

Embodiment 45: The method of embodiment 44, wherein said transcutaneous stimulation comprises administering pulses having a width that ranges from about 50, or from about 100, or from about 200, up to about 1000, or up to about 500, or up to about 400, or up to about 300, or up to about 250 microseconds.

Embodiment 46: The method of embodiment 44, wherein said transcutaneous stimulation comprises administering pulses having a width that ranges from about 200 to 500 microseconds, or is about 210 microseconds, or is about 450 microseconds.

Embodiment 47: The method according to any one of embodiments 27-46, wherein said transcutaneous stimulation is superimposed on a high frequency carrier signal.

Embodiment 48: The method of embodiment 47, wherein said high frequency carrier signal ranges from about 3 kHz, or about 5 kHz, or about 8 kHz up to about 100 kHz, or up to about 50 kHz, or up to about 40 kHz, or up to about 30 kHz, or up to about 20 kHz, or up to about 15 kHz.

Embodiment 49: The method of embodiment 48, wherein said high frequency carrier signal is about 15 kHz.

Embodiment 50: The method according to any one of embodiments 47-49, wherein said carrier frequency amplitude ranges from about 30 mA, or about 40 mA, or about 50 mA, or about 60 mA, or about 70 mA, or about 80 mA up to about 300 mA, or up to about 200 mA, or up to about 150 mA.

Embodiment 51: The method according to any one of embodiments 47-50, wherein said transcutaneous electrical stimulation is applied using a portable stimulator.

Embodiment 52: The method according to any one of embodiments 27-51, wherein said transcutaneous electrical stimulation is applied using a needle electrode.

Embodiment 53: The method of embodiment 52, wherein said needle electrode comprises a plurality of electrically conductive needles.

Embodiment 54: The method according to any one of embodiments 52-53, wherein needles comprising said needle electrode are of sufficient length to penetrate at least 70%, or at least 80%, or at least 90%), or at least 100%>through the stratum corneum of the skin when the electrode is attached to the surface of a human over the spinal cord.

Embodiment 55: The method according to any one of embodiments 52-54, wherein needles comprising said needle electrode are of a length that does not substantially penetrate subcutaneous tissue below the stratum corneum.

Embodiment 56: The method according to any one of embodiments 1-55, wherein said method comprises administering epidural stimulation to the suboccipital spinal cord or brainstem or a region thereof, and/or to the cervical spinal cord or a region thereof, and/or the thoracic spinal cord or a region thereof, and/or the lumbar spinal cord or a region thereof.

Embodiment 57: The method of embodiment 56, wherein said method comprises administering epidural electrical stimulation to the suboccipital spinal cord or brainstem, or a region thereof.

Embodiment 58: The method according to any one of embodiments 1-26, wherein said method comprises neuromodulating the suboccipital spinal cord or brainstem or a region thereof, and/or the cervical spinal cord or a region thereof, and/or the thoracic spinal cord or a region thereof, and/or the lumbar spinal cord or a region thereof, of said subject with a magnetic stimulator.

Embodiment 59: The method of embodiment 58, wherein said method comprises administering magnetic neural stimulation to the suboccipital spinal cord or brainstem or a region thereof, and/or to the cervical spinal cord or a region thereof.

Embodiment 60: The method of embodiment 59, wherein said method comprises administering magnetic neural stimulation to the suboccipital spinal cord or brainstem or a region thereof.

Embodiment 61: The method of embodiment 59, wherein said method comprises administering magnetic neural stimulation to a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

Embodiment 62: The method of embodiment 59, wherein said magnetic stimulation is applied over a suboccipital spinal cord or brainstem or a region thereof, and/or to cervical spinal cord or a region thereof comprising or consisting of a region comprising motor neurons that the functions of which are deficient.

Embodiment 63: The method according to any one of embodiments 58-62, wherein said method comprises administering magnetic neural stimulation to the thoracic spinal cord or a region thereof.

Embodiment 64: The method of embodiment 63, wherein said method comprises administering magnetic neural stimulation to a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

Embodiment 65: The method of embodiment 64, wherein said magnetic stimulation is applied over thoracic spinal cord or a region thereof comprising or consisting of a region comprising motor neurons that the functions of which are deficient.

Embodiment 66: The method according to any one of embodiments 58-65, wherein said method comprises administering magnetic neural stimulation to the lumbar and/or sacral spinal cord or a region thereof.

Embodiment 67: The method of embodiment 66, wherein said method comprises administering magnetic neural stimulation to a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 68: The method of embodiment 66, wherein said magnetic stimulation is applied over lumbar and/or sacral spinal cord or a region thereof comprising or consisting of a region comprising motor neurons that the functions of which are deficient.

Embodiment 69: The method of embodiment 66, wherein said method comprises administering magnetic neural stimulation to the coccyx.

Embodiment 70: The method according to any one of embodiments 58-69, wherein said stimulation is monophasic.

Embodiment 71: The method according to any one of embodiments 58-69, wherein said stimulation is biphasic.

Embodiment 72: The method according to any one of embodiments 58-69, wherein said stimulation is polyphasic.

Embodiment 73: The method according to any one of embodiments 58-72, wherein said magnetic stimulation produces a magnetic field of at least 1 tesla, or at least 2 tesla, or at least 3 tesla, or at least 4 tesla.

Embodiment 74: The method according to any one of embodiments 58-73, wherein said magnetic stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

Embodiment 75: The method according to any one of embodiments 58-73, wherein said magnetic stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

Embodiment 76: The method according to any one of embodiments 58-75, wherein said magnetic stimulation is applied using a single coil stimulator.

Embodiment 77: The method according to any one of embodiments 58-75, wherein said magnetic stimulation is applied using a double coil stimulator.

Embodiment 78: The method according to any one of embodiments 58-77, wherein said treatment is repeated.

Embodiment 79: The method of embodiment 78, where the onset of the treatment results is delayed and/or increases with multiple treatments.

Embodiment 80: The method according to any one of embodiments 78-79, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days.

Embodiment 81: The method according to any one of embodiments 78-80, wherein the treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months.

Embodiment 82: The method according to any one of embodiments 78-81, wherein treatment of said subject with said magnetic stimulation facilitates reduction of pain and/or improvement in strength, and/or improvement in motor control at a later time without magnetic stimulation.

Embodiment 83: The method according to any one of embodiments 78-82, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains reduction of pain and/or improvement in strength at a later time without magnetic stimulation.

Embodiment 84: The method of embodiment 83, wherein the frequency of treatment is reduced after the subject obtains persistent reduction in pain and/or improvement in strength, and/or improvement in locomotor control in the absence of the magnetic stimulation.

Embodiment 85: The method of embodiment 84, wherein the frequency of treatment is reduced to a level sufficient to maintain persistent reduction in pain and/or improvement in strength, and/or improvement in motor control.

Embodiment 86: The method of embodiment 85, wherein the frequency of treatment is reduced to every three days, or to a weekly treatment, or to about every 10 days, or to about every 2 weeks.

Embodiment 87: The method according to any one of embodiments 1-26, wherein said method comprises neuromodulating the brain stem and/or suboccipital spinal cord, and/or the cervical spinal cord, and/or the thoracic spinal cord, and/or the lumbar spinal cord, of said subject by administering epidural stimulation to the brain stem and/or suboccipital spinal cord, and/or cervical spinal cord or a region thereof, and/or thoracic spinal cord or a region thereof, and/or the lumbar spinal cord or a region thereof at a frequency and intensity sufficient to restore function lost by said nerve root disorder.

Embodiment 88: The method of embodiment 87, wherein said epidural electrical stimulation is applied to the brainstem or cervical spinal cord or to a region thereof.

Embodiment 89: The method of embodiment 88, wherein said epidural electrical stimulation is applied to one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

Embodiment 90: The method of embodiment 89, wherein said epidural stimulation is applied over the cervical spinal cord or a region thereof comprising or consisting of a region comprising motor neurons that the functions of which are deficient.

Embodiment 91: The method according to any one of embodiments 88-90, wherein said epidural stimulation is applied at a region comprising C4-C6 or a region therein (e.g., for a deltoid palsy).

Embodiment 92: The method according to any one of embodiments 88-90, wherein said epidural stimulation is applied at a region comprising C5-C6, or a region therein (e.g., for a biceps palsy).

Embodiment 93: The method according to any one of embodiments 88-90, wherein said stimulation is applied at C5.

Embodiment 94: The method of embodiment 89, wherein said epidural electrical stimulation is applied over a region comprising or consisting of C2-C3 or a region therein.

Embodiment 95: The method of embodiment 94, wherein said epidural electrical stimulation is applied at C3.

Embodiment 96: The method according to any one of embodiments 56-95, wherein said method comprises administering epidural stimulation to the thoracic spinal cord or a region thereof.

Embodiment 97: The method of embodiment 96, wherein said epidural electrical stimulation is applied to one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

Embodiment 98: The method of embodiment 96, wherein said epidural stimulation is applied over the thoracic spinal cord or a region thereof comprising or consisting of a region comprising motor neurons that the functions of which are deficient.

Embodiment 99: The method according to any one of embodiments 56-97, wherein said method comprises administering epidural stimulation to the lumbar spinal cord or a region thereof.

Embodiment 100: The method of embodiment 99, wherein said epidural electrical stimulation is applied to one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 101: The method of embodiment 100, wherein said epidural stimulation is applied over the lumbar and/or sacral spinal cord or a region thereof comprising or consisting of a region comprising motor neurons that the functions of which are deficient.

Embodiment 102: The method according to any one of embodiments 56-101, wherein said transcutaneous stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz, or at least about 1 kHz, or at least about 1.5 kHz, or at least about 2 kHz, or at least about 2.5 kHz, or at least about 5 kHz, or at least about 10 kHz.

Embodiment 103: The method of embodiment 102, wherein said epidural stimulation is at a frequency that avoids paresthesias.

Embodiment 104: The method according to any one of embodiments 56-103, wherein said epidural stimulation is at about 30 Hz plus or minus about 10 Hz, or plus or minus about 5 Hz, or plus or minus 2 Hz, or is at about 30 Hz.

Embodiment 105: The method according to any one of embodiments 56-104, wherein said epidural stimulation is at an amplitude ranging from 0.5 mA, or from about 1 mA, or from about 2 mA, or from about 3 mA, or from about 4 mA, or from about 5 mA up to about 50 mA, or up to about 30 mA, or up to about 20 mA, or up to about 15 mA, or from about 5 mA to about 20 mA, or from about 5 mA up to about 15 mA.

Embodiment 106: The method according to any one of embodiments 56-105, wherein stimulation comprises pulsing having a pulse width that ranges from about 100 μs up to about 1 ms or up to about 800 μs, or up to about 600 μs, or up to about 500 μs, or up to about 400 s, or up to about 300 μs, or up to about 200 μs, or up to about 100 μs, or from about 150 μs up to about 600 μs, or from about 200 μs up to about 500 μs, or from about 200 μs up to about 400 μs, or is about 200 μs.

Embodiment 107: The method according to any one of embodiments 56-106, wherein said epidural stimulation is applied to the dorsal (posterior) column.

Embodiment 108: The method of embodiment 107, wherein said epidural stimulation is applied to the lateral portion of said dorsal (posterior) column.

Embodiment 109: The method according to any one of embodiments 56-108, wherein epidural stimulation is applied to a dorsal root.

Embodiment 110: The method of embodiment 109, wherein epidural stimulation is applied to a dorsal root at the point of entry.

Embodiment 111: The method according to any one of embodiments 56-110, wherein epidural stimulation is applied to a ventral (anterior) column.

Embodiment 112: The method of embodiment 111, wherein said epidural stimulation is applied to a lateral portion of said column.

Embodiment 113: The method according to any one of embodiments 56-112, wherein epidural stimulation is applied to a ventral root.

Embodiment 114: The method of embodiment 113, wherein said epidural stimulation is applied to a ventral root at the point of entry.

Embodiment 115: The method according to any one of embodiments 56-114, wherein said epidural stimulation is not applied to a medial portion of a dorsal column.

Embodiment 116: The method according to any one of embodiments 56-115, wherein said epidural stimulation is applied via a permanently implanted electrode array.

Embodiment 117: The method of embodiment 116, wherein said electrode array comprises a plurality of electrodes disposed on a flexible backing.

Embodiment 118: The method of embodiment 117, wherein said electrode array provides at least 2 channels, or at least 4 channels, or at least 8 channels, or at least 12 channels, or at least 16 channels, or at least 20 channels, or at least 24 channels, or at least 28 channels, or at least 32 channels, or at least 36 channels, or at least 40 channels, or at least 40 channels, or at least 48 channels, or at least 52 channels, or at least 56 channels, or at least 60 channels, or at least or 64 channels.

Embodiment 119: The method according to any one of embodiments 117-118, wherein said electrode array comprises a plurality of electrodes disposed on a backing comprising parylene or silicon.

Embodiment 120: The method according to any one of embodiments 117-118, wherein said electrode array is a parylene based microelectrode implant.

Embodiment 121: A method of restoring motor function to the upper extremities and/or to the lower extremities in a subject having impaired motor function of an extremity due to spinal cord or brain injury or pathology, said method comprising:

neuromodulating the brain stem and/or suboccipital spinal cord, and/or the cervical spinal cord or a region thereof, and/or the thoracic spinal cord or a region thereof, and/or the lumbar spinal cord or a region thereof, of said subject with a magnetic stimulator at a frequency and intensity sufficient to partially or to fully restore motor function in the upper extremities and/or in the lower extremities.

Embodiment 122: The method of embodiment 121, wherein said method restores motor function to an upper extremity.

Embodiment 123: The method of embodiment 121, wherein said method restores motor function to a lower extremity.

Embodiment 124: The method according to any one of embodiments 121-123, wherein said method restores strength.

Embodiment 125: The method according to any one of embodiments 121-124, wherein said method restores motor function.

Embodiment 126: The method according to any one of embodiments 121-125, wherein said method restores locomotion.

Embodiment 127: The method according to any one of embodiments 121-126, wherein said method reduces or eliminates pain associated with said disorder.

Embodiment 128: The method according to any one of embodiments 121-127, wherein said neuromodulating comprises neuromodulating a dorsal surface of the brainstem or spinal cord.

Embodiment 129: The method according to any one of embodiments 121-128, wherein said neuromodulating comprises neuromodulating a ventral surface of the brainstem or spinal cord.

Embodiment 130: The method according to any one of embodiments 121-129, wherein said method improves handgrip strength.

Embodiment 131: The method according to any one of embodiments 121-130, wherein said method improves hand motor control.

Embodiment 132: The method according to any one of embodiments 121-131, wherein said method improves spasticity n arms and/or legs as measured using a modified Ashworth scale.

Embodiment 133: The method according to any one of embodiments 121-132, wherein said method improves arm reach action as measured in an arm reach action test (ARAT).

Embodiment 134: The method according to any one of embodiments 121-133, wherein method improves a score in an upper extremity motor exam according to the International Standards for Neurological Classification of Spinal Cord Injury (ISNCSCI).

Embodiment 135: The method according to any one of embodiments 121-134, wherein said method produces a reduction in suicidality.

Embodiment 136: The method according to any one of embodiments 121-135, wherein said method comprises administering magnetic neural stimulation to the suboccipital spinal cord or brainstem or a region thereof, and/or to the cervical spinal cord or a region thereof.

Embodiment 137: The method of embodiment 136, wherein said method comprises administering magnetic neural stimulation to the suboccipital spinal cord or brainstem or a region thereof.

Embodiment 138: The method of embodiment 136, wherein said method comprises administering magnetic neural stimulation to a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

Embodiment 139: The method according to any one of embodiments 121-138, wherein said method comprises administering magnetic neural stimulation to the thoracic spinal cord or a region thereof.

Embodiment 140: The method of embodiment 139, wherein said method comprises administering magnetic neural stimulation to a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

Embodiment 141: The method according to any one of embodiments 121-140, wherein said method comprises administering magnetic neural stimulation to the lumbar spinal cord or a region thereof.

Embodiment 142: The method of embodiment 141, wherein said method comprises administering magnetic neural stimulation to a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 143: The method of embodiment 141, wherein said method comprises administering magnetic neural stimulation to the coccyx.

Embodiment 144: The method according to any one of embodiments 121-143, wherein said stimulation is monophasic.

Embodiment 145: The method according to any one of embodiments 121-143, wherein said stimulation is biphasic.

Embodiment 146: The method according to any one of embodiments 121-143, wherein said stimulation is polyphasic.

Embodiment 147: The method according to any one of embodiments 121-146, wherein said magnetic stimulation produces a magnetic field of at least 1 tesla, or at least 2 tesla, or at least 3 tesla, or at least 4 tesla.

Embodiment 148: The method according to any one of embodiments 121-147, wherein said magnetic stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

Embodiment 149: The method according to any one of embodiments 121-147, wherein said magnetic stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

Embodiment 150: The method according to any one of embodiments 121-149, wherein said magnetic stimulation is applied using a single coil stimulator.

Embodiment 151: The method according to any one of embodiments 121-149, wherein said magnetic stimulation is applied using a double coil stimulator.

Embodiment 152: The method according to any one of embodiments 121-151, wherein said treatment is repeated.

Embodiment 153: The method of embodiment 152, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days.

Embodiment 154: The method according to any one of embodiments 152-153, wherein the treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months.

Embodiment 155: The method according to any one of embodiments 152-154, wherein treatment of said subject with the restoration of motor function persists at a later time without magnetic stimulation.

Embodiment 156: The method of embodiment 155, wherein the persistent restoration of motor function comprises one or more of an improvement in hand strength, an improvement in hand or arm locomotor control, an improvement in SCIM, and improvement in modified Ashworth score; and improvement in ARAT, and an improvement in ISNCSCI score.

Embodiment 157: The method according to any one of embodiments 152-156, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains a persistent improvement in motor function.

Embodiment 158: The method of embodiment 157, wherein the frequency of treatment is reduced after the subject obtains persistent improvement in one or more parameters of improved motor function in the absence of the magnetic stimulation.

Embodiment 159: The method of embodiment 158, wherein the frequency of treatment is reduced to a level sufficient to maintain persistent improvement in motor function.

Embodiment 160: The method of embodiment 159, wherein the frequency of treatment is reduced to every three days, or to a weekly treatment, or to about every 10 days, or to about every 2 weeks.

Embodiment 161: The method according to any one of embodiments 121-160, wherein said spinal cord or brain injury or pathology comprises a spinal cord injury.

Embodiment 162: The method of embodiment 161, wherein said spinal cord injury is clinically classified as motor complete.

Embodiment 163: The method of embodiment 161, wherein said spinal cord injury is clinically classified as motor incomplete.

Embodiment 164: The method according to any one of embodiments 121-160, wherein said spinal cord or brain injury or pathology comprises an ischemic brain injury.

Embodiment 165: The method of embodiment 164, wherein said ischemic brain injury is brain injury from stroke or acute trauma.

Embodiment 166: The method according to any one of embodiments 121-160, wherein said spinal cord or brain injury or pathology comprises a neurodegenerative pathology.

Embodiment 167: The method of embodiment 166, wherein said neurodegenerative pathology is associated with a condition selected from the group consisting of stroke, Parkinson's disease, Huntington's disease, Alzheimer's disease, amyotrophic lateral sclerosis (ALS), primary lateral sclerosis (PLS), dystonia, and cerebral palsy.

Embodiment 168: The method according to any one of embodiments 1-167, wherein said subject is a human.

Embodiment 169: The method according to any one of embodiments 1-168, wherein the stimulation is under control of the subject.

Embodiment 170: The method according to any one of embodiments 1-168, wherein the stimulation is under control medical care personnel.

Embodiment 171: The method according to any one of embodiments 1-170, wherein said method further comprises administering at least one monoaminergic agonist to said subject.

Embodiment 172: The method of embodiment 171, wherein said at least one monoaminergic agonist comprises an agent selected from the group consisting of a serotonergic drug, a dopaminergic drug, a noradrenergic drug, a GABAergic drug, and a glycinergic drug.

Embodiment 173: The method of embodiment 172, wherein said agent is selected from the group consisting of 8-hydroxy-2-(di-n-propylamino)tetralin (8-OH-DPAT), 4-(benzodioxan-5-yl)1-(indan-2-yl)piperazine (S15535), N-{2-[4-(2-methoxyphenyl)-1-piperazinyl]ethyl}-N-(2-pyridinyl)cyclo-hexanecarboxamide (WAY 100.635), Quipazine, Ketanserin, 4-amino-(6-chloro-2-pyridyl)-1 piperidine hydrochloride (SR 57227A), Ondanesetron, Buspirone, Methoxamine, Prazosin, Clonidine, Yohimbine, 6-chloro-1-phenyl-2,3,4,5-tetrahydro-1H-3-benzazepine-7,8-diol (SKF-81297), 7-chloro-3-methyl-1-phenyl-1,2,4,5-tetrahydro-3-benzazepin-8-ol (SCH-23390), Quinpirole, and Eticlopride.

Embodiment 174: The method of embodiment 172, wherein said monoaminergic agonist is buspirone (BUS).

Embodiment 175: A portable stimulator configured to induce epidural and/or transcutaneous electrical stimulation and/or magnetic stimulation of a subject according to any one of embodiments 1-170.

Embodiment 176: A stimulator configured to induce epidural and/or transcutaneous electrical stimulation and/or magnetic stimulation in to a subject in combination with a monoaminergic for use in the treatment of a nerve root disorder (radiculopathy) in a mammal.

Embodiment 177: The stimulator of embodiment 176, wherein said stimulator is configured for use in a method according to any one of embodiments 1-174.

Embodiment 178: The stimulator according to any one of embodiments 176-177, wherein said at least one monoaminergic agonist comprises an agent selected from the group consisting of a serotonergic drug, a dopaminergic drug, a noradrenergic drug, a GABAergic drug, and a glycinergic drug.

Embodiment 179: The stimulator of embodiment 178, wherein said agent is selected from the group consisting of 8-hydroxy-2-(di-n-propylamino)tetralin (8-OH-DPAT), 4-(benzodioxan-5-yl)1-(indan-2-yl)piperazine (S15535), N-{2-[4-(2-methoxyphenyl)-1-piperazinyl]ethyl}-N-(2-pyridinyl)cyclo-hexanecarboxamide (WAY 100.635), Quipazine, Ketanserin, 4-amino-(6-chloro-2-pyridyl)-1 piperidine hydrochloride (SR 57227A), Ondanesetron, Buspirone, Methoxamine, Prazosin, Clonidine, Yohimbine, 6-chloro-1-phenyl-2,3,4,5-tetrahydro-1H-3-benzazepine-7,8-diol (SKF-81297), 7-chloro-3-methyl-1-phenyl-1,2,4,5-tetrahydro-3-benzazepin-8-ol (SCH-23390), Quinpirole, and Eticlopride.

Embodiment 180: The stimulator of embodiment 178, wherein said monoaminergic agonist is buspirone.

Embodiment 181: A system comprising: a stimulator configured to induce epidural and/or transcutaneous electrical stimulation and/or magnetic stimulation in the brain stem and/or suboccipital spinal cord, and/or the cervical spinal region and/or in the thoracic spinal region, and/or in the lumbar spinal region of a subject at a frequency and amplitude that mitigates or eliminates one or more symptoms associated with a a nerve root disorder (radiculopathy) in a mammal.

Embodiment 182: The system of embodiment 181, wherein said system comprises an implanted (e.g., surgically implanted), epidural stimulation device.

Embodiment 183: The system of embodiment 181, wherein said system comprises a temporary implanted device by percutaneous insertion of leads.

Embodiment 184: The system according to any one of embodiments 181-183, wherein said system is configured for home use.

BRIEF DESCRIPTION OF THE DRAWINGS

FIG. 6, panels A-B', shows that BUS+EMSS can act rapidly. In a separate cohort, we established baseline function for 7 weeks followed by treatment with BUS treatment. EMSS was conducted on day 3, 5, and 7 of BUS treatment. Panel A: In grip strength, a rapid and significant increase in grip was seen even in the first session. Panel A': By the last session, as summarized, there was a robust increase in grip strength both before and after stimulation. Panel B: In a measure of precision hand movements where a subject follows a sine wave on a screen by moving a pointer, substantial increases were seen in the first session. Panel B': Although not reaching significance, these data appear to trend towards improvement. Two Tailed Students T-test with Bonferroni post-hoc correction. * $p<0.05$;  $p<0.01$; * $p<0.001$. Device: MagPro (MagVenture, Atlanta) with Cool-B35 Butterfly Coil and Biphasic stimulation at 30 Hz.

FIG. 7 shows that SCEPs improve after EMSS intervention. The effect of EMSS treatment on spinal cord evoked potentials is shown. Subjects with stable cervical SCI were evaluated for their ability to produce Spinal Cord Evoked Potentials (SCEPs) with EMSS pre- and post-treatment. The Y-axis indicates the size of the evoked potential measured by EMG at the relevant muscle. The X-axis is increasing stimulation intensity with EMSS. In the right panels, two subjects were evaluated before treatment. Both subjects have some activity at all the motor pools evaluated, although not apparent at this scale. In the left panels. the same two subjects were evaluated post-treatment. A large treatment effect is seen in the SCEPs reflecting changes in spinal cord circuitry related to motor function. This technique can be used to measure the inherent segmental responsiveness of the cord. This technique does not require volitional control of the segmental levels in question and is therefore well suited to evaluating subjects with paralysis.

FIG. 9 illustrates parameters that can be varied using a transcutaneous stimulator (e.g., a portable stimulator) as described herein. In certain embodiments the parameters that can be controlled/varied include stimulation frequency, stimulation amplitude, stimulation pulse width. In certain embodiments the carrier frequency, and/or carrier pulse width can be controlled. In certain embodiments the carrier signal can be turned off while leaving a stimulation signal on.

DETAILED DESCRIPTION

Figure 1:
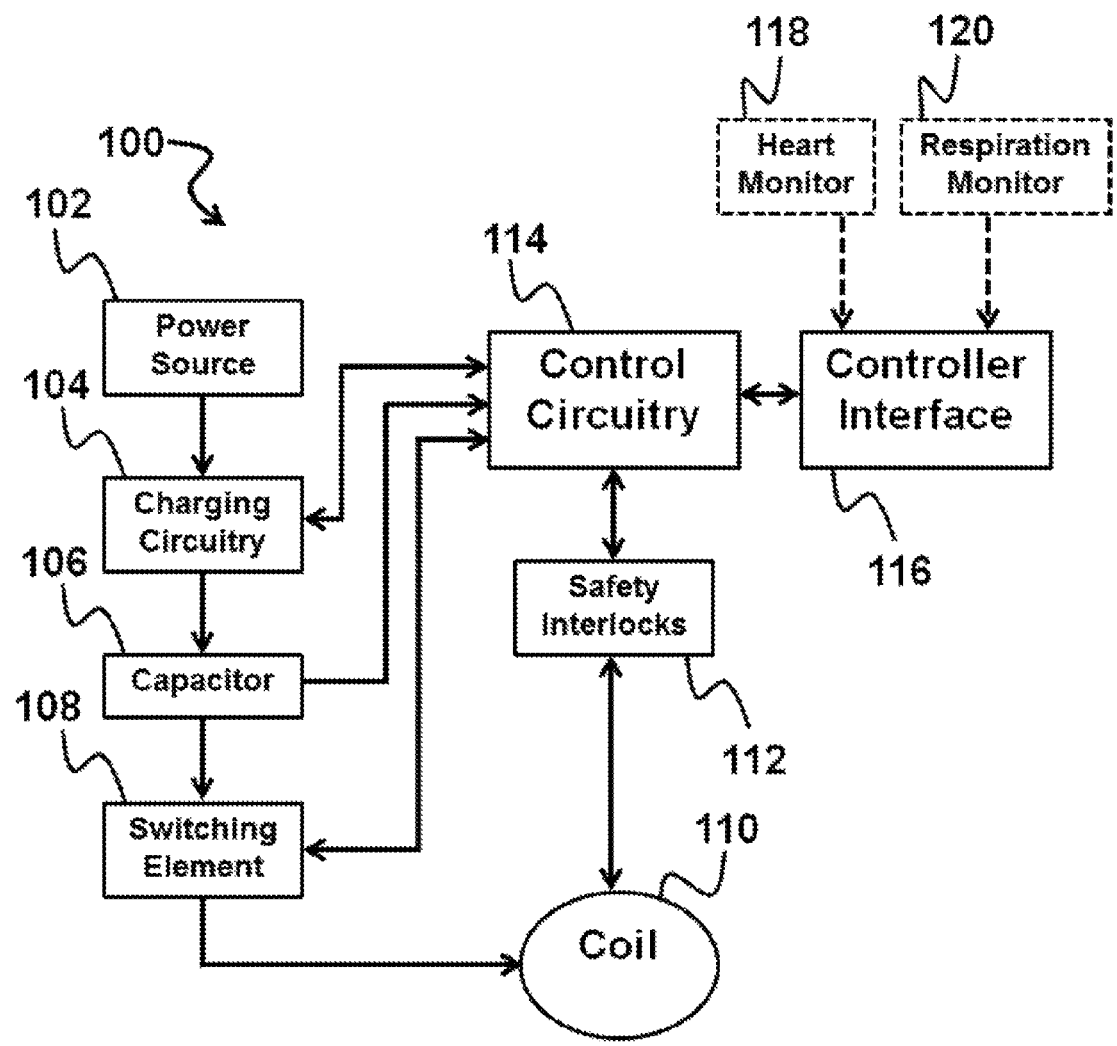
FIG. 1 shows a schematic illustration of one illustrative embodiment of a magnetic nerve stimulator.

It was determined that the following can be leveraged to regain motor function in spinal cord injured subjects which can be broadened to include any subjects with injury to the central nervous system or degenerative neuromotor conditions (stroke, TBI, MS, ALS, Parkinson's disease, Alzheimer's disease):

1. Stimulation with devices that imparts an electrical or magnetic field (frequency range from 5-100 Hz) of the cervical, thoracic, and lumbar spinal cord, nerve roots, or combinations thereof can restore arm and leg movement;
2. With training and repetition, the gains with stimulation can be hardwired and present even without stimulation; and
3. Serotonin agonist medication such as buspirone and/or selective serotonin reuptake inhibitors (e.g., fluoxetine) can be used as tool to further activate the spinal network to improve motor function.

In particular, it was discovered that stimulation of the spinal cord or regions thereof can effectively improve motor function and/or reduce pain in subjects with nerve root palsies (e.g., radiculopathies including, but not limited to cauda equina syndrome). It was also discovered that stimulation of the spinal cord or regions thereof can effectively improve motor function of upper and/or lower extremities and can restore motor function (partially or fully) in subjects with impaired extremity motor function due to spinal cord or brain injury or pathology.

Moreover it was surprisingly discovered that non-invasive stimulation, e.g., transcutaneous and magnetic stimulation were particular effective and well tolerated. Moreover, it was demonstrates that Electromagnetic Spinal Cord Stimulation (EMSS) over repeated treatment periods provided persistent improvement even in the absence of the stimulation.

Treatment of Nerve Root Palsies and/or Radiculopathies Including Cauda Equina Syndrome.

In various embodiments methods of treating nerve root palsies are contemplated. In certain embodiments the methods involve neuromodulating the brain stem and/or suboccipital spinal cord, and/or the cervical spinal cord or a region thereof, and/or the thoracic spinal cord or a region thereof, and/or the lumbar spinal cord or a region thereof, of the subject with a magnetic stimulator at a frequency and intensity sufficient to regulate and/or to restore function lost by the nerve root disorder; and/or neuromodulating the brain stem and/or suboccipital spinal cord, and/or the cervical spinal cord, and/or the thoracic spinal cord, and/or the lumbar spinal cord, of the subject by administering transcutaneous stimulation to the brain stem and/or suboccipital spinal cord, and/or the cervical spinal cord or a region thereof, and/or the thoracic spinal cord or a region thereof, and/or the lumbar spinal cord or a region thereof at a frequency and intensity sufficient to restore function lost by the nerve root disorder; and/or neuromodulating the brain stem and/or suboccipital spinal cord, and/or the cervical spinal cord, and/or the thoracic spinal cord, and/or the lumbar spinal cord, of the subject by administering epidural stimulation to the brain stem and/or suboccipital spinal cord, and/or cervical spinal cord or a region thereof, and/or thoracic spinal cord or a region thereof, and/or the lumbar spinal cord or a region thereof at a frequency and intensity sufficient to restore function lost by the nerve root disorder.

In various embodiments the neuromodulation by is at a frequency and amplitude sufficient to restore function lost by the nerve root disorder. In certain embodiments this restoration of function can entail a reduction in pain, and/or an increase in strength, and/or an increase in motor control, and/or in improvement in sensory function. In certain embodiments the transcutaneous stimulation and/or magnetic stimulation, and/or epidural stimulation is according to the various stimulation parameters described below.

In certain embodiments the nerve root palsy to be treated comprises a cervical radiculopathy, and/or a lumbar radiculopathy, and/or a sacral radiculopathy. The most common nerve root palsies are C5, L5, and S1, however the methods described herein are not limited to the treatment of these palsies. In certain embodiments the radiculopathy is a cervical radiculopathy and, in particular embodiments the cervical radiculopathy comprises a C5 radiculopathy (e.g., in which pain is typically found along the lateral brachium of the affected side of the arm and C5 innervated muscle and/or weakness may be found i.e. rhomboids, deltoid etc.), a C6 radiculopathy (e.g., in which pain is typically found along the lateral antebrachium of the affected arm and/or C6 innervated muscles are weak i.e. forearm pronator and supinators, wrist extensors etc.) and C7 radiculopathies (e.g., in which pain is typically found along the middle finger of the affected arm and/or C7 innervated muscle weakness is found (e.g., wrist flexors, finger extensors etc.).

In certain embodiments, the nerve root palsy to be treated includes peripheral nerve dysfunction or neuropathies such as: brachial plexus neuropathy (e.g., brachial neuritis, Parsonnage Turner syndrome), ulnar neuropathy, median neuropathy, radial neuropathy, axillary nerve injuries, suprascapular neuropathy, obturator neuropathy, lumbosacral plexus neuropathy, femoral neuropathy, common peroneal neuropathy (e.g., superficial, common, deep), tibial neuropathy, thoracic outlet syndrome, anterior interosseous neuropathy, musculocutaneous neuropathy, amyloid neuropathy, uremic neuropathy, occipital neuropathy, demyelinating polyradiculoneuropathy (Guillain-Barre syndrome), drug-induced neuropathies, diabetic neuropathy, alcoholic neuropathy, HIV neuropathy, etc. Furthermore, peripheral nerve dysfunction having one or more traumatic causes may be treated.

In certain embodiments the radiculopathies include, but are not limited to lower limb radiculopathies. Such radiculopathies are often on a single nerve root, and the cause is typically a herniated intervertebral disc. Typically symptoms include, but are not limited to one or more of scoliosis, paraspinal muscle contracture, and the reduction of lumbar lordosis. In certain embodiments the lower limb radiculopathies include, but are not limited to an L4 radiculopathy (e.g., pain is typically located on the front of the thigh and shin, an can further radiate towards the inner ankle, sometimes the medial toe, and/or can be characterized by failure of the quadriceps muscle and reflex weakness, an L5 radiculopathy (e.g., typically characterized by pain radiating to the side of the thigh and lower leg towards the back of the foot and toes 1-3), and an S1 radiculopathy (e.g., typically characterized by pain radiating to the posterior side of the thigh and lower leg to the ankle side, sometimes up to the fourth toe and/or weakness of the gluteal muscles, and/or difficulty standing on toes.

In some instances the radiculopathy comprises cauda equina syndrome. Cauda equina syndrome is a condition due to damage to the bundle of nerves below the end of the spinal cord known as the cauda equina. Symptoms include low back pain, pain that radiates down the leg, numbness around the anus, and loss of bowel or bladder control. Onset may be rapid or gradual. Causes of cauda equina include, but are not limited to a ruptured disk in the lumbar area (the most common cause), spinal stenosis, a spinal lesion or malignant tumor, a spinal infection, inflammation, hemorrhage, or fracture, a complication from a severe lumbar spine injury such as a car crash, fall, gunshot, or stabbing, and a birth defect such as an arteriovenous malformation.

In certain embodiments the neuromodulation of the spinal cord is sufficient to partially or to fully ameliorate any one or more of these symptoms.

Restoration of Upper and/or Lower Extremity Function.

It was also discovered that Electromagnetic Spinal Cord Stimulation (EMSS) is effective to partially or fully restore motor control of upper extremities and/or of lower extremities in subjects having impaired motor function of an extremity due to spinal cord or brain injury or pathology. Moreover it was surprisingly discovered that magnetic stimulation over repeated treatment periods provided persistent improvement even in the absence of the stimulation.

Many spinal cord injuries involve the cervical spine, yet they are often incomplete and the local spinal cord circuitry for arm and hand control may be spared. We have leveraged this fact, and the observation that in spinal cord injured states, circuitry distal to the injury site can be neuromodulated to regain function (as in the case of locomotion) to develop a rehabilitative strategy to re-enable significant volitional control of hand function (see, e.g., Example 2).

In particular, we used non-invasive electromagnetic stimulation of the spinal cord (EMSS) to improve motor performance in 10 subjects with motor complete injury (see, e.g., FIG. 5) and demonstrated significant and functionally important improvements in hand function.

Prior to the results shown herein, it was unknown whether non-invasive neuromodulation with EMSS could be used to enable spared function of cervical neuromotor networks, e.g., neural networks related to upper limb function in animals and humans. The potential impact of the therapeutic interventions described herein on the lives of individuals with tetraplegia cannot be overestimated. Development of non-invasive stimulation to activate spared, but ineffective, spinal cord sensorimotor networks related to upper limb function in humans represents a paradigm shift in the rehabilitative approach to upper limb paralysis as a result of SCI and potentially other neurologic injuries, diseases, or stroke. By re-enabling spared functions, the cost-savings can include reduced assisted daily care costs, increased employment, and improved quality of life-especially for incomplete SCI patients who account for the majority of SCI patients. The methods described herein can provide a partial solution to the US$40 billion/year care and $5.5 billion/year lost productivity costs.

Of the 10 million people in the US living with paralysis, 15,000 are the result of a SCI each year. The cost of the first year of care can range from $322,000-$986,000, with lifetime costs of $1.4-4M for someone injured at 25 years of age.

The methods described herein can improve the lives of patients with chronic or new SCI and other forms of nervous system damage or disease (e.g., stroke, multiple sclerosis).

Importantly, there is currently no effective treatment to improve hand function after chronic cervical SCI. However, even without full restoration of hand function, incremental improvements can make a substantial impact in the lives of those with tetraplegia (www.ada.gov). For example, in a patient with minimal hand function (<5N grip force), an increase in grip strength to 10 N will allow the subject to operate a wheelchair joystick, computer keyboard, self-care, and open/close doors.

Such improvements in hand function allow the patient to be more independent, less reliant on caregivers, and will provide psychologically benefit.

Using non-invasive, Electromagnetic Spinal Cord Stimulation (EMSS, MagPro X100, MagVenture, Atlanta, GA, USA) to improve volitional upper limb function in individuals with spinal cord injury (SCI), we observed improved upper limb function and quality of life scores in 10 subjects undergoing cervical EMSS. EMSS is widely available and gaining adoption, produces clinical and functional improvements for extended periods of time (~4 months), is compatible with spinal fixation implants, and is simple and safe to administer. Small functional improvements (which were readily detectable and functionally significant in the first 10 patients), even if they require follow-up EMSS treatments, justify this approach.

Because upper limb movement is a complex motor behavior that relies on voluntary motor functions and involuntary sensory functions, recovery of spared spinal cord function can be a highly preferred, safe, and cost effective rehabilitation strategy. It is difficult to replicate these complex, coordinated functions by electrically stimulating the nerves and muscles of the upper limb. In fact, this approach has not yielded substantial restoration of upper limb function. Our non-invasive approach is designed to deliver low-intensity, sub-threshold neuromodulation with EMSS to rehabilitate spared sensorimotor circuitries in the spinal cord that control the upper limb and that appear to persist in patients with incomplete spinal cord injury (SCI). Without being bound to a particular theory, we believe that combined with upper limb sensorimotor rehabilitative training, that previously ineffective, spared descending inputs can achieve depolarization of spinal neurons that, in turn, permit volitional upper limb motor control. This can result in plastic changes in the spinal networks controlling hand function that persist in the absence of stimulation for several months, perhaps longer.

Each muscle of the arm and hand has a dedicated motor pool that develops in a distinct manner. At the cervical enlargement, in addition to Renshaw cells and Ia interneurons, there are at least 20 distinct interneurons that comprise 11 classes of interneurons organized by their expression of transcription factors, axon projection patterns, and a predominant neurotransmitter. The molecular and cellular complexity of the cervical spinal cord reflects the local sensorimotor neural processing that integrates sensation (several tactile modalities, several pain modalities, and proprioception from Golgi tendon organs and intrafusile fibers), ascending sensory information from elsewhere in the body and descending sensory (e.g. vestibular), involuntary motor (e.g. extrapyramidal) and voluntary motor commands.

The SCI and rehabilitation fields have only a rudimentary understanding of what types of information reach the cervical enlargement and the cellular targets of these inputs. Rational approaches to 'reverse-engineer' the spinal circuitry have been modeled for lumbar locomotion yet unresolved issues remain, especially for the upper limb. Despite this complexity, as shown in Example 2, we can reliably measure the functional output of the motor circuitry with Spinal Cord Evoked Potentials (SCEPs) even in paralyzed subjects with SCI. After a brief magnetic stimulation (10s 5 Hz parallel to the spinal axis) is applied to the skin overlying the cord to slightly depolarize the motor neurons via a "black box" combination of sensory neuron, interneuron, and motor neuron activity, EMG activity is evoked at the muscles innervated by the cord segment(s) subjected to stimulation. In the context of SCI, this serves as an important assessment tool of local spinal circuitry to define muscles for which at least segmental spinal motor function is present, independent of ascending or descending connections. In certain embodiments our neuromodulation strategy utilizes this spinal capacity to activate muscles.

Although the majority of cervical spinal cord injuries are at C5-6 and incomplete, injuries of the spinal cord are highly heterogeneous in the size and involvement of local circuitries and fibers of passage connecting spinal cord regions rostral and caudal to the injury. Because of this heterogeneity, the SCEP measurements analyzed empirically and by machine learning algorithms can be used to define stimuli that are effective in evoking a spinal cord motor output. Typically a subject well suited to the methods described herein can produce an SCEP in one or more hand muscle in the subject's more useful hand (digit and wrist flexors and extensors of the hand that has more residual function after injury). Functionally, this means that the subject has motor neurons in the spine susceptible to activation and residual or dormant circuits present in the spinal cord post-injury that are amenable to neuromodulation. These SCEP stimulation parameters (spinal level, stimulus intensity and stimulation frequency) can be determined for the subject and applied.

This provides an empirical approach to improving function. In the face of neural complexity and heterogeneous injuries, we believe that the best solution is to assist the local circuitry to become active in the context of useful motor tasks (sensorimotor rehabilitative training). Our preliminary data suggest that various forms of neuromodulation in the form of sensory feedback, drugs, and electromagnetic stimulation, enable the spared circuitry to recover clinically relevant function at unprecedented and clinically meaningful levels.

Other tests of residual spinal function that can be performed include, but are not limited to: Assessing sensory evoked responses from the ulnar nerve and determining whether a) the activity is reflected in the spinal cord, and b) whether the information reaches the cortex. The motor cortex can be stimulated with transcranial magnetic motor evoked potentials (tcmMEP) on both sides of the cortex to determine how much motor information passes through the injury site. In certain embodiments, somatosensory and motor evoked potentials can be obtained before and after the intervention to determine whether spinal electromagnetic stimulation alters the effectiveness of communication across the site of injury. This is an especially useful assessment because the AIS classification is crude and does not capture the subtleties of anatomically incomplete injuries, and we expect spinal stimulation to enhance communication across the site of injury.

While the discussion above focuses on upper extremity function, similar approaches can be taken to partially or to fully restore lower extremity motor function.

In certain embodiments the neuromodulation produced by magnetic stimulation is sufficient to partially or fully restore upper or lower extremity motor function.

In certain embodiments restoration of motor function is indicated by an improvement in one or more parameters that can include, but are not limited to increase in SCEP efficiency (lowest input energy and highest EMG output response) in the muscles of the more dominant limb (e.g., hand) post-injury, grip strength, hand control, box and block, MusicGlove, ArmeoSpring, ARAT, GRASSP, ISNCSCI, CUE, modified Ashworth Scale, Penn Spasm Frequency, VAS-spasticity) and quality of life (C-SSRS, SCIM3), tcm-MEP, SEP, and the like.

Magnetic Stimulation

As illustrated herein in Example 2, it was discovered that that stimulation of the spinal cord with devices that impart a magnetic field (e.g., at a frequency range from about 0.5

Hz up to about 100 Hz) can improve and/or restore motor function in a subject having impaired motor function of an extremity due to spinal cord or brain injury or pathology (e.g., SCI, brain injury, Parkinson's disease, Huntington's disease, Alzheimer's disease, amyotrophic lateral sclerosis (ALS), primary lateral sclerosis (PLS), dystonia, cerebral palsy, etc.). Similarly, magnetic stimulation can be used to treat a nerve root disorder (radiculopathy).

In various embodiments magnetic spinal cord stimulation can be achieved by generating a rapidly changing magnetic field to induce a current at the nerve(s) of interest (e.g., the spinal cord). Effective stimulation typically utilizes current transients of about $10^8$ A/s or greater discharged through a stimulating coil. The discharge current flowing through the stimulating coil generates magnetic lines of force. As the lines of force cut through tissue, a current is generated in that tissue, whether skin, bone, muscle or neural; if the induced current is of sufficient amplitude and duration such that the cell membrane is depolarized, neuromuscular tissue will be stimulated in the same manner as conventional electrical stimulation.

Magnetic Stimulation of the Brainstem/Suboccipital Spinal Cord or a Region Thereof.

In various embodiments, the methods described herein involve magnetic stimulation of the brainstem and/or suboccipital region. This can be accomplished by application of a magnetic stimulator (e.g., a magnetic stimulator wand) to the suboccipital region of the neck and stimulation can be according to any of the magnetic stimulation parameters described herein.

In certain embodiments stimulation can be accomplished by transcranial magnetic stimulation applied, e.g., to the base of the skull.

Magnetic Stimulation of the Cervical Spinal Cord.

In various embodiments, the methods described herein involve magnetic stimulation of the cervical spine or a region of the cervical spine of the subject. Illustrative regions include, but are not limited to, one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

Magnetic Stimulation of the Thoracic Spinal Cord.

In various embodiments, the methods described herein involve magnetic stimulation of the thoracic spine or a region of the thoracic spine of the subject. Illustrative regions include, but are not limited to, one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

Magnetic Stimulation of the lumbar spinal cord and/or coccyx.

In various embodiments, the methods described herein involve magnetic stimulation of the thoracic spine or a region of the thoracic spine of the subject. Illustrative regions include, but are not limited to, one or more regions straddling or spanning a region selected from the group consisting of of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

In certain embodiments, in addition, or as an alternative to the above-identified locations, stimulation can be applied to the coccyx, e.g., by application of a transcutaneous stimulation electrode to the coccyx, i.e. over the small, triangular bone at the base of the spinal column.

Magnetic Stimulation Parameters.

As noted above, magnetic stimulators can be used for stimulation of the spinal cord to restore upper or lower extremity motor function and/or to treat a nerve root disorder (radiculopathy). Since the magnetic field strength falls off with the square of the distance from the stimulating coil, the stimulus strength is at its highest close to the coil surface. The stimulation characteristics of the magnetic pulse, such as depth of penetration, strength and accuracy, depend on the rise time, peak electrical energy transferred to the coil and the spatial distribution of the field. The rise time and peak coil energy are governed by the electrical characteristics of the magnetic stimulator and stimulating coil, whereas the spatial distribution of the induced electric field depends on the coil geometry and the anatomy of the region of induced current flow.

In various embodiments the magnetic nerve stimulator will produce a field strength up to about 10 tesla, or up to about 8 tesla, or up to about 6 tesla, or up to about 5 tesla, or up to about 4 tesla, or up to about 3 tesla, or up to about 2 tesla, or up to about 1 tesla. In certain embodiments the nerve stimulator produces pulses with a duration from about 100 s up to about 10 ms, or from about 100 μs up to about 1 ms.

In certain embodiments the magnetic stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

In certain embodiments the magnetic stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

In certain embodiments the magnetic stimulation is applied at the midline of spinal cord. In various embodiments the magnetic stimulation produces a magnetic field of at least about 0.5 tesla, or at least about 0.6 tesla, or at least about 0.7 tesla, or at least about 0.8 tesla, or at least about 0.9 tesla, or at least about 1 tesla, or at least about 2 tesla, or at least about 3 tesla, or at least about 4 tesla, or at least about 5 tesla. In certain embodiments the magnetic stimulation is at a frequency of at least about 0.5 Hz, 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

In certain embodiments, the magnetic stimulation is at a frequency and amplitude sufficient to restore motor function in an extremity (e.g., as indicated by an improvement in SCEP efficiency (lowest input energy and highest EMG output response) in the muscles of the more dominant limb (e.g., hand) post-injury, grip strength, hand control, box and block, MusicGlove, ArmeoSpring, ARAT, GRASSP, ISNCSCI, CUE, modified Ashworth Scale, Penn Spasm Frequency, VAS-spasticity) and quality of life (C-SSRS, SCIM3), temMEP, SEP, and the like. In certain embodiments, the magnetic stimulation is at a frequency and amplitude sufficient to reduce pain and/or to increase strength and/or to improve motor control in a subject with a nerve root palsy.

Repeated Magnetic Stimulation Treatments to Provide Persistent Improvement.

More surprisingly, it was discovered that repeated treatments with magnetic stimulation can, over time, produce a persistent improvement in a patient in the subsequent absence of the magnetic stimulation. In certain embodiments, the persistent improvement comprises an improvement in motor function of a limb (e.g., as indicated by an improvement in SCEP efficiency (lowest input energy and highest EMG output response). For example, the improvement in motor function can comprise an improvement in motor function in the muscles of an extremity of a limb (e.g., the more dominant limb) (e.g., hand) such as post-injury (e.g., as characterized by grip strength, hand control, box and block, MusicGlove, ArmeoSpring, ARAT, GRASSP, ISNCSCI, CUE, modified Ashworth Scale, Penn Spasm Frequency, VAS-spasticity), and/or improvement in quality of life (e.g., as characterized by C-SSRS, SCIM3), and/or improvement in tcmMEP, SEP, and the like. In certain embodiments, the persistent improvement comprises a reduction in pain, and/or an increase in strength, and/or an improvement in motor control, and/or an improvement in sensory function in a subject.

In certain embodiments there is no apparent effect of stimulation while it's being administered. There can be a delay in response of at least 3 treatment sessions to observe a positive effect. Also importantly, the stimulation does not need to be on to realize the positive effect. There can also be a slow decay of function after treatment and in certain embodiments, multiple treatments are administered to observe effect and decay of the treatment effect can be observed after approximately 2 weeks of no treatment.

Accordingly, in various embodiments a single treatment of magnetic stimulation comprises 1, or 2, or 3, or 4, or 5, or 6, or 7, or 8, or 9, or 10 or more continuous stimulation periods. In various embodiments the continuous stimulation periods range in duration from about 10 sec, or from about 20 sec, or from about 3 sec or from about 40 sec, or from about 50 sec, or from about 1 min, or from about 2 minutes up to about 10 minutes, or up to about 8 minutes, or up to about 6 minutes. In certain embodiments the continuous stimulation periods are about 4 minutes in duration. In certain embodiments the delay between continuous stimulation periods ranges from about 2 sec, or from about 5 sec, or from about 10 sec, or from about 15 sec, or from about 20 sec up to about 5 minutes, or up to about 4 minutes, or up to about 3 minutes, or up to about 2 minutes, or up to about 1 min, or up to about 45 sec, or up to about 30 sec. In certain embodiments the delay between continuous stimulation periods is about 30 sec.

Repeating the treatment can progressively improve motor function in an upper and/or lower extremity and/or can improve strength, motor control and/or reduce pain associated with a nerve root palsy. Accordingly, in certain embodiments the treatment is repeated (e.g., repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days). In certain embodiments the treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months. In certain embodiments the treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject experiences a reduction of pain and/or improvement in strength, and/or improvement in motor control, e.g., at a later time without magnetic stimulation in treatment of nerve root palsies, or an improvement in motor function of an extremity (e.g., as indicated by an improvement in SCEP efficiency (lowest input energy and highest EMG output response) in the muscles of the more dominant limb (e.g., hand) post-injury, grip strength, hand control, box and block, MusicGlove, ArmeoSpring, ARAT, GRASSP, ISNCSCI, CUE, modified Ashworth Scale, Penn Spasm Frequency, VAS-spasticity) and quality of life (C-SSRS, SCIM3), tcmMEP, SEP, and the like) e.g., at a later time without magnetic stimulation in treatment of impaired motor function of an extremity. In certain embodiments the treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains their maximal reduction of pain and/or improvement in strength, and/or improvement in motor control, and/or improvement in sensory function in treatment of a nerve root palsy, or a maximum improvement in motor function of an extremity in treatment of impaired motor function of an extremity.

In certain embodiments, once the desired level of improvement is achieved, the frequency of treatment can be reduced to a "maintenance" level. Typically, the frequency of treatment can be reduced to a level sufficient to maintain a reduction of pain and/or improvement in strength, and/or improvement in motor control, and/or to improve sensory function, e.g., at a later time without magnetic stimulation in treatment of nerve root palsies, or an improvement in motor function of an extremity (e.g., as indicated by an improvement in SCEP efficiency (lowest input energy and highest EMG output response) in the muscles of the more dominant limb (e.g., hand) post-injury, grip strength, hand control, box and block, MusicGlove, ArmeoSpring, ARAT, GRASSP, ISNCSCI, CUE, modified Ashworth Scale, Penn Spasm Frequency, VAS-spasticity) and quality of life (C-SSRS, SCIM3), tcmMEP, SEP, and the like) e.g., at a later time without magnetic stimulation in treatment of impaired motor function of an extremity. It should be understood that in certain embodiments, repeated treatments with other forms of stimulation such as those described herein (e.g., electrical stimulation) may similarly produce a persistent improvement in a patient in the subsequent absence of the stimulation.

Transcutaneous Electrical Stimulation.

In various embodiments transcutaneous electrical stimulation of the spinal cord (e.g., one or more regions of the cervical spinal cord, and/or the thoracic spinal cord, and/or the lumbar spinal cord) is utilized to treat a nerve root palsy, e.g., to achieve a reduction of pain and/or improvement in strength, and/or improvement in motor control, and/or improvement in sensory function in a subject with a nerve root palsy. In certain embodiments the transcutaneous stimulation can be of one or more regions of the cervical spinal cord, and/or one or more regions of the thoracic spinal cord, and/or one or more regions of the lumbar spinal cord The location of the electrode(s) and their stimulation parameters can be important in treating one or more effects of the nerve root palsy. Use of surface electrode(s), as described herein, facilitates selection or alteration of particular stimulation sites as well as the application of a wide variety of stimulation parameters. Additionally, surface stimulation can be used to optimize location for an implantable electrode or electrode array for epidural stimulation.

Transcutaneous Stimulation of the Brainstem/Suboccipital Spinal Cord or a Region Thereof.

In various embodiments, the methods described herein involve transcutaneous electrical stimulation of the brainstem and/or suboccipital region. This can be accomplished by application of one or more transcutaneous stimulation electrode(s), e.g., as described herein, over the base of the skull and/or over the suboccipital region and the transcutaneous stimulation can be applied using the transcutaneous stimulation parameters described herein. As used herein the suboccipital region refers to a region of the neck bounded by the following three muscles of the suboccipital group of muscles: 1) Rectus capitis posterior major—above and medially; 2) Obliquus capitis superior—above and laterally; and 3) Obliquus capitis inferior—below and laterally.

Transcutaneous Electrical Stimulation of the Cervical Spine or a Region Thereof

In certain embodiments, the methods described herein involve transcutaneous electrical stimulation of the cervical spine or a region of the cervical spine. Illustrative regions include, but are not limited to one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

In certain embodiments the transcutaneous stimulation is applied at a region comprising C2-C4 or a region therein. In certain embodiments the stimulation is applied at C3.

Transcutaneous Electrical Stimulation of the Thoracic Spine or a Region Thereof

In various embodiments, the methods described herein additionally or alternatively involve transcutaneous electrical stimulation of the thoracic spine (e.g., spinal cord) or a region of the thoracic spine (spinal cord) of the subject. Illustrative regions include, but are not limited to, one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

Transcutaneous Electrical Stimulation of the Lumbar Spine or a Region Thereof, And/or Coccyx.

In various embodiments, the methods described herein additionally or alternatively involve transcutaneous electrical stimulation of the thoracic spine (e.g., spinal cord) or a region of the thoracic spine (spinal cord) of the subject. Illustrative regions include, but are not limited to, one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

In certain embodiments, in addition, or as an alternative to the above-identified locations, transcutaneous stimulation can be applied to the coccyx, e.g., by application of one or more transcutaneous stimulation electrode(s) over the small, triangular bone at the base of the spinal column.

In certain embodiments the transcutaneous electrical stimulation is applied paraspinally over a lumbar region identified above or to a region thereof, e.g., over a region spanning L2 to L3).

Transcutaneous Electrical Stimulation Parameters.

In certain embodiments the transcutaneous stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz, or at least about 1 kHz, or at least about 1.5 kHz, or at least about 2 kHz, or at least about 2.5 kHz, or at least about 5 kHz, or at least about 10 kHz, or up to about 25 kHz, or up to about 50 kHz, or up to about 100 kHz.

In certain embodiments the transcutaneous stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

In certain embodiments the transcutaneous stimulation is applied at an intensity ranging from about 5 mA or about 10 mA up to about 500 mA, or from about 5 mA or about 10 mA up to about 400 mA, or from about 5 mA or about 10 mA up to about 300 mA, or from about 5 mA or about 10 mA up to about 200 mA, or from about 5 mA or about 10 mA to up about 150 mA, or from about 5 mA or about 10 mA up to about 50 mA, or from about 5 mA or about 10 mA up to about 100 mA, or from about 5 mA or about 10 mA up to about 80 mA, or from about 5 mA or about 10 mA up to about 60 mA, or from about 5 mA or about 10 mA up to about 50 mA.

In certain embodiments the transcutaneous stimulation is applied stimulation comprises pulses having a width that ranges from about 100 µs up to about 1 ms or up to about 800 µs, or up to about 600 µs, or up to about 500 µs, or up to about 400 µs, or up to about 300 µs, or up to about 200 µs, or up to about 100 µs, or from about 150 µs up to about 600 µs, or from about 200 µs up to about 500 µs, or from about 200 µs up to about 400 µs.

In certain embodiments the transcutaneous stimulation is at a frequency, pulse width, and amplitude sufficient to achieve a reduction of pain and/or improvement in strength, and/or improvement in motor control, and/or improvement in sensory function in a subject with a nerve root palsy.

Figure 9:
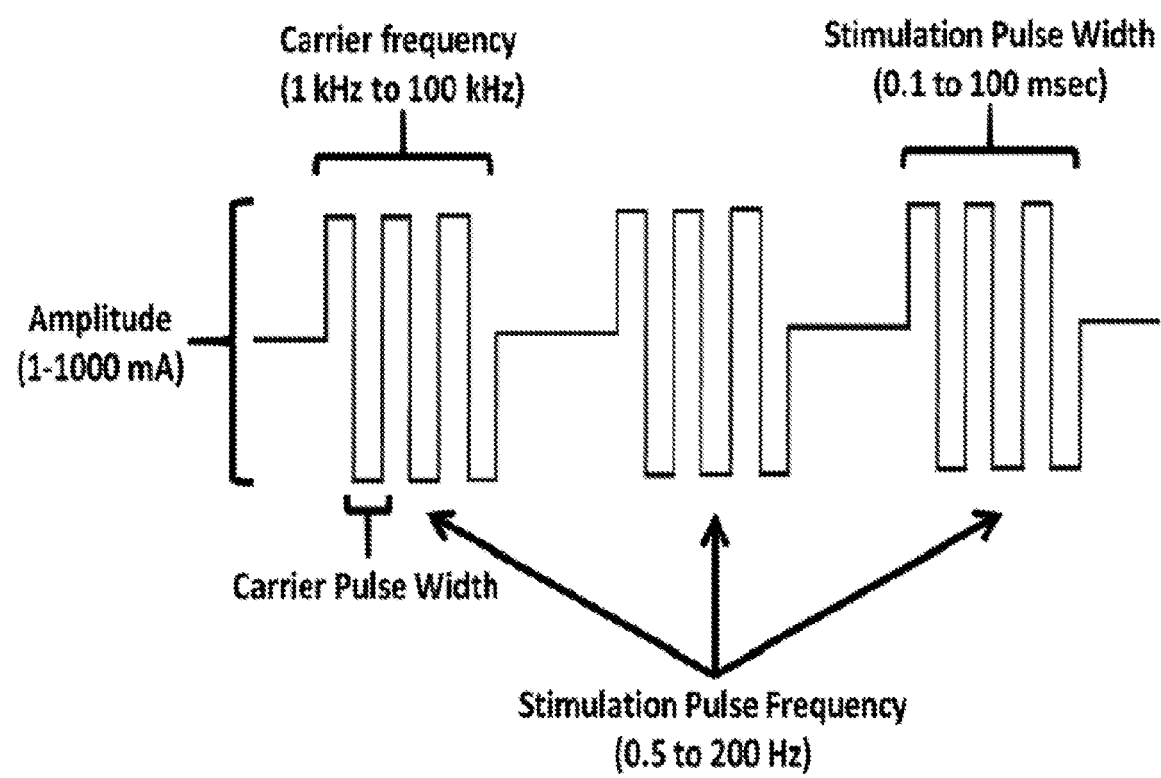

In certain embodiments the transcutaneous stimulation is superimposed on a high frequency carrier signal (see, e.g., FIG. 9). In certain embodiments the high frequency carrier signal ranges from about 1 kHz, or about 3 kHz, or about 5 kHz, or about 8 kHz up to about 30 kHz, or up to about 20 kHz, or up to about 15 kHz. In certain embodiments the carrier signal is about 10 kHz. In certain embodiments the carrier frequency amplitude ranges from about 30 mA, or about 40 mA, or about 50 mA, or about 60 mA, or about 70 mA, or about 80 mA up to about 300 mA, or up to about 200 mA, or up to about 150 mA.

Transcutaneous Stimulation Electrodes.

In certain embodiments the transcutaneous stimulation is applied using any of a number different types of electrodes. Such electrodes include, but are not limited to metal plate electrodes, carbon electrodes, textile electrodes, hydrogel electrodes, needle electrodes, and the like skin (see, e.g., Keller & Kuhn (2008) *J. Automatic Control.,* 18(2): 34-45). In various embodiments, the electrodes can be adhered using, e.g., tape or other adherent, or in other embodiments, the electrodes are self-adhering.

Metal plate electrodes include, but are not limited to metal plate electrodes covered by fabric tissue. Typically the metal plate is fabricated from a biocompatible material. Often stainless steel or silver/silver chloride electrodes are used. The fabric tissue can be cotton but is often a polymer textile material that has a certain degree of elasticity and doesn't wear out fast. Spongy materials have also been used and recommended (see, e.g., Falk et al. (1983) *N. Engl. J. Med.* 309: 1166-1168). In certain embodiments, the fabric can be made conductive with water or electrode gel. It equally distributes the current over the skin in order to prevent skin burns. Care has to be taken that the electrode does not dry out. In the best case (if completely dry) such a dried out electrode isolates the metal plate from the skin. But while drying out, unequally distributed electrical fields under the electrodes may cause skin burns. The electrodes are typically fixed to the skin with elastic straps (see, e.g., Ijezerman et al. (1996) *J. Rehab. Sci.* 9: 86-89).

Self-adhesive electrodes for transcutaneous stimulation use a gel to contact a conductive member with the subject's skin (see, e.g., Keller & Kuhn (2008) *J. Automatic Control.,* 18(2): 34-45). The electrode is typically built in a multi-layer configuration, consisting of multiple layers of hydrogel. The skin interface layer often includes an electrically conductive gel with relatively low peel strength for removably contacting the subject's skin. It has a wet feeling and can be removed relatively easily from the skin. In various illustrative, but non-limiting embodiments, the conductive gel is made from co-polymers derived from polymerization, e.g. of acrylic acid and N-vinylpyrrolidone. In various illustrative embodiments, a second hydrogel layer connects the substrate (a low resistive material like carbon rubber or a wire mesh) with the skin hydrogel layer. This second conductive gel layer has a relatively high peel strength that provides good adhesion to the substrate.

In certain embodiments, carbon loaded silicon electrodes can be used (see, e.g., Baker, D. R. McNeal, L. A. Benton, B. R. Bowman, and R. L. Waters, Neuromuscular electrical stimulation: a practical guide, 3 ed. USA: Rehabilitation Engineering Program, Los Amigos Research and Education Institute, Rancho Los Amigos Medical Center, 1993; Nathan (1989) *J. Automatic Control,* 18(2): 35-45; Patterson & Lockwood (1993) *IEEE Trans. on Neural Systems and Rehabilitation,* 1: 59-62; and the like).

In certain embodiments, the transcutaneous electrical stimulation can be applied via textile electrodes. In one illustrative, but non-limiting embodiment, the textile electrodes can consist of multiple fabric layers (see, e.g., Keller, et al. (2006) *Conf Proc. IEEE Eng. Med. Biol. Soc.* 1: 194-197). In certain embodiments, the fabric layer facing the skin holds embroidered electrode pads made of plasma coated metallized yarn. Because of the thin metal coating (e.g., <25 nm coating particles obtained using a plasma process) the yarn keeps its textile properties and can be embroidered. Silver coatings proved to be most stable and survived 30 washings. A second layer contains the embroidered electrode wiring made from the same materials and was designed such that no short circuits are produced between the pads when stitched together (Id.).

In certain embodiments, the transcutaneous electrical stimulation can be applied via one or more needle electrodes, e.g., as described in PCT Patent Pub No: WO 2017/024276 (PCT/US2016/045898). As described therein, needle electrodes comprise one or more commonly a plurality of electrically conductive solid microprojections (or where the needles are hollow, they are closed at the tip), where the needles (microprojections) have a tip dimension/diameter small enough to facilitate penetration of the stratum corneum on the skin (e.g., less than about 10 µm), where the needles have a length greater than about 20 µm and where the electrically conductive solid needles are electrically coupled to one or more electrical leads. In one illustrative, but non-limiting embodiment, needles with tip size of several m or smaller, and a shaft length of 50 µm or more can be used for transcutaneous electrical stimulation electrodes. In one illustrative, but non-limiting embodiment, a single electrode unit, consisting of 5×5 to 30×30 needles, is about one centimeter in diameter. Multiple electrode units can be further combined into an electrode array, e.g., when larger electrode areas are needed (for example, for the return/ground electrodes). The needle electrodes can provide low impedance transcutaneous stimulation without using a conductive gel or cream. In certain embodiments the needle electrodes comprise one or a plurality of electrically conductive needles, where the needles are solid, or wherein the needles are hollow and have a closed tip, where the needles having an average tip diameter less than about 10 µm and an average length greater than about 10 m or greater than about 20 µm were the electrically conductive needles can be electrically coupled to one or more electrical leads. In certain embodiments, the needle electrode comprises at least about 10 needles, or at least about 15 needles, or at least about 20 needles, or at least about 25 needles, or at least about 30 needles, or at least about 40 needles, or at least about 50 needles, or at least about 100 needles, or at least about 200 needles, or at least about 300 needles, or at least about 400 needles, or at least about 500 needles, or at least about 600 needles, or at least about 700 needles, or at least about 800 needles, or at least about 900 needles, or at least about 1000 needles. In certain embodiments, the needle(s) comprising the needle electrode are of sufficient length to penetrate at least 70%, or at least 80%, or at least 90%), or at least 100%>through the stratum corneum of the skin when the electrode is attached to the surface of a human over the spinal cord. In certain embodiments, the needle(s)s are of a length that does not substantially penetrate subcutaneous tissue below the stratum corneum. In certain embodiments the average length of needle(s) comprising the needle electrode ranges from about 1 μm up to about 100 μm, or from about 1 μm up to about 80 μm, or from about 1 μm up to about 50 μm, or from about 1 μm up to about 30 μm, or from about 1 μm up to about 20 μm, or is at least about 30 μm, or at least about 40 m, or at least about 50 μm, or at least about 60 μm, or at least about 70 μm. In certain embodiments the average length of the needle(s) is less than about 200 μm, or less than about 150 μm, or less than about 100 μm. In certain embodiments the average length of the needle(s) ranges from about 40 to about 60 μm.

In certain embodiments the average length of the needle(s) is about 50 μm. In certain embodiments the tip of the needle(s) ranges in diameter (or maximum cross-sectional dimension) from about 0.1 μm up to about 10 μm, or from about 0.5 μm up to about 6 μm, or from about 1 m up to about 4 μm. In certain embodiments the average separation between two adjacent needles ranges from about 0.01 mm up to about 1 mm, or about 0.05 mm up to about 0.5 mm, or about 0.1 mm up to about 0.4 mm, or up to about 0.3 mm, or up to about 0.2 mm. In certain embodiments the average separation between two adjacent needles ranges from about 0.15 mm up to about 0.25 mm. In certain embodiments the needles are disposed in an area of about 1 cm² or less, or about 0.8 cm² or less, or about 0.6 cm² or less, or about 0.5 cm² or less, or about 0.4 cm² or less, or about 0.3 cm² or less, or about 0.2 cm² or less, or about 0.1 cm² or less. In certain embodiments the needles are disposed in an area of about 2 mm or about 3 mm, or about 4 mm, or about 5 mm, or about 6 mm, or about 7 mm or about 8 mm, or about 9 mm, or about 10 mm by about 2 mm or about 3 mm, or about 4 mm, or about 5 mm, or about 6 mm, or about 7 mm or about 8 mm, or about 9 mm, or about 10 mm. In certain embodiments the electrode comprises about 20×about 20 needles in an area about 4×4 mm.

The foregoing electrodes for transcutaneous electrical stimulation are illustrative and non-limiting. Using the teaching provided herein, numerous other electrodes and/or electrode configurations will be available to one of skill in the art.

Epidural Stimulation

In various embodiments epidural stimulation of the spinal cord is utilized to treat a nerve root palsy, e.g., to achieve a reduction of pain and/or improvement in strength, and/or improvement in motor control, and/or improvement in sensory function in a subject with a nerve root palsy. In certain embodiments the epidural stimulation can be of one or more regions of the cervical spinal cord, and/or one or more regions of the thoracic spinal cord, and/or one or more regions of the lumbar spinal cord. In various embodiments the epidural stimulation can be used alone or in combination with transcutaneous and/or with magnetic stimulation.

Epidural Stimulation of the Brainstem/Suboccipital Spinal Cord or a Region Thereof.

In various embodiments, the methods described herein involve epidural electrical stimulation of the brainstem and/or suboccipital region. As used herein the suboccipital region refers to a region of the neck bounded by the following three muscles of the suboccipital group of muscles: 1) Rectus capitis posterior major—above and medially; 2) Obliquus capitis superior—above and laterally; and 3) Obliquus capitis inferior—below and laterally. In various embodiments, stimulation can be via, inter alia, an implanted electrode or electrode array.

Epidural Stimulation of the Cervical Spine or a Region Thereof

In various embodiments, the methods described herein involve epidural electrical stimulation of the cervical spine (e.g., spinal cord) or a region of the cervical spine (spinal cord) of the subject. Illustrative regions include, but are not limited to, one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

In certain embodiments the epidural stimulation is applied paraspinally over a cervical region identified above (e.g., over vertebrae spanning C0 to C8 or a region thereof, e.g., over a region spanning C2 to C4).

In certain embodiments the epidural stimulation is applied at a region comprising C2-C4 or a region therein. In certain embodiments the stimulation is applied at C3.

Figure 10:
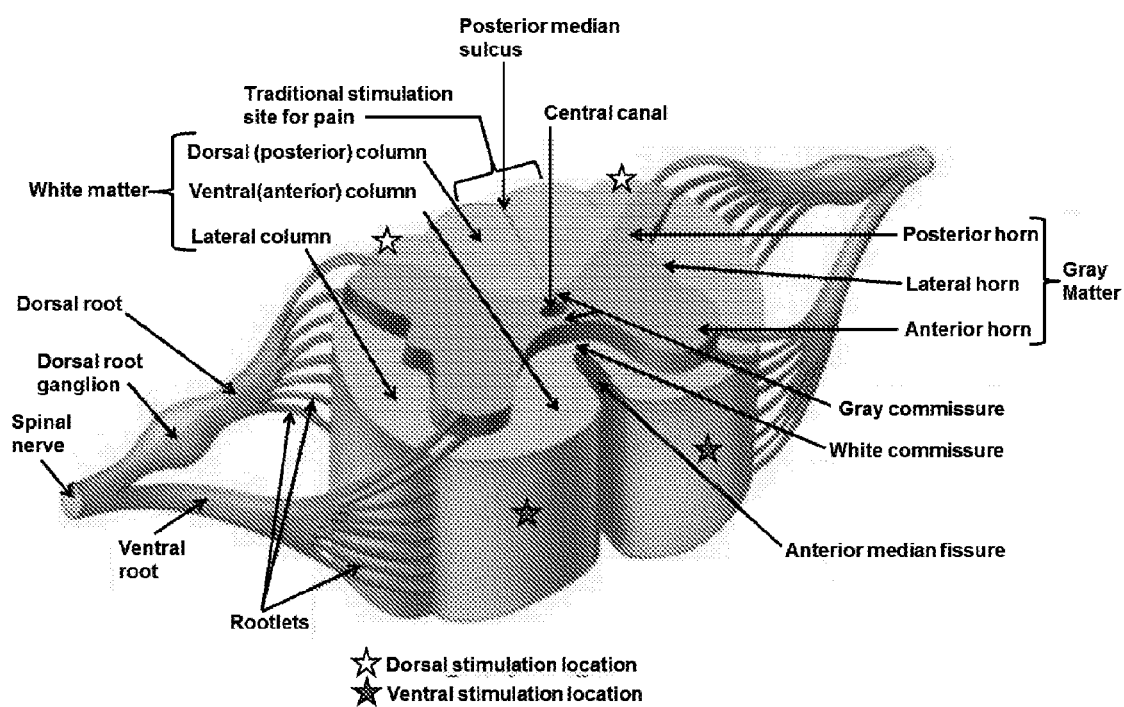
FIG. 10 shows an anterolateral view of the spinal cord illustrating sites of epidural stimulation.

In certain embodiments the epidural stimulation is applied to the dorsal (posterior) column (see, e.g., FIG. 10) and in certain embodiments to the lateral portion of the dorsal (posterior) column as shown in FIG. 10.

In certain embodiments the epidural stimulation is alternatively or additionally applied to a dorsal root, and in certain embodiments to a dorsal root at the point of entry (see, e.g., FIG. 10).

In certain embodiments the epidural stimulation is alternatively or additionally applied to a ventral (anterior) column and in certain embodiments to a lateral portion of the ventral column (see, e.g., FIG. 10).

In certain embodiments the epidural stimulation is alternatively or additionally applied to a ventral root and in certain embodiments to a ventral root at the point of entry.

In various embodiments, the cervical epidural stimulation can be via, inter alia, an implanted electrode or electrode array and/or by use of one or more needle electrodes.

Epidural Stimulation of the Thoracic Spine or a Region Thereof

In various embodiments, the methods described herein additionally or alternatively involve epidural electrical stimulation of the thoracic spine (e.g., spinal cord) or a region of the thoracic spine (spinal cord) of the subject. Illustrative regions include, but are not limited to, one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T1-T11, T11-T12, and T12-T12.

In certain embodiments the epidural stimulation is applied paraspinally over a thoracic region identified above (e.g., over vertebrae spanning T1-T12, or a region thereof, e.g., over a region spanning T2 to T3).

In certain embodiments the epidural stimulation is applied to the dorsal (posterior) column and in certain embodiments to the lateral portion of the dorsal (posterior) column.

In certain embodiments the epidural stimulation is alternatively or additionally applied to a dorsal root, and in certain embodiments to a dorsal root at the point of entry.

In certain embodiments the epidural stimulation is alternatively or additionally applied to a ventral (anterior) column and in certain embodiments to a lateral portion of the ventral column.

In certain embodiments the epidural stimulation is alternatively or additionally applied to a ventral root and in certain embodiments to a ventral root at the point of entry.

In various embodiments, the thoracic epidural stimulation can be via, inter alia, an implanted electrode or electrode array and/or by use of one or more needle electrodes.

Epidural Stimulation of the Lumbar Spine or a Region Thereof.

In various embodiments, the methods described herein additionally or alternatively involve epidural electrical stimulation of the thoracic spine (e.g., spinal cord) or a region of the thoracic spine (spinal cord) of the subject. Illustrative regions include, but are not limited to, one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

In certain embodiments the epidural stimulation is applied paraspinally over a lumbar region identified above or to a region thereof, e.g., over a region spanning L2 to L3).

In certain embodiments the epidural stimulation is applied to the dorsal (posterior) column (and in certain embodiments to the lateral portion of the dorsal (posterior) column.

In certain embodiments the epidural stimulation is alternatively or additionally applied to a dorsal root, and in certain embodiments to a dorsal root at the point of entry.

In certain embodiments the epidural stimulation is alternatively or additionally applied to a ventral (anterior) column and in certain embodiments to a lateral portion of the ventral column.

In certain embodiments the epidural stimulation is alternatively or additionally applied to a ventral root and in certain embodiments to a ventral root at the point of entry.

In various embodiments, the lumbar epidural stimulation can be via, inter alia, an implanted electrode or electrode array and/or by use of one or more needle electrodes.

Epidural Stimulation Parameters.

In certain embodiments, the epidural stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz, or at least about 1 kHz, or at least about 1.5 kHz, or at least about 2 kHz, or at least about 2.5 kHz, or at least about 5 kHz, or at least about 10 kHz, or up to about 25 kHz, or up to about 50 kHz, or up to about 100 kHz. In certain embodiments the epidural is at 10 kHz plus or minus 3 kHz, or plus or minus 2 kHz, or plus or minus 1 kHz, or is about 10 kHz, or is 10 kHz.

In certain embodiments, the epidural stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

In certain embodiments, the epidural stimulation is at an amplitude ranging from 0.5 mA, or from about 1 mA, or from about 2 mA, or from about 3 mA, or from about 4 mA, or from about 5 mA up to about 50 mA, or up to about 30 mA, or up to about 20 mA, or up to about 15 mA, or from about 5 mA to about 20 mA, or from about 5 mA up to about 15 mA.

In certain embodiments, the epidural stimulation is with pulses having a pulse width ranging from about 100 µs up to about 1 ms or up to about 800 µs, or up to about 600 µs, or up to about 500 µs, or up to about 400 µs, or up to about 300 µs, or up to about 200 µs, or up to about 100 µs, or from about 150 µs up to about 600 µs, or from about 200 µs up to about 500 µs, or from about 200 µs up to about 400 µs.

In certain embodiments, the epidural stimulation is applied via a permanently implanted electrode array (e.g., a typical density electrode array, a high density electrode array, etc.).

In certain embodiments, the epidural electrical stimulation is administered via a high-density epidural stimulating array (e.g., as described in PCT Publication No: WO/2012/094346 (PCT/US2012/020112). In certain embodiments, the high-density electrode arrays are prepared using microfabrication technology to place numerous electrodes in an array configuration on a flexible substrate. In some embodiments, epidural array fabrication methods for retinal stimulating arrays can be used in the methods described herein (see, e.g., Maynard (2001) *Annu. Rev. Biomed. Eng.*, 3: 145-168; Weiland and Humayun (2005) *IEEE Eng. Med. Biol. Mag.*, 24(5): 14-21, and U.S. Patent Publications 2006/0003090 and 2007/0142878). In various embodiments, the stimulating arrays comprise one or more biocompatible metals (e.g., gold, platinum, chromium, titanium, iridium, tungsten, and/or oxides and/or alloys thereof) disposed on a flexible material. Flexible materials can be selected from parylene A, parylene C, parylene AM, parylene F, parylene N, parylene D, silicon, other flexible substrate materials, or combinations thereof. Parylene has the lowest water permeability of available microfabrication polymers, is deposited in a uniquely conformal and uniform manner, has previously been classified by the FDA as a United States Pharmacopeia (USP) Class VI biocompatible material (enabling its use in chronic implants) (Wolgemuth, Medical Device and Diagnostic Industry, 22(8): 42-49 (2000)), and has flexibility characteristics (Young's modulus ~4 GPa (Rodger and Tai (2005) *IEEE Eng. Med. Biology*, 24(5): 52-57)), lying in between those of PDMS (often considered too flexible) and most polyimides (often considered too stiff). Finally, the tear resistance and elongation at break of parylene are both large, minimizing damage to electrode arrays under surgical manipulation. The preparation and parylene microelectrode arrays suitable for use in the epidural stimulation methods described herein is described in PCT Publication No: WO/2012/100260 (PCT/US2012/022257). Another suitable microelectrode array is the NEUROPORT® microelectrode array (Cyberkinetics Neurotechnology Systems Inc., Boston, MA) which consists of 96 platinum microelectrodes, arranged in a 10×10 array without electrodes at the corners, affixed to a 4 $mm^2$ silicon base.

In certain illustrative, but non-limiting, embodiments an electrode array is utilized that has a configuration that provides a 32 channel dorsal electrode type A, e.g., substantially as illustrated in FIG. 4A of PCT Application No: PCT/US2018/015098. In certain illustrative, but non-limiting, embodiments an electrode array is utilized that has a configuration that provides a configuration that is a 48 channel dorsal electrode type B, e.g., substantially as illustrated in FIG. 4B in PCT Application No: PCT/US2018/015098. In certain illustrative, but non-limiting, embodiments an electrode array is utilized that has a configuration that provides an 8 channel ventral dual electrode type C, e.g., substantially as illustrated in FIG. 4C of PCT Application No: PCT/US2018/015098. In certain embodiments the electrode array has an inferolateral exiting electrode tail).

The electrode array may be implanted using any of a number of methods (e.g., a laminectomy procedure) well known to those of skill in the art. For example, in some embodiments, electrical energy is delivered through electrodes positioned external to the dura layer surrounding the spinal cord. Stimulation on the surface of the cord (subdurally) is also contemplated, for example, stimulation may be applied to the dorsal columns as well as to the dorsal root entry zone. In certain embodiments the electrodes are carried by two primary vehicles: a percutaneous lead and a laminotomy lead. Percutaneous leads can typically comprise two or more, spaced electrodes (e.g., equally spaced electrodes), that are placed above the dura layer, e.g., through the use of a Touhy-like needle. For insertion, the Touhy-like needle can be passed through the skin, between desired vertebrae, to open above the dura layer. An example of an eight-electrode percutaneous lead is an OCTRODE® lead manufactured by Advanced Neuromodulation Systems, Inc.

Laminotomy leads typically have a paddle configuration and typically possess a plurality of electrodes (for example, two, four, eight, sixteen. 24, or 32) arranged in one or more columns. An example of an eight-electrode, two column laminotomy lead is a LAMITRODE® 44 lead manufactured by Advanced Neuromodulation Systems, Inc. In certain embodiments the implanted laminotomy leads are transversely centered over the physiological midline of a subject. In such position, multiple columns of electrodes are well suited to administer electrical energy on either side of the midline to create an electric field that traverses the midline. A multi-column laminotomy lead enables reliable positioning of a plurality of electrodes, and in particular, a plurality of electrode rows that do not readily deviate from an initial implantation position.

Laminotomy leads are typically implanted in a surgical procedure. The surgical procedure, or partial laminectomy, typically involves the resection and removal of certain vertebral tissue to allow both access to the dura and proper positioning of a laminotomy lead. The laminotomy lead offers a stable platform that is further capable of being sutured in place.

In the context of conventional spinal cord stimulation, the surgical procedure, or partial laminectomy, can involve the resection and removal of certain vertebral tissue to allow both access to the dura and proper positioning of a laminotomy lead. Depending on the position of insertion, however, access to the dura may only require a partial removal of the ligamentum flavum at the insertion site. In certain embodiments, two or more laminotomy leads are positioned within the epidural space of C1-C7 as identified above. The leads may assume any relative position to one another.

In certain embodiments the electrode array is disposed on the nerve roots and/or the ventral surface. Electrode arrays can be inserted into the ventral and/or nerve root area via a laminotomy procedure.

In various embodiments, the arrays are operably linked to control circuitry that permits selection of electrode(s) to activate/stimulate and/or that controls frequency, and/or pulse width, and/or amplitude of stimulation. In various embodiments, the electrode selection, frequency, amplitude, and pulse width are independently selectable, e.g., at different times, different electrodes can be selected. At any time, different electrodes can provide different stimulation frequencies and/or amplitudes. In various embodiments, different electrodes or all electrodes can be operated in a monopolar mode and/or a bipolar mode, using constant current or constant voltage delivery of the stimulation. In certain embodiments time-varying current and/or time-varying voltage may be utilized.

In certain embodiments, the electrodes can also be provided with implantable control circuitry and/or an implantable power source. In various embodiments, the implantable control circuitry can be programmed/reprogrammed by use of an external device (e.g., using a handheld device that communicates with the control circuitry through the skin). The programming can be repeated as often as necessary.

The epidural electrode stimulation systems described herein are intended to be illustrative and non-limiting. Using the teachings provided herein, alternative epidural stimulation systems and methods will be available to one of skill in the art.

Stimulators and Stimulation Systems.

Electrical Stimulators.

Any present or future developed stimulation system capable of providing an electrical signal to one or more regions of the spinal cord may be used in accordance with the teachings provided herein. Electrical stimulation systems (e.g., pulse generator(s)) can be used with both transcutaneous stimulation and epidural stimulation.

In various embodiments, the system may comprise an external pulse generator for use with either a transcutaneous stimulation system or an epidural system. In other embodiments the system may comprise an implantable pulse generator to produce a number of stimulation pulses that are sent to a region in proximity to the spinal cord by insulated leads coupled to the spinal cord by one or more electrodes and/or an electrode array to provide epidural stimulation. In certain embodiments the one or more electrodes or one or more electrodes comprising the electrode array may be attached to separate conductors included within a single lead. Any known or future developed lead useful for applying an electrical stimulation signal in proximity to a subject's spinal cord may be used. For example, the leads may be conventional percutaneous leads, such as PISCES® model 3487A sold by Medtronic, Inc. In some embodiments, it may be desirable to employ a paddle-type lead.

Any known or future developed external or implantable pulse generator may be used in accordance with the teachings provided herein. For example, one internal pulse generator may be an ITREL® II or Synergy pulse generator available from Medtronic, Inc, Advanced Neuromodulation Systems, Inc.'s GENESIS™ pulse generator, or Advanced Bionics Corporation's PRECISION™ pulse generator.

In certain embodiments systems can employ a programmer coupled via a conductor to a radio frequency antenna. This system permits attending medical personnel to select the various pulse output options after implant using radio frequency communications. While, in certain embodiments, the system employs fully implanted elements, systems employing partially implanted elements may also be used in accordance with the teachings provided herein.

In one illustrative, but non-limiting system, a control module is operably coupled to a signal generation module and instructs the signal generation module regarding the signal to be generated. For example, at any given time or period of time, the control module may instruct the signal generation module to generate an electrical signal having a specified pulse width, frequency, intensity (current or voltage), etc. The control module may be preprogrammed prior to implantation or receive instructions from a programmer (or another source) through any known or future developed mechanism, such as telemetry. The control module may include or be operably coupled to memory to store instructions for controlling the signal generation module and may contain a processor for controlling which instructions to send to signal generation module and the timing of the instructions to be sent to signal generation module.

In various embodiments, leads are operably coupled to a signal generation module such that a stimulation pulse generated by signal generation module may be delivered via electrodes.

While in certain embodiments, two leads are utilized, it will be understood that any number of one or more leads may be employed. In addition, it will be understood that any number of one or more electrodes per lead may be employed. Stimulation pulses are applied to electrodes (which typically are cathodes) with respect to a return electrode (which typically is an anode) to induce a desired area of excitation of electrically excitable tissue in a region of the spine. A return electrode such as a ground or other reference electrode can be located on same lead as a stimulation electrode. However, it will be understood that a return electrode may be located at nearly any location, whether in proximity to the stimulation electrode or at a more remote part of the body, such as at a metallic case of a pulse generator. It will be further understood that any number of one or more return electrodes may be employed. For example, there can be a respective return electrode for each cathode such that a distinct cathode/anode pair is formed for each cathode.

In various embodiments, the independent electrodes or electrodes of electrode arrays are operably linked to control circuitry that permits selection of electrode(s) to activate/stimulate and/or controls frequency, and/or pulse width, and/or amplitude of stimulation. In various embodiments, the electrode selection, frequency, amplitude, and pulse width are independently selectable, e.g., at different times, different electrodes can be selected. At any time, different electrodes can provide different stimulation frequencies and/or amplitudes. In various embodiments, different electrodes or all electrodes can be operated in a monopolar mode and/or a bipolar mode, using, e.g., constant current or constant voltage delivery of the stimulation.

In one illustrative but non-limiting system a control module is operably coupled to a signal generation module and instructs the signal generation module regarding the signal to be generated. For example, at any given time or period of time, the control module may instruct the signal generation module to generate an electrical signal having a specified pulse width, frequency, intensity (current or voltage), etc. The control module may be preprogrammed prior to use or receive instructions from a programmer (or another source). Thus, in certain embodiments the pulse generator/controller is configurable by software and the control parameters may be programmed/entered locally, or downloaded as appropriate/necessary from a remote site.

In certain embodiments the pulse generator/controller may include or be operably coupled to memory to store instructions for controlling the stimulation signal(s) and may contain a processor for controlling which instructions to send for signal generation and the timing of the instructions to be sent.

While in certain embodiments, two leads are utilized to provide transcutaneous or epidural stimulation, it will be understood that any number of one or more leads may be employed. In addition, it will be understood that any number of one or more electrodes per lead may be employed. Stimulation pulses are applied to electrodes (which typically are cathodes) with respect to a return electrode (which typically is an anode) to induce a desired area of excitation of electrically excitable tissue in one or more regions of the spine. A return electrode such as a ground or other reference electrode can be located on same lead as a stimulation electrode. However, it will be understood that a return electrode may be located at nearly any location, whether in proximity to the stimulation electrode or at a more remote part of the body, such as at a metallic case of a pulse generator. It will be further understood that any number of one or more return electrodes may be employed. For example, there can be a respective return electrode for each cathode such that a distinct cathode/anode pair is formed for each cathode.

Portable Stimulator for Transcutaneous Electrical Stimulation of the Spinal Cord.

In certain embodiments a portable stimulator is provided for transcutaneous spinal cord stimulation. In various embodiments the portable stimulator is miniaturized, rechargeable battery operated, highly configurable and can be provided to stimulate one channel or multiple channels (e.g., 2, 3, 4, 5, 6, 7, 8, 12, 16, etc.) channels independently, or synchronously, or a combination of both (e.g., a subset of channels are synchronized while other channels are independent).

In various embodiments the portable stimulator is small and operated with a rechargeable battery so that it can be worn by a patient. In certain embodiments the portable stimulator is highly configurable. In certain embodiments the portable stimulator can be voice operated and/or operated using a app on a tablet, computer, or cell phone.

This device can be used to apply a stimulus to the spinal cord (cervical, thoracic, lumbar, etc.) to improve motor function, and/or to improve motor control, and/or to improve sensory function, and/or to reduce pain in subjects with nerve root palsies (e.g., radiculopathies including, but not limited to cauda equina syndrome), and/or to improve motor function of upper and/or lower extremities in subjects with impaired extremity motor function due to spinal cord or brain injury or pathology, e.g., as described herein.

In certain embodiments (e.g., as described below), the stimulator can have adjustments for stimulation primary frequency, amplitude, and pulse width in addition to carrier frequency, amplitude, and pulse width. The device can be manufactured in different numbers of channels (e.g., from 1 up to 16 or 32) with independent controls for each channel or controls to operate multiple channels in consort. In certain embodiments the number of channels controlled by a particular control set can be set by software and/or by hardware.

Figure 11:
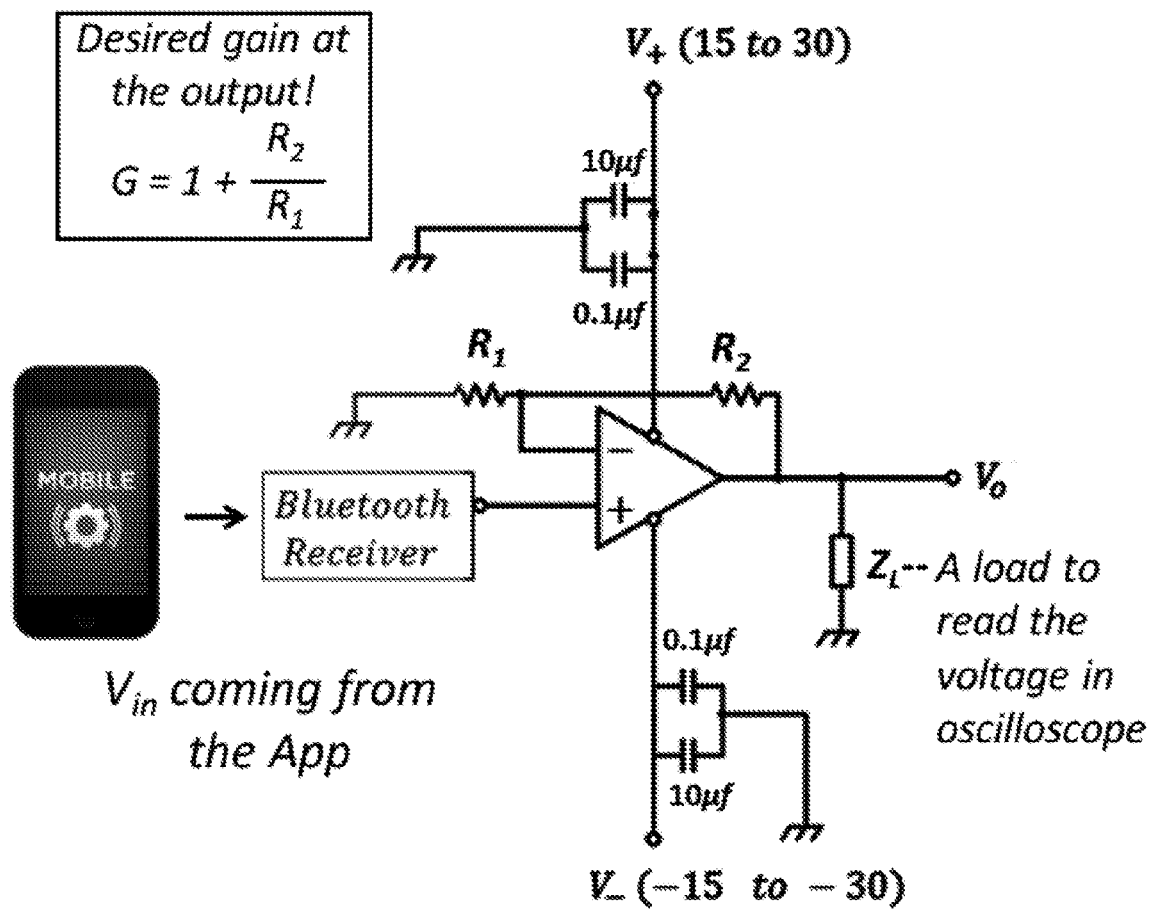
FIG. 11 illustrates a schematic of one embodiment of a portable stimulator: An iphone or android platform can communicate by bluetooth or WiFi with the stimulator with the output signal as described in FIG. 9.
Figure 12:
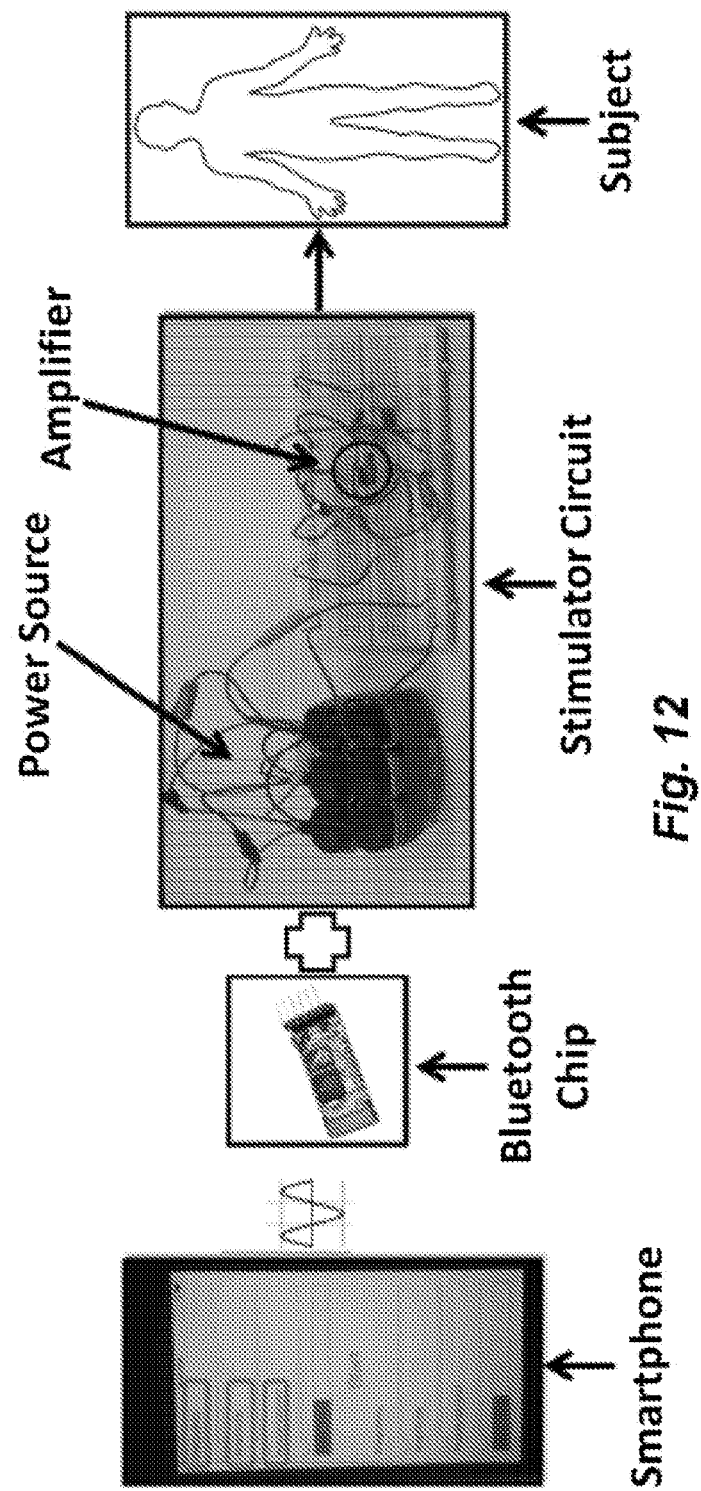
FIG. 12 illustrates a practical demonstration of the stimulator design.

Examples of a portable stimulator are shown in FIGS. 11 and 12. These examples are illustrative and non-limiting. Using the teaching provided herein, numerous other portable stimulators suitable for transcutaneous stimulation in the methods described herein will be available to one of skill in the art.

In certain illustrative, but non-limiting embodiments, an electrical stimulator configured for transcutaneous electrical stimulation is provided where the said stimulator is portable, and battery powered; and the stimulator provides a signal for transcutaneous electrical stimulation superimposed on a high frequency carrier signal. In certain embodiments the stimulator provides user control over one or more parameters stimulation parameters, for example, stimulation frequency, and/or stimulation amplitude, and/or stimulation pulse width, and/or carrier frequency, and/or carrier frequency pulse width, and the like. In certain embodiments any one or more of these parameters are under the user's (patient's) control. In certain embodiments any one or more of these parameters are under the control of a health care provider.

In certain embodiments the stimulator is configured to provide a stimulation frequency ranging from about 0.5 Hz up to about 200 Hz. In certain embodiments the stimulator is configured to provide a stimulation amplitude ranging from about 1 mA up to to about 1000 mA. In certain embodiments the stimulator is configured to provide a stimulation pulse width ranging from about 0.1 msec up to about 100 msec. In certain embodiments the stimulator is configured to provide a carrier signal frequency ranging from about 1 kHz up to about 100 kHz. In certain embodiments the stimulator is configured to provide a carrier signal pulse width compatible with the above-described stimulation and carrier parameters.

In certain embodiments the stimulator is controlled by one or more controls on the stimulator. In certain embodiments the stimulator is remotely controlled (e.g., from a remote site and/or in accordance with a medical plan. In certain embodiments the stimulator is controlled (e.g., one or more stimulation parameters are controlled) by an application on a computer, a smartphone, or a tablet. In certain embodiments the stimulator is voice controlled.

Magnetic Stimulators.

Magnetic nerve stimulators are well known to those of skill in the art. Stimulation is achieved by generating a rapidly changing magnetic field to induce a current at the nerve of interest. Effective nerve stimulation typically requires a current transient of about $10^8$ A/s. In certain embodiments this current is obtained by switching the current through an electronic switching component (e.g., a thyristor or an insulated gate bipolar transistor (IGBT)).

FIG. 1 schematically shows one illustrative, but non-limiting embodiment of a magnetic stimulator. As shown therein, magnetic nerve stimulator 100 comprises two parts: a high current pulse generator producing discharge currents of, e.g., 5,000 amps or more; and a stimulating coil 110 producing magnetic pulses (e.g., with field strengths up to 4, 6, 8, or even 10 tesla) and with a pulse duration typically ranging from about 100 μs to 1ms or more, depending on the stimulator type. As illustrated in FIG. 1, a voltage (power) source 102 (e.g., a battery) charges a capacitor 106 via charging circuitry 104 under the control of control circuitry 114 (e.g., a microprocessor) that accepts information such as the capacitor voltage, power set by the user, and various safety interlocks 112 within the equipment to ensure proper operation, and the capacitor is then connected to the coil via an electronic switching component 108 when the stimulus is to be applied. The control circuitry is operated via a controller interface 116 that can receive user input and/optionally signals from a user and/or from external monitors and adjust stimulus parameters in response to variations/changes in those signals.

When activated, the discharge current flows through the coils inducing a magnetic flux. It is the rate of change of the magnetic field that causes the electrical current within tissue to be generated, and therefore a fast discharge time is important to stimulator efficiency.

As noted earlier the magnetic field is simply the means by which an electrical current is generated within the tissue, and that it is the electrical current, and not the magnetic field, that causes the depolarization of the cell membrane and thus the stimulation of the target nerve.

Since the magnetic field strength falls off with the square of the distance from the stimulating coil, the stimulus strength is at its highest close to the coil surface. The stimulation characteristics of the magnetic pulse, such as depth of penetration, strength and accuracy, depend on the rise time, peak electrical energy transferred to the coil and the spatial distribution of the field. The rise time and peak coil energy are governed by the electrical characteristics of the magnetic stimulator and stimulating coil, whereas the spatial distribution of the induced electric field depends on the coil geometry and the anatomy of the region of induced current flow.

The stimulating coils typically consist of one or more well-insulated copper windings, together with temperature sensors and safety switches.

In certain embodiments the use of single coils is contemplated. Single coils are effective in stimulating the human motor cortex and spinal nerve roots. To date, circular coils with a mean diameter of 80-100 mm have remained the most widely used magnetic stimulation. In the case of circular coils the induced tissue current is near z on the central axis of the coil and increases to a maximum in a ring under the mean diameter of coil.

A notable improvement in coil design has been that of the double coil (also termed butterfly or figure eight coil). Double coils utilize two windings, normally placed side by side. Typically double coils range from very small flat coils to large contoured versions. The main advantage of double coils over circular coils is that the induced tissue current is at its maximum directly under the center where the two windings meet, giving a more accurately defined area of stimulation. In certain embodiments, the use of an angled butterfly coil may provide improved effects of stimulation.

The stimulating pulse may be monophasic, symmetrical biphasic (with or without an interphase gap), asymmetric biphasic (with or without an interphase gap), or symmetric or asymmetric polyphasic (e.g., burst stimulation having a particular burst duration and carrier frequency). Each of these has its own properties and so may be useful in particular circumstances. For neurology, single pulse, monophasic systems are generally employed; for rapid rate stimulators, biphasic systems are used as energy must be recovered from each pulse in order to help fund the next. Polyphasic stimulators are believed to have a role in a number of therapeutic applications.

Descriptions of magnetic nerve stimulators can be found, inter alia, in U.S. patent publications US 2009/0108969 A1, US 2013/0131753 A1, US 2012/0101326 A1, IN: U.S. Pat. Nos. 8,172,742, 6,086,525, 5,066,272, 6,500,110, 8,676, 324, and the like. Magnetic stimulators are also commercially availed from a number of vendors, e.g., MAGVENTURE®, MAGSTIM®, and the like.

Identifying Location of Target Location for Stimulation

In certain embodiments, a method for identifying a target location for stimulation in a patient may include stimulating the spinal cord at one or more trial target locations, measuring the evoked motor response(s) elicited by stimulating tissue at each of the one or more trial target locations, and identifying the trial target location where stimulation evokes the greatest motor response. For example, a stimulator (e.g., electric stimulator such as electrodes, magnetic stimulator such as magnetic wand, or other suitable stimulator) may be placed over the general spinal region associated with the weakened or paralyzed muscle. For example, for deltoid muscle weakness, stimulation may be delivered to the C5 location at a suitable frequency (e.g., 1 Hz). The muscle evoked response to the stimulation may be assessed and then observed in the limb contralateral to the weakened or paralyzed muscle. The stimulation and motor response assessment may be repeated as the position of the stimulator is finely adjusted (e.g., moved to various trial target locations within the general region), until the trial target location resulting in the largest evoked response is identified. Thus, trial target location resulting in the largest evoked motor response may be considered a suitable target location for the stimulation treatment in order to rehabilitate the weakened or paralyzed muscle and/or ipsilateral nerve root.

Use of Neuromodulatory Agents.

In certain embodiments, the transcutaneous and/or epidural and/or magnetic stimulation methods described herein are used in conjunction with various pharmacological agents, particularly pharmacological agents that have neuromodulatory activity (e.g., are monoamergic). In certain embodiments, the use of various serotonergic, and/or dopaminergic, and/or noradrenergic, and/or GABAergic, and/or glycinergic drugs is contemplated. These agents can be used in conjunction with epidural stimulation and/or transcutaneous stimulation and/or magnetic stimulation as described above. This combined approach can help to put the spinal cord in an optimal physiological state for neuromodulation utilizing the methods described herein.

In certain embodiments, the drugs are administered systemically, while in other embodiments, the drugs are administered locally, e.g., to particular regions of the spinal cord. Drugs that modulate the excitability of the spinal neuromotor networks include, but are not limited to combinations of noradrenergic, serotonergic, GABAergic, and glycinergic receptor agonists and antagonists.

Dosages of at least one drug or agent can be between about 0.001 mg/kg and about 10 mg/kg, between about 0.01 mg/kg and about 10 mg/kg, between about 0.01 mg/kg and about 1 mg/kg, between about 0.1 mg/kg and about 10 mg/kg, between about 5 mg/kg and about 10 mg/kg, between about 0.01 mg/kg and about 5 mg/kg, between about 0.001 mg/kg and about 5 mg/kg, or between about 0.05 mg/kg and about 10 mg/kg.

Drugs or agents can be delivery by injection (e.g, subcutaneously, intravenously, intramuscularly), orally, rectally, or inhaled.

Illustrative pharmacological agents include, but are not limited to, agonists and antagonists to one or more combinations of serotonergic: 5-HT1A, 5-HT2A, 5-HT3, and 5HT7 receptors; to noradrenergic alpha 1 and 2 receptors; and to dopaminergic D1 and D2 receptors (see, e.g., Table 1). In certain embodiments, suitable pharmacological agents may include selective serotonin reuptake inhibitors (SSRI) such as fluoxetine, etc.

TABLE 1

Illustrative pharmacological agents.

| Name | Target | Action | Route | Typical Dose (mg/Kg) | Typical Range mg/kg |
|---|---|---|---|---|---|
| Serotonergic receptor systems | | | | | |
| 8-OHDPAT | 5-HT1A7 | Agonist | S.C. | 0.05 | 0.045-0.3 |
| Way 100.635 | 5-HT1A | Antagonist | I.P. | 0.5 | 0.4-1.5 |
| Quipazine | 5-HT2A/C | Agonist | I.P. | 0.2 | 0.18-0.6 |
| Ketanserin | 5-HT2A/C | Antagonist | I.P. | 3 | 1.5-6.0 |
| SR 57227A | 5-HT3 | Agonist | I.P. | 1.5 | 1.3-1.7 |
| Ondanesetron | 5-HT3 | Antagonist | I.P. | 3 | 1.4-7.0 |
| SB269970 | 5-HT7 | Antagonist | I.P. | 7 | 2.0-10.0 |
| Noradrenergic receptor systems | | | | | |
| Methoxamine | Alpha1 | Agonist | I.P. | 2.5 | 1.5-4.5 |
| Prazosin | Alpha1 | Antagonist | I.P. | 3 | 1.8-3.0 |
| Clonidine | Alpha2 | Agonist | I.P. | 0.5 | 0.2-1.5 |
| Yohimbine | Alpha2 | Antagonist | I.P. | 0.4 | 0.3-0.6 |
| Dopaminergic receptor systems | | | | | |
| SKF-81297 | D1-like | Agonist | I.P. | 0.2 | 0.15-0.6 |
| SCH-23390 | D1-like | Antagonist | I.P. | 0.15 | 0.1-0.75 |
| Quinipirole | D2-like | Agonist | I.P. | 0.3 | 0.15-0.3 |
| Eticlopride | D2-like | Antagonist | I.P. | 1.8 | 0.9-1.8 |

The foregoing methods are intended to be illustrative and non-limiting. Using the teachings provided herein, other methods involving transcutaneous electrical stimulation and/or epidural electrical stimulation and/or magnetic stimulation and/or the use of neuromodulatory agents to improve motor function, and/or to improve motor control, and/or to improve sensory function, and/or to reduce pain in subjects with nerve root palsies (e.g., radiculopathies including, but not limited to cauda equina syndrome) and/or to improve motor function of upper and/or lower extremities in subjects with impaired extremity motor function due to spinal cord or brain injury or pathology will be available to one of skill in the art.

EXAMPLES

The following examples are offered to illustrate, but not to limit the claimed invention.

Example 1

Transcutaneous Electrical Stimulation for Treatment of Lumbar Nerve Root Palsy

Figure 2:
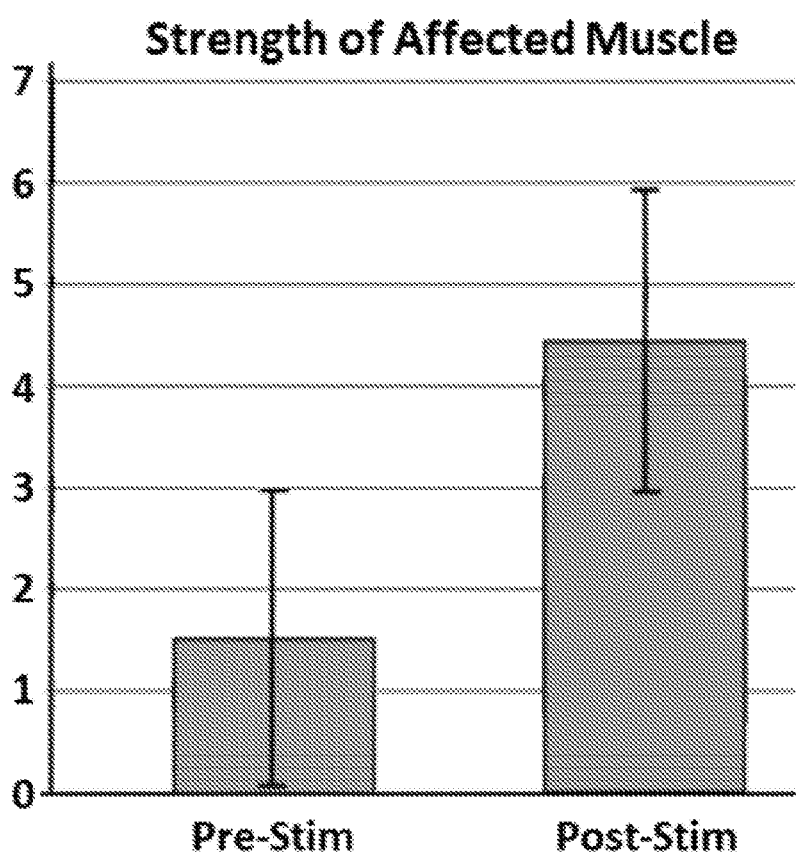
FIG. 2 illustrates motor strength in patients with nerve root palsy treated with transcutaneous electrical stimulation. Four subjects with chronic lumbar nerve root palsy (L5 or S1) were treated with transcutaneous electrical stimulation over the course of 1-2 months. Motor strength assessed demonstrated significant improvement in in all subjects. ($P<0.005$ in pre- to post-comparisons, by two-tailed t-test. T12 and L5 or S1 stimulation locations. 30 Hz stimulation frequency).

FIG. 2 illustrates improvements in motor strength in patients with nerve root palsy treated with transcutaneous electrical stimulation. Four subjects with chronic lumbar nerve root palsy (L5 or S1) were treated with transcutaneous electrical stimulation over the course of 1-2 months. Motor strength assessed demonstrated significant improvement in in all subjects. (P<0.005 in pre- to post-comparisons, by two-tailed t-test. T12 and L5 or S1 stimulation locations. 30 Hz stimulation frequency).

Example 2

Restoration of Upper Extremity Function Using Magnetic Stimulation

Figure 3:
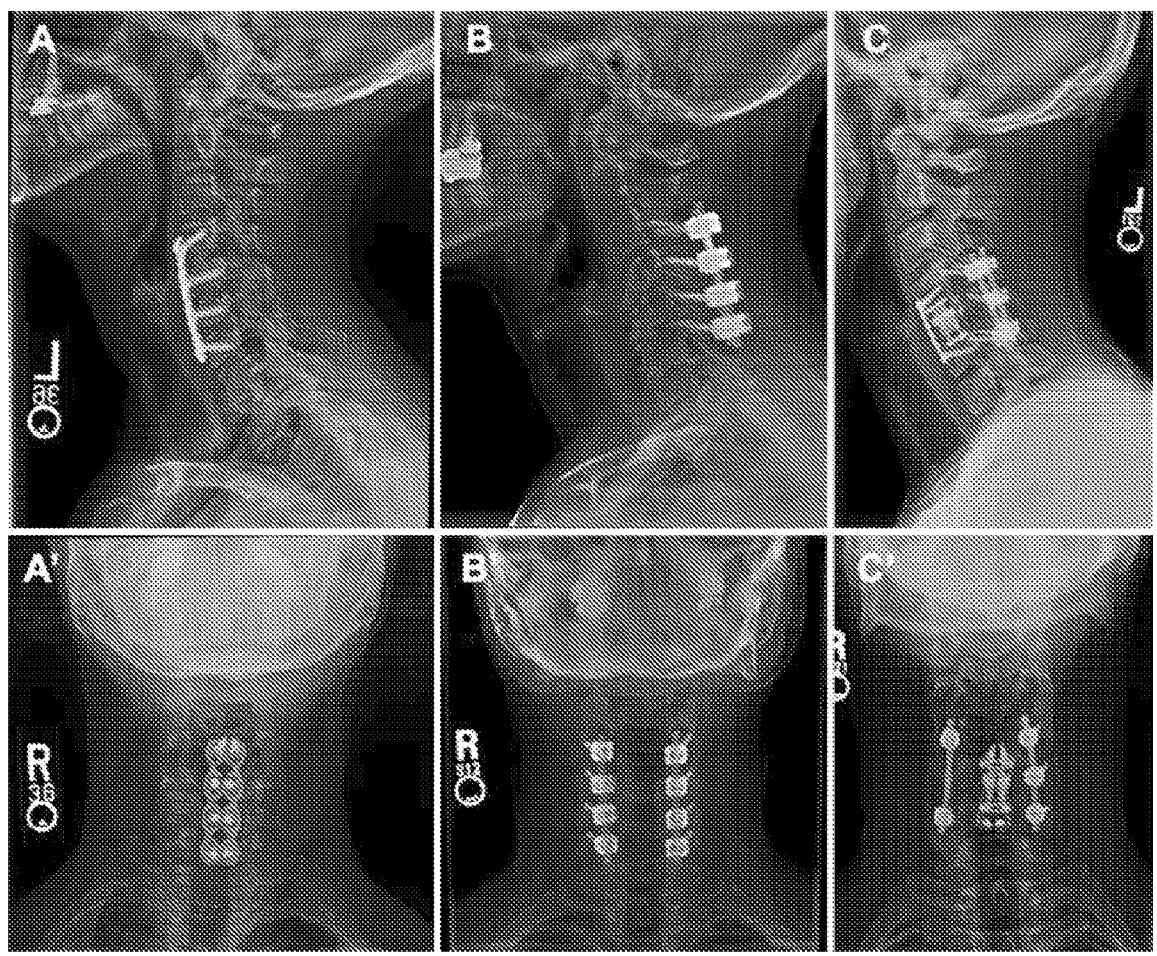
FIG. 3 shows cervical radiographs of representative SCI subjects Prior to EMSS. Subjects (N=10) in the preliminary group have a variety of cervical instrumentation for stabilization after SCI as evidenced by lateral (A, B, C) and anterior-posterior (A', B', C') views. Patients have anterior instrumentation (A, A'), posterior instrumentation (B, B'), or both (C, C').

FIG. 3 shows cervical radiographs of representative SCI subjects prior to magnetic stimulation (EMSS). Subjects in the preliminary group have a variety of cervical instrumentation for stabilization after SCI as evidenced by lateral (A, B, C) and anterior-posterior (A', B', C') views. Patients have anterior instrumentation (A, A'), posterior instrumentation (B, B'), or both (C, C'). While some earlier instrumentation, such as austenitic 316 stainless steel, is ferromagnetic, most modern day instrumentation is composed of Ti6Al7Nb titanium that is non-ferromagnetic, therefore the instrumentation should not interfere with magnetic energy. Furthermore, the majority of instrumentation does not obscure the dorsal aspect of the spinal cord (see B, D, F), which allows electromagnetic neuromodulation to access the dorsal spinal cord. We have found that subjects with instrumentation can benefit from EMSS.

Figure 4:
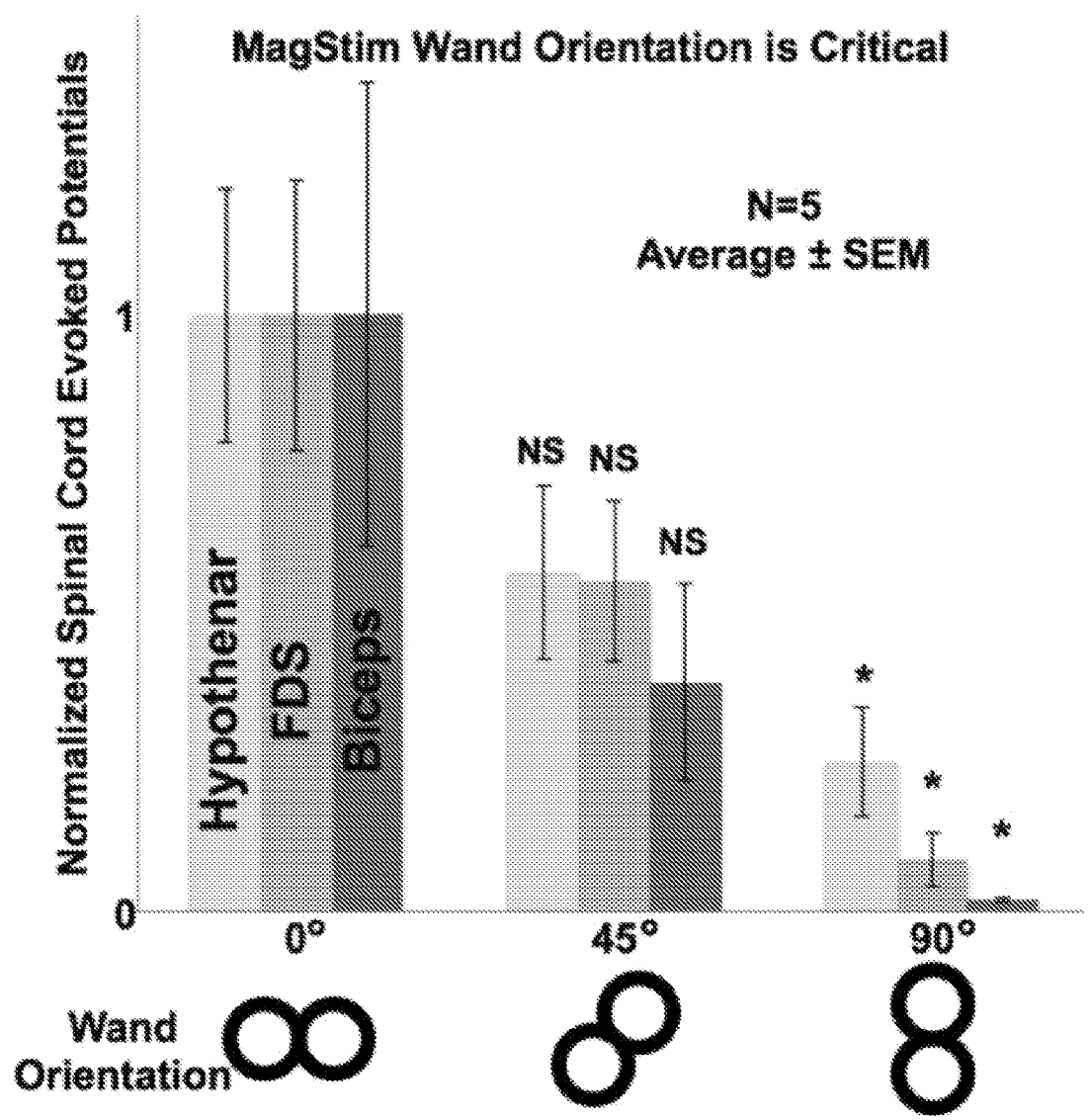
FIG. 4 shows that MagStim wand orientation is important. Subjects (N=5) with stable cervical SCI (>1 year) and implanted stabilization titanium hardware were evaluated for their ability to produce Spinal Cord Evoked Potentials (SCEPs) with three orientations of the stimulation wand. A zero-degree orientation is best suited for these studies. Other orientations have substantial attenuation in responses. Two-tailed Students T-test with Bonferroni post-hoc correction. * $p<0.05$. Device: MagPro (MagVenture, Atlanta) with Cool-B35 Butterfly Coil and 10s 5 Hz biphasic stimulation.

FIG. 4 shows that MagStim wand orientation may be important. Subjects with stable cervical SCI (>1 year) and implanted stabilization titanium hardware were evaluated for their ability to produce Spinal Cord Evoked Potentials (SCEPs) with three orientations of the stimulation wand. A zero-degree orientation was best suited for these studies.

Figure 5:
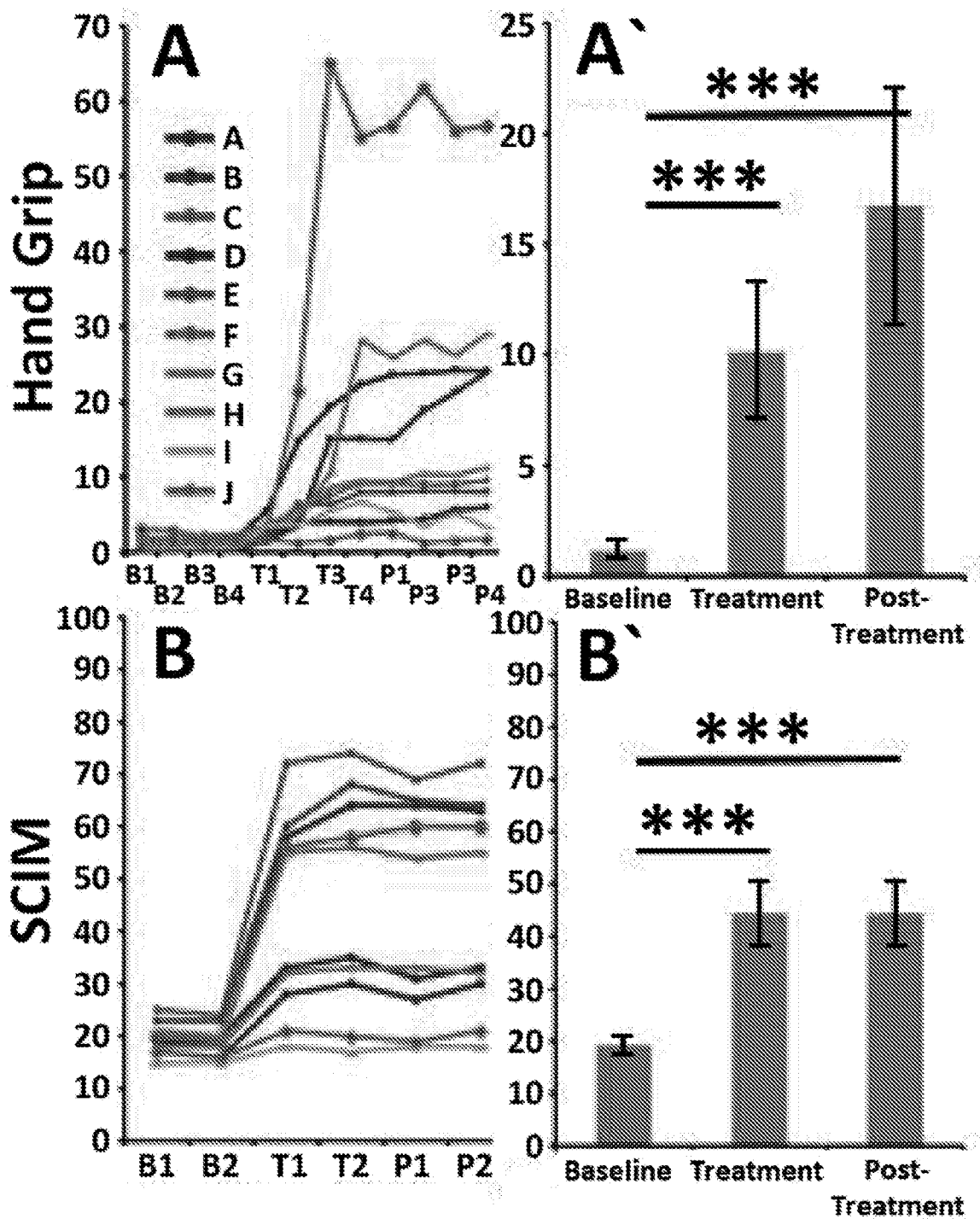
FIG. 5, panels A-F', illustrates magnetic neuromodulation of the cervical cord in SCI. Five subjects with stable SCI (>1 year) were evaluated with a battery of tests once a week for 3 months to establish a pre-treatment baseline, with the last month shown here (Pre). Subjects were then treated weekly with EMSS and tested weekly for a month (Treat). Subjects were then tested weekly for a month without treatment to determine the durability of the treatment (Post). Panel A: Handgrip. This is a direct measure of the force generated by subjects with their dominant hand. Individuals all had improved performance of various magnitudes. Panel A': Subjects had an average of 5-fold improvements in strength that were highly significant. Panel B: Spinal Cord Independence Measure (SCIM) is a 17-item measure of 0-100 with a Minimally Clinical Important Difference of 4 points. There may be two classes of response in this measure. Panel B': Subjects had ~30 point increase indicating a robust clinical improvement which was significant. Panel C: Modified Ashworth is a measure of spasticity of 1-4 on ten muscles for a 40-point max. All subjects had improvement in overall spasticity in arms and legs, although subject C had modest improvements. Panel C': Average spasticity was reduced by half. Panel D: Arm Reach Action Test (ARAT) is a 19-item measure of 0-60. Panel D': Subjects had ~50% increase in performance on this measure. Panel E: International Standards for Neurological Classification of Spinal Cord Injury (ISNCSCI) upper extremity motor exam of five muscles in each arm on a scale for 0-5 for a 50-point max. Minimally Clinical Important Difference is 1 point. Panel E': Subjects had ~30% improvements. Panel F: Columbia Suicide Survey. Subject C had substantial suicidality that was reduced. Panel F': no subjects reported suicidality by the last month of the study. Two Tailed Students T-test with Bonferroni post-hoc correction. * $p<0.05$;  $p<0.01$; * $p<0.001$. Device: MagPro (MagVenture, Atlanta) with Cool-B35 Butterfly Coil and Biphasic stimulation at 30 Hz.

FIG. 5 illustrates magnetic neuromodulation of the cervical cord in SCI. Ten subjects with stable SCI (>1 year) were evaluated with a battery of tests once a week for 3 months to establish a pre-treatment baseline, with the last month shown here (Pre). Subjects were then treated weekly with EMSS and tested weekly for a month (Treat). Subjects were then tested weekly for a month without treatment to determine the durability of the treatment (Post). Panel A shows a direct measure of the handgrip force generated by subjects with their dominant hand. Individuals all had improved performance of various magnitudes. As shown in panel A', subjects had an average of 5-fold improvements in strength that were highly significant. Panel B shows Spinal Cord Independence Measure (SCIM), a 17-item measure of 0-100 with a Minimally Clinical Important Difference of 4 points. There may be two classes of response in this measure. Panel B' shows that subjects had ~30 point increase indicating a robust clinical improvement which was significant. Panel C shows a modified Ashworth score that is a measure of spasticity of 1-4 on ten muscles for a 40-point max. All subjects had improvement in overall spasticity in arms and legs, although subject C had modest improvements. Panel C' shows that average spasticity was reduced by half. Panel D shows the results of an Arm Reach Action Test (ARAT) which is a 19-item measure of 0-60. As shown in panel D', subjects had ~50% increase in performance on this measure. Panel E shows the International Standards for Neurological Classification of Spinal Cord Injury (ISNCSCI) upper extremity motor exam of five muscles in each arm on a scale for 0-5 for a 50-point max. Minimally Clinical Important Difference is 1 point. As shown in panel E', subjects had ~30% improvements. Panel F shows the results of Columbia Suicide Survey. Subject C had substantial suicidality that was reduced. As shown in panel F', no subjects reported suicidality by the last month of the study.

FIG. 6 shows that BUS+EMSS treatment can act rapidly. In a separate cohort, baseline function was established for 7 weeks followed by treatment with BUS treatment. EMSS was conducted on day 3, 5, and 7 of BUS treatment. As shown in panel A, a rapid and significant increase in grip strength was seen even in the first session. By the last session, as summarized in panel A', there was a robust increase in grip strength both before and after stimulation. In a measure of precision hand movements where a subject follows a sine wave on a screen by moving a pointer, substantial increases were seen in the first session as shown in panel B. Although not reaching significance, these data appear to trend towards improvement as shown in panel B'.

FIG. 7 shows the effect of EMSS treatment on spinal cord evoked potentials. Subjects with stable cervical SCI were evaluated for their ability to produce Spinal Cord Evoked Potentials (SCEPs) with EMSS pre- and post-treatment. The Y-axis indicates the size of the evoked potential measured by EMG at the relevant muscle. The X-axis is increasing stimulation intensity with EMSS. The top panel illustrates evaluation of two subjects before treatment. Both subjects have some activity at all the motor pools evaluated, although not apparent at this scale. The bottom panel illustrates evaluation of the same two subjects post-treatment. As shown in the bottom panel, a large treatment effect is seen in the SCEPs reflecting changes in spinal cord circuitry related to motor function. This technique can be used to measure the inherent segmental responsiveness of the cord. This technique does not require volitional control of the segmental levels in question and is therefore well suited to evaluating subjects with paralysis.

Figure 8:
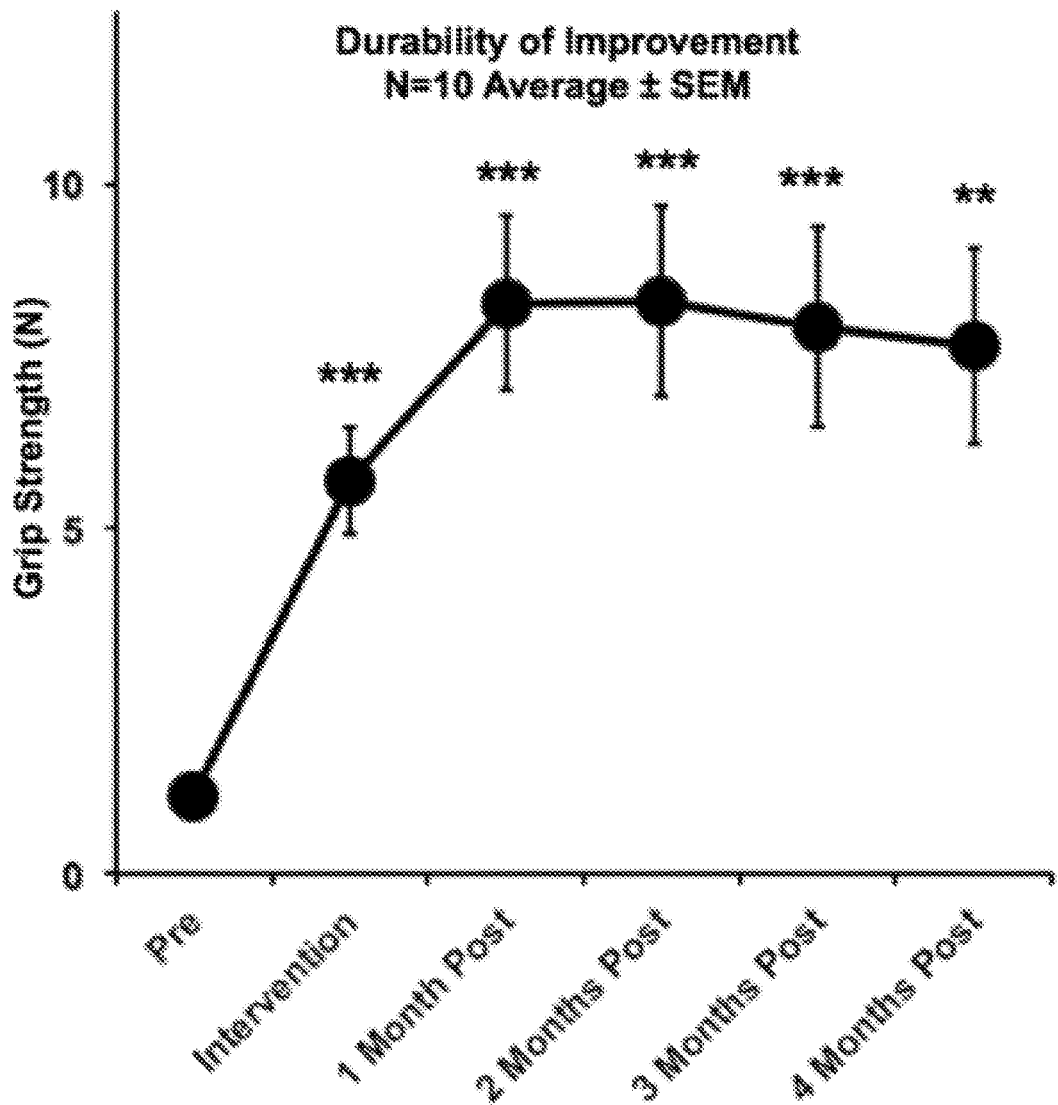
FIG. 8 shows that training and EMSS produce a long-lasting therapeutic effect. Time course of grip strength in stable (>1 year) cervical SCI subjects (N=10). Pre-intervention baseline grip strength was fairly low as would be expected in this subject population. After one month of training using a 120 second 30 Hz stimulation, substantial improvements were measured. These results continued to improve in the absence of EMSS at 1 month post-intervention and remained stable for the 2-month evaluation. At months 3 and 4, the therapeutic effect appears to be waning; however, these points are not statistically distinct from the 1 and 2 month points. A 4-month improvement is of high utility. Two Tailed Students T-test with Bonferroni post-hoc correction. N=10,  $p<0.01$; * $p<0.001$. Device: MagVenture (MagVenture, Atlanta) with Cool-B35 Butterfly Coil and Biphasic stimulation at 30 Hz.

FIG. 8 shows that training and EMSS may produce a long-lasting therapeutic effect. Specifically, FIG. 9 illustrates grip strength in stable (>1 year) cervical SCI subjects (N=10) over time, from pre-intervention to 4 months post-intervention. Pre-intervention baseline grip strength was fairly low as would be expected in this subject population. After one month of training using a 120 second 30 Hz stimulation, substantial improvements were measured. These results continued to improve in the absence of EMSS at 1 month post-intervention and remained stable for the 2-month evaluation. At months 3 and 4, the therapeutic effect appears to be waning; however, these points are not statistically distinct from the 1 and 2 month points. A 4-month improvement is of high utility.

Example 3

Restoration of Lower Extremity Function

As shown in Table 2, subjects administered with spinal stimulation demonstrated acute recovery of lower extremity volitional movement.

TABLE 2

Subject implanted with cervical epidural electrodes demonstrated acute recovery of lower extremity volitional movement with cervical epidural stimulation (lower panel) which was not present when the stimulation was off (upper panel).

ISNCSCI Examination Stimulation Phase

| Motor Score | | Sensory Score | |
|---|---|---|---|
| Without Stimulation | | | |
| Left Upper Extremity | Right Upper Extremity | Left Light Touch | Right Light Touch |
| 11 | 11 | 21 | 24 |
| Left Lower Extremity | Right Lower Extremity | Left Pin Prick | Right Pin Prick |
| 0 | 0 | 12 | 14 |
| With Treatment Stimulation | | | |
| Left Upper Extremity | Right Upper Extremity | Left Light Touch | Right Light Touch |
| 14 | 12 | 17 | 19 |
| Left Lower Extremity | Right Lower Extremity | Left Pin Prick | Right Pin Prick |
| 3 | 0 | 14 | 16 |

Example 4

Treatment of Nerve Root Palsy

Figure 13:
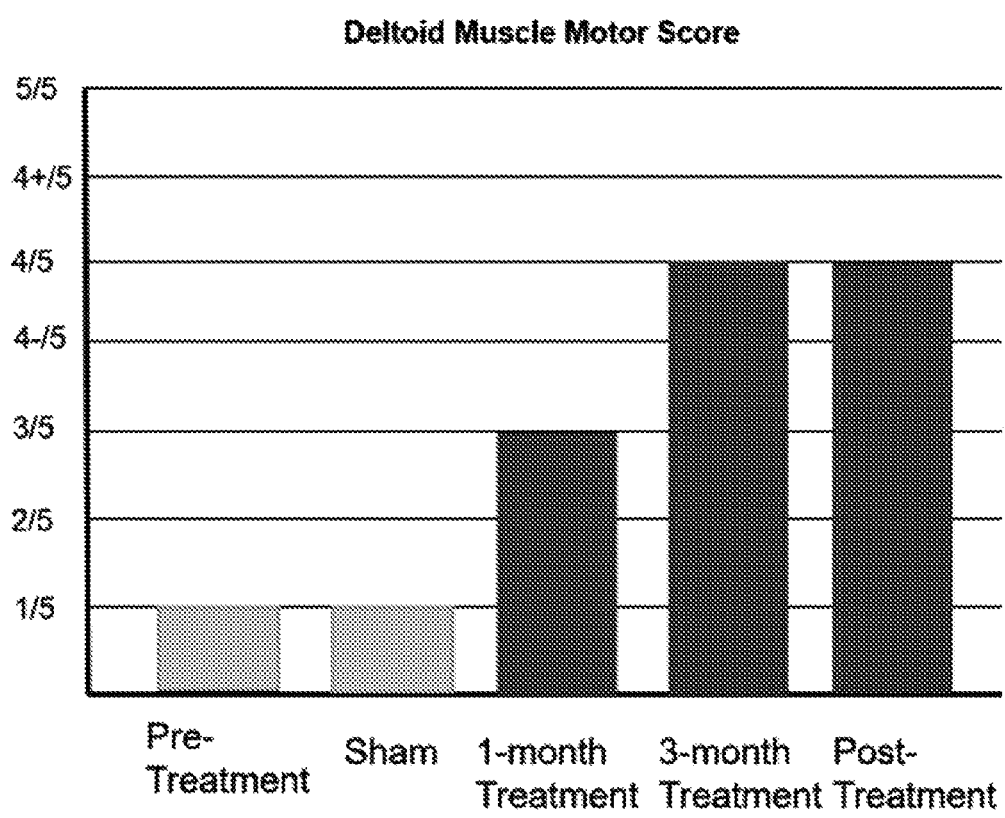
FIG. 13 shows the results of transcutaneous magnetic stimulation in a post-operative patient with C5 nerve root palsy.

FIG. 13 illustrates results of treatment of a 49 year-old patient with right (dominant-side) C5 deltoid nerve root palsy sustained after surgical intervention. Prior to treatment (Pre-Treatment), the patient was examined and muscle strength was graded three times over the course of 3 weeks to document stability of function and determine a baseline Pre-Treatment deltoid muscle motor score. Additionally, the patient was subjected to daily standardized physical therapy treatment of the deltoid muscle to ensure full conditioning. This was continued throughout the study. The patient was treated with Sham treatment, followed by transcutaneous magnetic stimulation treatment. During Sham treatment, the patient was subjected to weekly treatment with sham coil that lasted 3 months. No increase in muscle strength was observed as a result of the Sham treatment. Transcutaneous magnetic stimulation treatment was subsequently conducted weekly (15 minute treatment) over the course of 3 months with a transcutaneous magnetic stimulator (C5 spinal cord segment, 30 Hz, 60-70% intensity of 2 Tesla field strength; biphasic, single pulse, 250 µs) in conjunction with maximal voluntary contraction effort of the deltoid muscle. Assessment of muscle strength was made at 1-month and 3-months. At the 1-month assessment, the patient demonstrated a greater deltoid muscle motor score relative to both Pre-Treatment and Sham assessments. At the 3-month assessment, the patient demonstrated an even greater deltoid muscle motor score relative to the 1-month assessment. After three months, treatment ceased, and the patient was examined again at a six months after discontinuation of treatment. As shown in FIG. 13, the patient retained the same increased deltoid muscle motor score at the 6-month assessment as at the 3-month assessment. Thus, the repeated transcutaneous magnetic stimulation treatment provided a persistent improvement in muscle strength for the patient.

Figure 14:
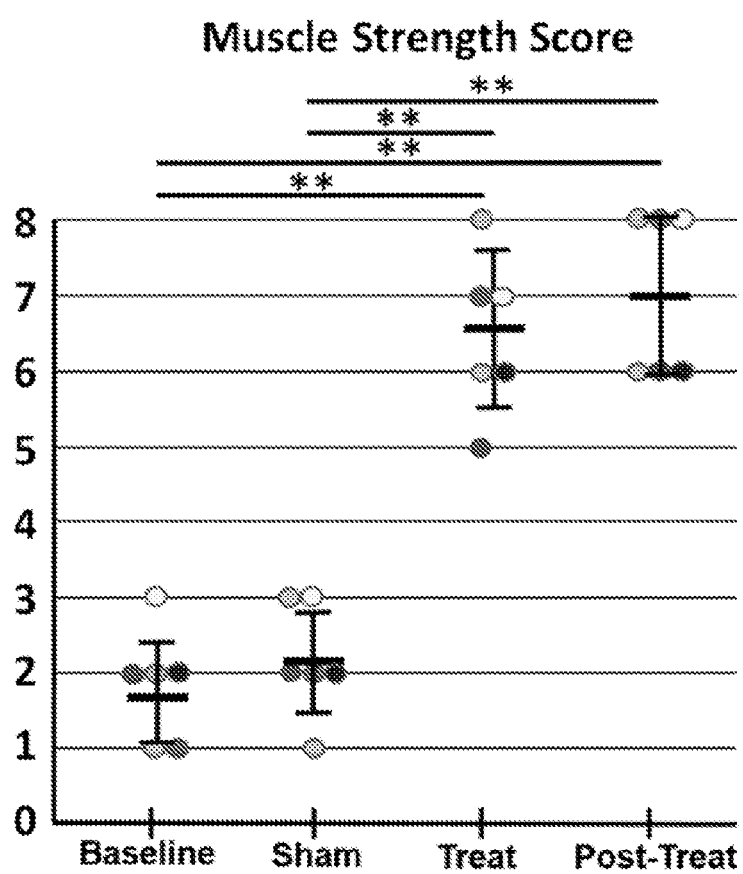
FIG. 14 shows the percent muscle strength improvement in 6 patients with nerve root palsy treated with transcutaneous magnetic stimulation.

FIG. 14 illustrates results of sham and actual stimulation treatment of subjects with nerve root palsy secondary to treated disc herniation, trauma, or intraoperative injury (at spinal levels of C5, C7, L5, S1). Grading of muscle strength at various timepoints was conducted with standardized motor strength grading of full strength being 5/5 strength on an 8 point scale (0-5, with 4−, 4, 4+). Prior to commencement of sham and actual treatment, patients underwent intensive rehabilitation of the affected muscle for a period of three months to ensure proper conditioning of all muscles. After establishing a baseline muscle strength (Baseline), the subjects underwent sham treatment with sham stimulation for 3 months and were subjected to muscle strength assessment following sham treatment (Sham). Subsequently, the subjects underwent actual treatment for 3 months and were subjected to muscle strength assessment following actual treatment (Treat). In actual treatment, patients were subjected to a stimulation protocol (30 Hz, 60-70% intensity of 2 Tesla field strength; biphasic, single pulse, 250 µs) with stimulation applied to the relevant spinal level of affected nerve root for each patient. Subsequently, each patient was subjected to strength assessment after 3 months of discontinuation of treatment (Post-Treat). As shown in FIG. 14, actual treatment stimulation significantly improved strength in all subjects while sham stimulation had no effect (see, FIG. 14). This effect was even present 3 months after withdrawal of treatment, thereby demonstrating a persistent improvement in muscle strength after repeated transcutaneous magnetic stimulation treatment was discontinued. $P<0.001$ by one-way ANOVA; post-hoc Tukey. **$P<0.01$.

Figure 15:
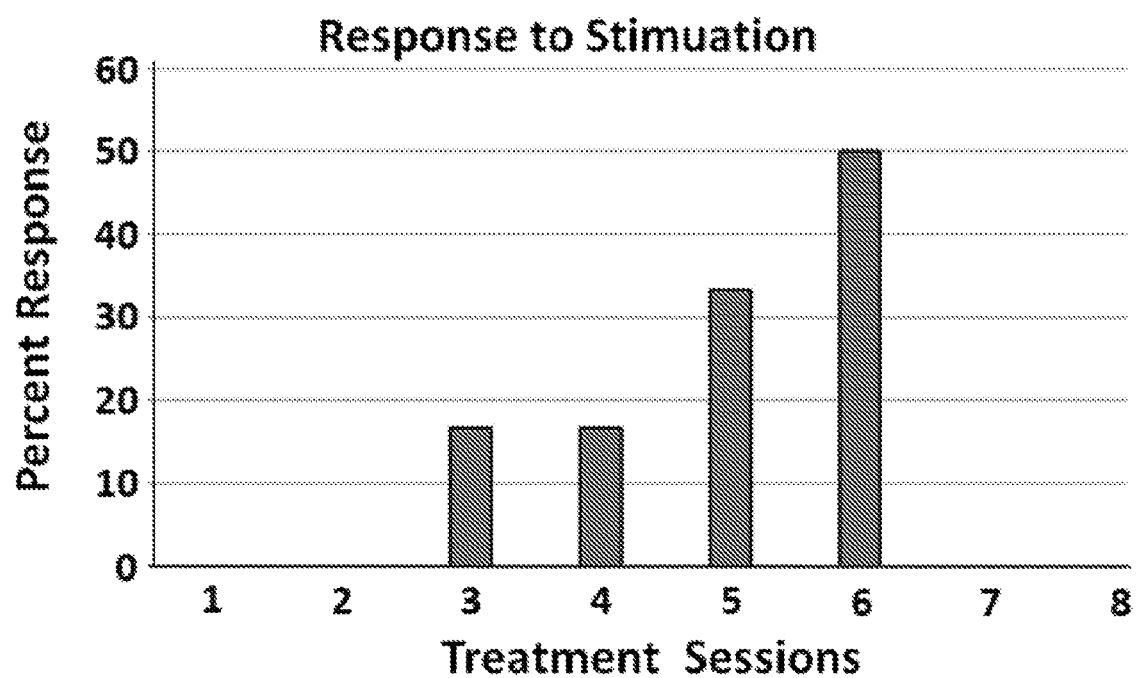
FIG. 15 shows the percent of responders at treatment sessions.

The data in FIG. 14 was further analyzed for timing of response to treatment. All subjects responded to treatment after 3-6 treatment sessions with majority of patients responding with at least 6 treatment sessions (50%), which may suggest a delayed effect of stimulation treatment as the result of repeated or cumulative stimulation treatment. Response to treatment was determined to be at least 1 grade change in motor score (see, FIG. 15).

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of treating a nerve root palsy in a subject using electrical stimulation comprising:
   neuromodulating the brain stem and/or suboccipital spinal cord, and/or the cervical spinal cord, and/or the thoracic spinal cord, and/or the lumbar spinal cord, of said subject by:
   determining a target location by stimulating a plurality of locations associated with a muscle weakened or paralyzed by the nerve root palsy and identifying an evoked motor response;
   measuring a strength of the muscle weakened or paralyzed by the nerve root palsy;
   administering transcutaneous electrical stimulation to the brain stem and/or suboccipital spinal cord, and/or the cervical spinal cord or a region thereof, and/or the thoracic spinal cord or a region thereof, and/or the lumbar spinal cord or a region thereof at the target location, wherein said transcutaneous electrical stimulation is provided at a frequency and intensity sufficient to evoke a motor response of the muscle weakened or paralyzed by the nerve root palsy;
   repeating said administration of transcutaneous electrical stimulation at least once;
   discontinuing said administration of transcutaneous electrical stimulation; and
   measuring the strength of the muscle to determine an amount of the strength of the muscle that is retained after said transcutaneous electrical stimulation is removed.

2. The method of claim 1, wherein said nerve root palsy results from a spinal stenosis.

3. The method of claim 1, wherein:
   said nerve disorder comprises an upper limb radiculopathy; and/or
   said nerve root disorder comprises a lower limb radiculopathy; and/or
   said nerve root disorder comprises cauda equina syndrome; and/or
   said nerve root disorder comprises a peripheral nerve neuropathy.

4. The method of claim 3, wherein said nerve root palsy comprises an upper limb radiculopathy comprising a C5 palsy, and/or a C6 palsy, and/or a C7 palsy.

5. The method of claim 3, wherein said nerve root palsy comprises a lower limb radiculopathy comprising an L4 palsy, and/or an L5 palsy, and/or an S1 palsy.

6. The method of claim 1, wherein said method:
restores strength; and/or
restores motor function; and/or
restores locomotion; and/or
restores continence; and/or
restores sexual function; and/or
reduces or eliminates pain associated with said nerve root palsy; and/or
improves sensory function.

7. The method according to any one of claims 1, 2, 3, 4 or 5, wherein said neuromodulating comprises neuromodulating a dorsal surface of the brainstem or spinal cord.

8. The method of claim 1, wherein said method comprises administering transcutaneous electrical stimulation with one or more electrodes to the suboccipital and/or brain stem or a region thereof, to the cervical spinal cord or a region thereof, and/or the thoracic spinal cord or a region thereof, and/or the lumbar spinal cord or a region thereof.

9. The method of claim 8, wherein said transcutaneous electrical stimulation is applied over one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

10. The method of claim 8, wherein said transcutaneous electrical stimulation is applied over one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

11. The method of claim 8, wherein said transcutaneous electrical stimulation is applied over one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

12. The method of claim 8, wherein:
said transcutaneous electrical stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz, or at least about 1 kHz, or at least about 1.5 kHz, or at least about 2 kHz, or at least about 2.5 kHz, or at least about 5 kHz, or at least about 10 kHz, or said transcutaneous electrical stimulation is at a frequency of about 30 Hz.

13. The method of claim 8, wherein:
said transcutaneous electrical stimulation is at an intensity ranging from about 5 mA or about 10 mA up to about 500 mA, or from about 5 mA or about 10 mA up to about 400 mA, or from about 5 mA or about 10 mA up to about 300 mA, or from about 5 mA or about 10 mA up to about 200 mA, or from about 5 mA or about 10 mA to up about 150 mA, or from about 5 mA or about 10 mA up to about 50 mA, or from about 5 mA or about 10 mA up to about 100 mA, or from about 5 mA or about 10 mA up to about 80 mA, or from about 5 mA or about 10 mA up to about 60 mA, or from about 5 mA or about 10 mA up to about 50 mA; and/or
said transcutaneous electrical stimulation comprises administering pulses having a width that ranges from about 1 msec, or from about 5 msec, or from about 10 msec, or from about 20 msec up to about 1,000 msec, or up to about 700 msec, or up to about 500 msec, or up to about 450 msec, or up to about 400 msec, or up to about 350 msec, or up to about 300 msec, or up to about 250 msec, or up to about 200 msec, or up to about 150 msec, or up to about 100 msec; and/or
said transcutaneous electrical stimulation comprises administering pulses having a width that ranges from about 50, or from about 100, or from about 200, up to about 1000, or up to about 500, or up to about 400, or up to about 300, or up to about 250 microseconds.

14. The method of claim 8, wherein said transcutaneous electrical stimulation is superimposed on a high frequency carrier signal.

15. The method of claim 8, wherein said transcutaneous electrical stimulation is applied using one or more needle electrodes.

16. The method of claim 1, wherein said method comprises neuromodulating the suboccipital spinal cord or brainstem or a region thereof, and/or the cervical spinal cord or a region thereof, and/or the thoracic spinal cord or a region thereof, and/or the lumbar spinal cord or a region thereof, of said subject with a magnetic stimulator.

17. The method of claim 16, wherein said method comprises administering magnetic neural stimulation to a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

18. The method of claim 16, wherein said method comprises administering magnetic neural stimulation to a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

19. The method of claim 16, wherein said method comprises administering magnetic neural stimulation to a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

20. The method of claim 16, wherein said magnetic stimulation produces a magnetic field of at least 1 tesla, or at least 2 tesla, or at least 3 tesla, or at least 4 tesla.

21. The method of claim 16, wherein:
said magnetic stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz; and/or
said magnetic stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

22. The method of claim 16, wherein:
said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days, and/or
said treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months.

23. The method of claim 16, wherein treatment of said subject with said magnetic stimulation facilitates reduction of pain and/or improvement in strength, and/or improvement in motor control at a later time without magnetic stimulation.

24. The method of claim 16, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains reduction of pain and/or improvement in strength at a later time without magnetic stimulation.

25. The method of claim 24, wherein the frequency of treatment is reduced after the subject obtains persistent reduction in pain and/or improvement in strength, and/or improvement in locomotor control in the absence of the magnetic stimulation.

26. The method of claim 25, wherein the frequency of treatment is reduced to a level sufficient to maintain persistent reduction in pain and/or improvement in strength, and/or improvement in motor control.

27. The method of claim 1, wherein said method comprises neuromodulating the brain stem and/or suboccipital spinal cord, and/or the cervical spinal cord, and/or the thoracic spinal cord, and/or the lumbar spinal cord, of said subject by administering epidural stimulation to the brain stem and/or suboccipital spinal cord, and/or cervical spinal cord or a region thereof, and/or thoracic spinal cord or a region thereof, and/or the lumbar spinal cord or a region thereof at a frequency and intensity sufficient to restore function lost by said nerve root palsy.

28. The method of claim 27, wherein said epidural electrical stimulation is applied to one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

29. The method of claim 27, wherein said epidural electrical stimulation is applied to one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

30. The method of claim 27, wherein said epidural electrical stimulation is applied to one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

31. The method of claim 27, wherein:
said epidural stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz, or at least about 1 kHz, or at least about 1.5 kHz, or at least about 2 kHz, or at least about 2.5 kHz, or at least about 5 kHz, or at least about 10 kHz; and/or
said epidural stimulation is at about 30 Hz plus or minus about 10 Hz, or plus or minus about 5 Hz, or plus or minus 2 Hz, or is at about 30 Hz; and/or
said epidural stimulation is at a frequency that avoids paresthesia.

32. The method of claim 27, wherein:
said epidural stimulation is at an amplitude ranging from 0.5 mA, or from about 1 mA, or from about 2 mA, or from about 3 mA, or from about 4 mA, or from about 5 mA up to about 50 mA, or up to about 30 mA, or up to about 20 mA, or up to about 15 mA, or from about 5 mA to about 20 mA, or from about 5 mA up to about 15 mA; and/or said stimulation comprises pulsing having a pulse width that ranges from about 100 µs up to about 1 ms or up to about 800 ps, or up to about 600 ps, or up to about 500 ps, or up to about 400 ps, or up to about 300 ps, or up to about 200 ps, or up to about 100 ps, or from about 150 ps up to about 600 ps, or from about 200 ps up to about 500 ps, or from about 200 ps up to about 400 ps, or is about 200 ps.

33. The method of claim 1, wherein said method further comprises administering at least one monoaminergic agonist to said subject.

34. The method of claim 33, wherein said at least one monoaminergic agonist comprises an agent selected from the group consisting of a serotonergic drug, a dopaminergic drug, a noradrenergic drug, a GABAergic drug, and a glycinergic drug.

35. The method of claim 1, wherein the nerve root palsy comprises a peripheral nerve neuropathy comprising at least one selected from the group consisting of: brachial plexus neuropathy, ulnar neuropathy, median neuropathy, radial neuropathy, axillary nerve injuries, suprascapular neuropathy, obturator neuropathy, lumbosacral plexus neuropathy, femoral neuropathy, common peroneal neuropathy (e.g., superficial, common, deep), tibial neuropathy, thoracic outlet syndrome, anterior interosseous neuropathy, musculocutaneous neuropathy, amyloid neuropathy, uremic neuropathy, occipital neuropathy, demyelinating polyradiculoneuropathy (Guillain-Barre syndrome), drug-induced neuropathies, diabetic neuropathy, alcoholic neuropathy, and HIY neuropathy.

* * * * *

UNITED STATES PATENT AND TRADEMARK OFFICE
CERTIFICATE OF CORRECTION

PATENT NO. : 12,478,777 B2
APPLICATION NO. : 17/270402
DATED : November 25, 2025
INVENTOR(S) : Daniel C. Lu Page 1 of 1

It is certified that error appears in the above-identified patent and that said Letters Patent is hereby corrected as shown below:

In the Specification

Column 1, Line 51, "(MIR)" should be --(MR)--.

Column 26, Line 41, "100 s up" should be --100 µs up--.

Column 27, Line 21, "temMEP" should be --tcmMEP--.

Column 32, Line 50, "several m or" should be --several µm or--.

Column 32, Line 64, "10 m or" should be --10 µm or--.

Column 33, Line 33, "1 m up" should be --1 µm up--.

Column 35, Line 6, "T1-T11" should be --T11-T11--.

Column 41, Line 64, "Ims" should be --1ms--.

Column 44, Table 1, Line 5, "mg/kg)" should be --(mg/kg)--.

Column 45, Line 7, "Ti6Al7Nb" should be --Ti6A17Nb--.

Signed and Sealed this
Twenty-seventh Day of January, 2026

John A. Squires
*Director of the United States Patent and Trademark Office*